US012639874B1

(12) United States Patent

Park et al.

(10) Patent No.: US 12,639,874 B1

(45) Date of Patent: May 26, 2026

(54) SYSTEMS, METHODS AND GRAPHICAL USER INTERFACES FOR MOTION EDITING AND ANIMATION APPLICATIONS

(71) Applicant: Apple Inc., Cupertino, CA (US)

(72) Inventors: Jee Young Park, San Bruno, CA (US); Magnus H. Johnson, San Francisco, CA (US); Karen N. Wong, Sunnyvale, CA (US); Bradley W. Peebler, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 18/306,844

(22) Filed: Apr. 25, 2023

Related U.S. Application Data

(60) Provisional application No. 63/363,570, filed on Apr. 25, 2022.

(51) Int. Cl.
 *G06T 13/40* (2011.01)
 *G06F 3/04855* (2022.01)
 (Continued)

(52) U.S. Cl.
 CPC .......... *G06T 13/40* (2013.01); *G06F 3/04855* (2013.01); *G06F 3/0486* (2013.01); (Continued)

(58) Field of Classification Search
 CPC ..... G06T 13/40; G06T 13/80; G06T 2200/24; G06F 3/04855; G06F 3/0486; G06F 3/0482
 See application file for complete search history.

(56) References Cited

U.S. PATENT DOCUMENTS

2004/0100482 A1* 5/2004 Cajolet ................... G06T 13/00
  715/716
2010/0259545 A1* 10/2010 Elnatan ................... G06T 13/00
  345/473

(Continued)

OTHER PUBLICATIONS

Unity User Manual 2019.4 LTS, published at https://docs.unity3d.com/2019.4/Documentation/Manual/, published as of Jan. 2021, as evidenced at archive.org (Year: 2021).*

(Continued)

*Primary Examiner* — William A Beutel

(74) *Attorney, Agent, or Firm* — Kubota & Basol LLP

(57) ABSTRACT

Some examples of the disclosure are directed to an animation editor graphical user interface associated with a content creation application. In some examples, the animation editor user interface includes a plurality of user interface options and tools for animating motion of an object displayed in the animation editor user interface. In some examples, the animation editor user interface includes an animation timeline including a plurality of cells. In some examples, the animation timeline is arranged in a grid format comprising a plurality of rows and a plurality of columns of cells. In some examples, the animation timeline includes a library of a plurality of motion effects. In some examples, movement of a representation of a respective motion effect to a respective cell in a respective column of the animation timeline adds the representation of the respective motion effect to one or more cells in the respective column.

20 Claims, 43 Drawing Sheets

(51) Int. Cl.
    *G06F 3/0486*      (2013.01)
    *G06T 13/80*       (2011.01)
    *G06F 3/0482*      (2013.01)

(52) U.S. Cl.
    CPC ............ *G06T 13/80* (2013.01); *G06F 3/0482*
                  (2013.01); *G06T 2200/24* (2013.01)

(56)                References Cited

U.S. PATENT DOCUMENTS

| | | |
|---|---|---|
| 2013/0076755 A1 | 3/2013 | Pritting |
| 2013/0219344 A1 | 8/2013 | Zyracki et al. |
| 2017/0091977 A1 | 3/2017 | West |
| 2018/0181194 A1 | 6/2018 | Harvey et al. |
| 2021/0256175 A1 | 8/2021 | Bailey et al. |
| 2022/0028145 A1 | 1/2022 | Stevenson et al. |

OTHER PUBLICATIONS

Jean-Gobert de Coster, "How to use Spine Animations in Unity's Timeline editor", YouTube video published Mar. 5, 2021 at https://www.youtube.com/watch?v=U9gHP8V0H_k, Video Length 26:50 (Year: 2021).*

Animation Window Guide, Unity Documentation [online], Unity Documentation, Version 2022.3 [retrieved on Apr. 30, 2024], Retrieved from the Internet: <URL: https://docs.unity3d.com/Manual/AnimationEditorGuide.html>, 2 pages.

De Coster, Jean-Gobert, "How to Use Spine Animations in Unity's Timeline Editor", YouTube [online], YouTube, 2021 [retrieved on Apr. 30, 2024], Retrieved from the Internet: <URL: https://www.youtube.com/watch?v=U9gHP8V0H_k>, 4 pages.

Koyama et al., "Precomputed Optimal One-hop Motion Transition for Responsive Character Animation", The Visual Computer, <http//doi.org/10.1007/s00371-019-01693-8>, May 9, 2019, 12 pages.

* cited by examiner

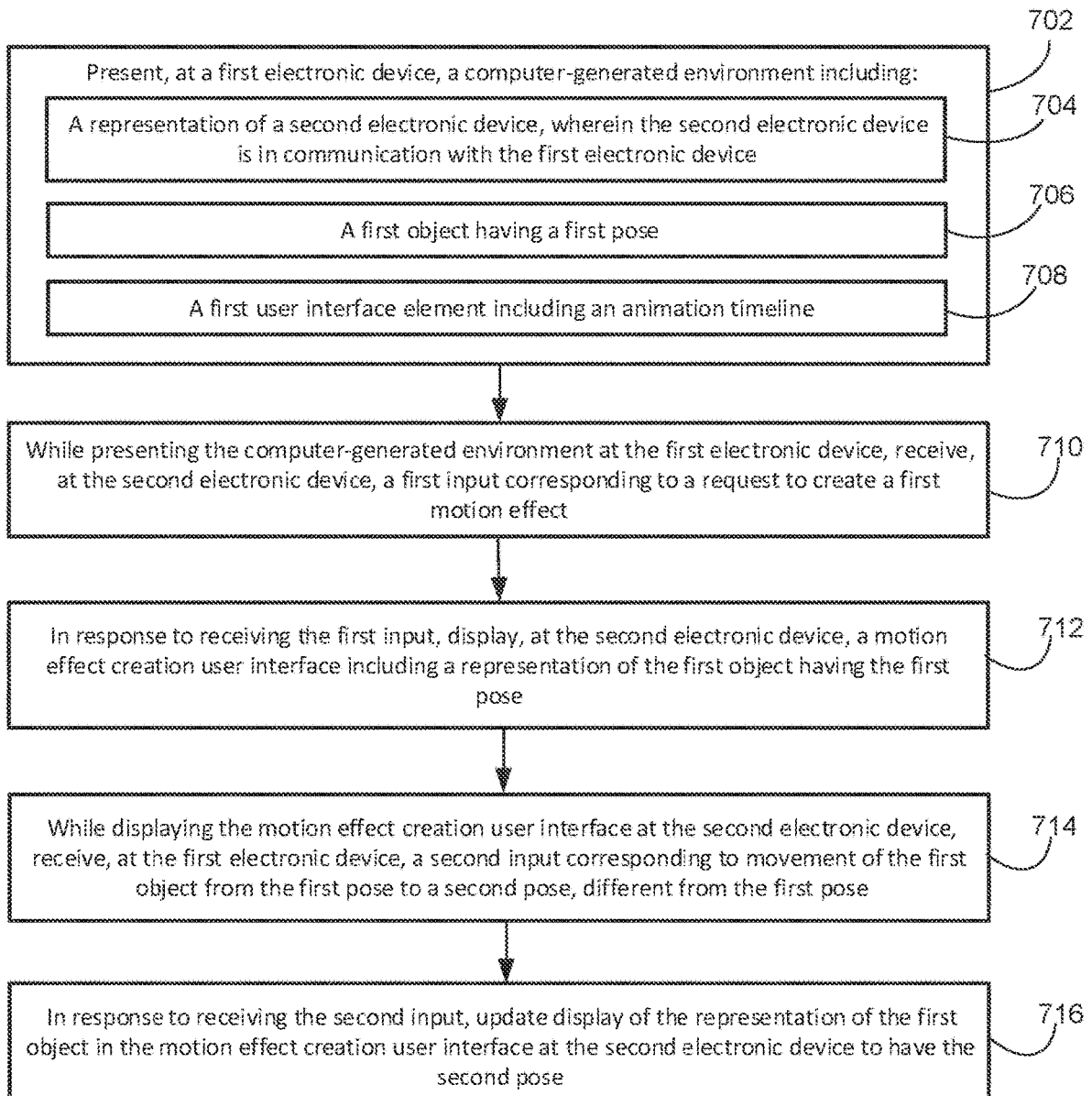

700

702
Present, at a first electronic device, a computer-generated environment including:

704
A representation of a second electronic device, wherein the second electronic device is in communication with the first electronic device 706
A first object having a first pose 708
A first user interface element including an animation timeline 710
While presenting the computer-generated environment at the first electronic device, receive, at the second electronic device, a first input corresponding to a request to create a first motion effect 712
In response to receiving the first input, display, at the second electronic device, a motion effect creation user interface including a representation of the first object having the first pose 714
While displaying the motion effect creation user interface at the second electronic device, receive, at the first electronic device, a second input corresponding to movement of the first object from the first pose to a second pose, different from the first pose 716
In response to receiving the second input, update display of the representation of the first object in the motion effect creation user interface at the second electronic device to have the second pose

FIG. 7

SYSTEMS, METHODS AND GRAPHICAL USER INTERFACES FOR MOTION EDITING AND ANIMATION APPLICATIONS

CROSS-REFERENCE TO RELATED APPLICATIONS

This application claims the benefit of U.S. Provisional Application No. 63/363,570, filed Apr. 25, 2022, the content of which is incorporated herein by reference in its entirety for all purposes.

FIELD OF THE DISCLOSURE

This relates generally to systems, methods, graphical user interfaces for motion editing and motion creation applications, including animation generation on electronic devices.

BACKGROUND OF THE DISCLOSURE

Some computer graphical environments provide two-dimensional and/or three-dimensional environments where at least some objects displayed for a user's viewing are virtual and generated by a computer. In some uses, a user may create or modify motion of an object to generate animation, such as by editing, generating, or otherwise manipulating the object using a content generation environment, such as a graphics editor or graphics editing interface running on a content creation application, for example. In some examples, animation of objects, including two-dimensional objects and/or three-dimensional objects within an XR environment, may include interpolating individual motions of the objects at various intermediate stages of the animation generation process.

SUMMARY OF THE DISCLOSURE

Some examples of the disclosure are directed to an animation editor graphical user interface associated with a content creation application. In some examples, the animation editor graphical user interface is configured to be displayed via a display in communication with an electronic device. In some examples, the animation editor user interface includes a plurality of user interface options and tools for animating motion of an object displayed in the animation editor user interface. In some examples, the animation editor user interface includes an animation timeline including a plurality of cells. In some examples, the animation timeline is arranged in a grid format comprising a plurality of rows and a plurality of columns of cells. In some examples, the plurality of columns of the animation timeline correspond to a plurality of time frames, and the plurality of rows correspond to a plurality of portions of the object for which motion can be animated. In some examples, the animation timeline includes a library of a plurality of motion effects, including a first motion effect. In some examples, movement of a representation of a respective motion effect to a respective cell in a respective column of the animation timeline adds the representation of the respective motion effect to one or more cells in the respective column. For example, when the electronic device receives movement of a representation of the first motion effect to a first cell in a first column of the animation timeline, in accordance with a determination that the first motion effect corresponds to motion of one or more first portions of the object, the electronic device displays the representation of the first motion effect in one or more first cells corresponding to the one or more first portions of the object in the first column. In some examples, in accordance with a determination that the first motion effect corresponds to motion of one or more second portions of the object, the electronic device displays the representation of the first motion effect in one or more second cells corresponding to the one or more second portions of the object in the first column, wherein at least one of the one or more second portions is different from the one or more first portions. Additionally, in some examples, the electronic device animates the one or more first portions and/or the one or more second portions of the object according to the first motion effect.

Some examples of the disclosure are directed to a motion creation graphical user interface associated with a content creation application. In some examples, the motion creation graphical user interface is configured to be displayed via a display in communication with an electronic device. In some examples, the motion creation user interface includes a plurality of user interface options and tools for creating a motion effect for an object displayed in the motion creation user interface. In some examples, the motion creation graphical user interface includes a plurality of user interface objects identifying a plurality of portions of the object. In some examples, in response to receiving selection of a first user interface object identifying a first portion of the object, the electronic device displays a plurality of interpolation types for movement of the first portion of the object. In some examples, in response to receiving selection of a first interpolation type, the electronic device displays a motion curve corresponding to the interpolation type and one or more user-adjustable motion parameters defining the motion curve. In some examples, adjustment of the one or more motion parameters causes the electronic device to update display of the motion curve and to define movement of the first portion of the first object. In some examples, the motion effect can be saved and added to a library of motion effects associated with the content creation application for subsequent use in animating motion of the object according to the motion effect.

Some examples of the disclosure are directed to a virtual motion capture application configured to operate on a first electronic device. In some examples, the virtual motion capture application is configured to present, via the first electronic device, a user interface element containing an animation timeline and a virtual platter including a virtual object in a computer-generated environment. In some examples, the user interface element includes a plurality of options and tools for generating pose-centered motion for the virtual object in the computer-generated environment. In some examples, the virtual motion capture application is configured to exchange data corresponding to the virtual object with a content creation application running on a second electronic device. In some examples, the second electronic device may display a motion creation user interface associated with the content creation application while the first electronic device presents the computer-generated environment. In some examples, the motion creation user interface includes a representation of the virtual object. In some examples, motion can be generated for the virtual object at the first electronic device by directly manipulating one or more portions of the virtual object to create new poses of the virtual object, which causes the electronic device to interpolate successive poses and thus generate the motion. In some examples, in response to receiving manipulation of one or more portions of the virtual object at the first electronic device, the second electronic device may update display of the representation of the virtual object in the motion creation user interface in accordance with the manipulation of the virtual object in the computer-generated environment.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

FIG. 7 illustrates a flow diagram illustrating an example process for animating an object in a three-dimensional environment using a virtual motion capture application according to some examples of the disclosure.

DETAILED DESCRIPTION

Figure 1:
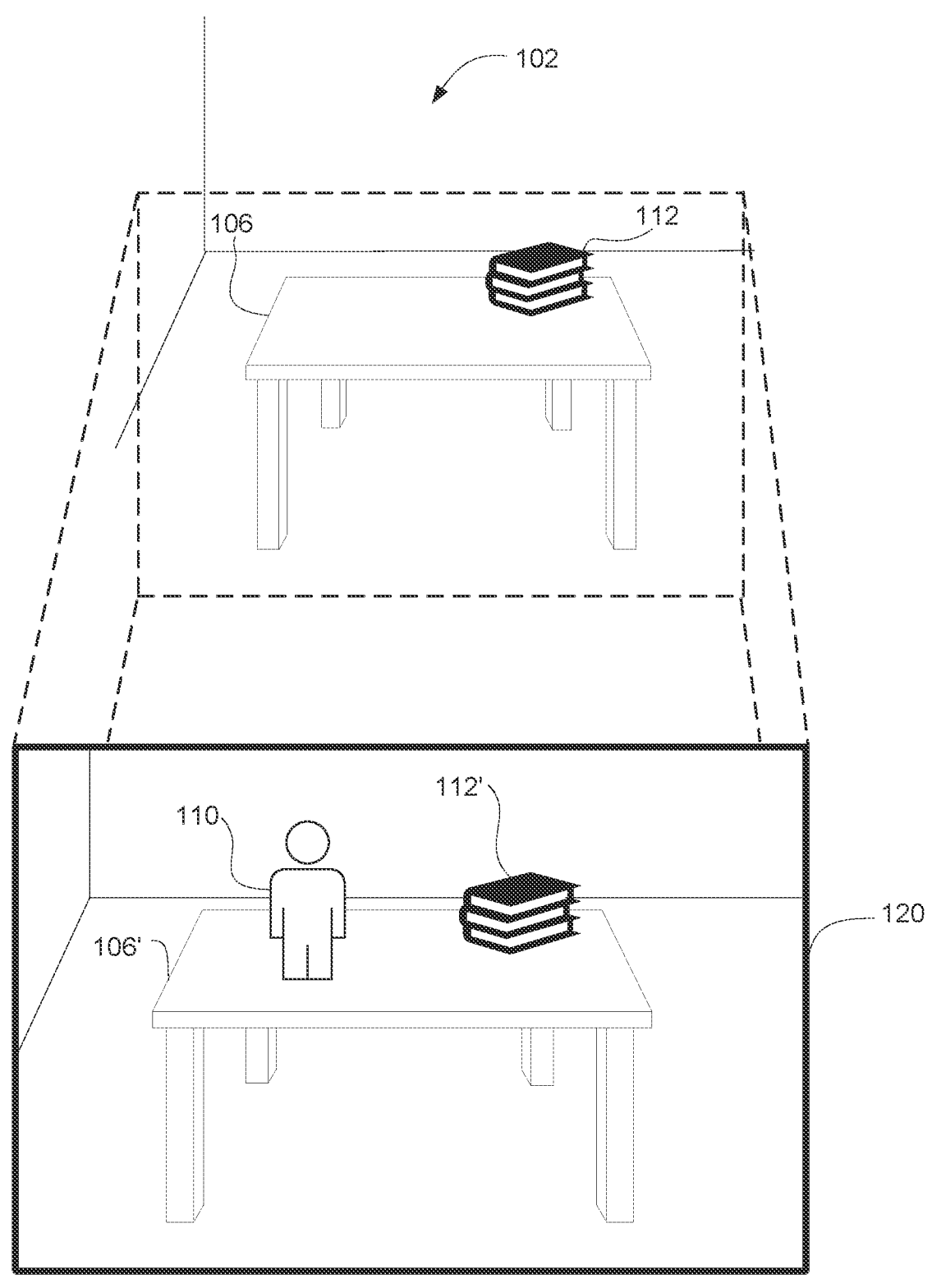
FIG. 1 illustrates an electronic device presenting an extended reality environment according to some examples of the disclosure.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment ("extended reality environment," "computer generated environment") refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. As another example, the XR system may detect an interaction (e.g., a (virtual) touch, tap, pinch, etc.) with one or more objects in the XR environment, and, in response, adjust and/or update graphical content presented to the user in a manner similar to how such objects or views of such objects would change in a physical environment. In some examples, the XR system may adjust characteristic(s) of graphical content in the XR environment in response to representations of physical motions (e.g., verbal commands).

There are many different types of electronic systems that enable a person to sense and/or interact with various XR environments. Examples include head mountable systems, projection-based systems (including hologram-based systems), heads-up displays (HUDs), head mounted displays (HMDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some embodiments, XR animated content can be presented to the user via an XR data file (data file) (including script, executable code, etc.) that includes data representing the XR content and/or data describing how the XR animated content is to be presented. In some embodiments, the XR file includes data representing one or more XR scenes and one or more triggers for presentation of the one or more XR scenes. For example, an XR scene may be anchored to a horizontal, planar surface, such that when a horizontal, planar surface is detected (e.g., in the field of view of one or more cameras), the XR scene can be presented. The XR file can also include data regarding one or more virtual objects associated with the XR scene, and/or associated triggers and actions involving the XR virtual objects.

In order to simplify the generation of XR files and/or editing of computer-generated graphics generally, an animation application including an object animation environment (e.g., an authoring environment GUI) can be used. In some examples, an object animation environment is displayed via a two-dimensional display of an electronic device on which the animation application is running. In some examples, an object animation environment is itself an XR environment (e.g., a two-dimensional and/or three-dimensional environment). For example, an object animation environment can include one or more virtual objects and one or more representations of real-world objects. In some examples, the virtual objects are superimposed over a physical environment, or a representation thereof. In some examples, the physical environment is captured via one or more cameras of the electronic device and is actively displayed in the XR environment (e.g., via the display generation component). In some examples, the physical environment is (e.g., passively) provided by the electronic device, for example, if the display generation component includes a translucent or transparent element through which the user is able to see the physical environment.

In such an object animation environment, a user can create and/or modify motions and general movements of virtual objects from scratch (including the appearance of the virtual objects, behaviors/actions of the virtual objects, and/or triggers for the behaviors/actions of the virtual objects). Additionally or alternatively, virtual objects can be created by other content creators and imported into the object animation environment, where the virtual objects can be placed into an XR environment or scene and animated further. In some embodiments, virtual objects generated in an object generation environment or entire environments can be exported to other environments or XR scenes (e.g., via generating an XR file and importing or opening the XR file in a content creation application or XR viewer application.

Some examples of the disclosure are directed to an animation editor graphical user interface associated with a content creation application. In some examples, the animation editor graphical user interface is configured to be displayed via a display in communication with an electronic device. In some examples, the animation editor user interface includes a plurality of user interface options and tools for animating motion of an object displayed in the animation editor user interface. In some examples, the animation editor user interface includes an animation timeline including a plurality of cells. In some examples, the animation timeline is arranged in a grid format comprising a plurality of rows and a plurality of columns. In some examples, the plurality of columns of the animation timeline correspond to a plurality of time frames, and the plurality of rows correspond to a plurality of portions of the object for which motion can be animated. In some examples, the animation timeline includes a library of a plurality of motion effects, including a first motion effect. In some examples, movement of a representation of a respective motion effect to a respective cell in a respective column of the animation timeline adds the representation of the respective motion effect to one or more cells in the respective column. For example, when the electronic device receives movement of a representation of the first motion effect to a first cell in a first column of the animation timeline, in accordance with a determination that the first motion effect corresponds to motion of one or more first portions of the object, the electronic device displays the representation of the first motion effect in one or more first cells corresponding to the one or more first portions of the object in the first column. In some examples, in accordance with a determination that the first motion effect corresponds to motion of one or more second portions of the object, the electronic device displays the representation of the first motion effect in one or more second cells corresponding to the one or more second portions of the object in the first column, wherein at least one of the one or more second portions is different from the one or more first portions. Additionally, in some examples, the electronic device animates the one or more first portions and/or the one or more second portions of the object according to the first motion effect.

Some examples of the disclosure are directed to a motion creation graphical user interface associated with a content creation application. In some examples, the motion creation graphical user interface is configured to be displayed via a display in communication with an electronic device. In some examples, the motion creation user interface includes a plurality of user interface options and tools for creating a motion effect for an object displayed in the motion creation user interface. In some examples, the motion creation graphical user interface includes a plurality of user interface objects identifying a plurality of portions of the object. In some examples, in response to receiving selection of a first user interface object identifying a first portion of the object, the electronic device displays a plurality of interpolation types for movement of the first portion of the object. In some examples, in response to receiving selection of a first interpolation type, the electronic device displays a motion curve corresponding to the interpolation type and one or more user-adjustable motion parameters defining the motion curve. In some examples, adjustment of the one or more motion parameters causes the electronic device to update display of the motion curve and to define movement of the first portion of the first object. In some examples, the motion effect can be saved and added to a library of motion effects associated with the content creation application for subsequent use in animating motion of the object according to the motion effect.

Some examples of the disclosure are directed to a virtual motion capture application configured to operate on a first electronic device. In some examples, the virtual motion capture application is configured to present, via the first electronic device, a user interface element containing an animation timeline and a platter including a virtual object in a computer-generated environment. In some examples, the user interface element includes a plurality of options and tools for generating pose-centered motion for the virtual object in the computer-generated environment. In some examples, the virtual motion capture application is configured to exchange data corresponding to the virtual object with a content creation application running on a second electronic device. In some examples, the second electronic device may display a motion creation user interface associated with the content creation application while the first electronic device presents the computer-generated environment. In some examples, the motion creation user interface includes a representation of the virtual object. In some examples, motion can be generated for the virtual object at the first electronic device by directly manipulating one or more portions of the virtual object to create new poses of the virtual object, which causes the electronic device to interpolate successive poses and thus generate the motion. In some examples, in response to receiving manipulation of one or more portions of the virtual object at the first electronic device, the second electronic device may update display of the representation of the virtual object in the motion creation user interface in accordance with the manipulation of the virtual object in the computer-generated environment.

In some examples, animating a motion of a virtual object in a three-dimensional environment may include interaction with one or more user interface elements of the virtual motion capture application. In some examples, a user's gaze may be tracked by the electronic device as an input for targeting a selectable option/affordance within a respective user interface element when animating the motion of the virtual object in the three-dimensional environment. For example, gaze can be used to identify one or more options/affordances targeted for selection using another selection input. In some examples, a respective option/affordance may be selected using hand-tracking input detected via an input device in communication with the electronic device. In some examples, objects displayed in the three-dimensional environment may be moved and/or reoriented in the three-dimensional environment in accordance with direct movement input detected via the input device.

FIG. 1 illustrates an electronic device 120 presenting an extended reality (XR) environment (e.g., a computer-generated environment) according to some examples of the disclosure. In some examples, electronic device 120 is a hand-held or mobile device, such as a tablet computer, laptop computer, smartphone, or head-mounted display. Examples of electronic device 120 are described below with reference to the architecture block diagram of FIG. 2. As shown in FIG. 1, electronic device 120, table 106, and books 112 are located in the physical environment 102. In some examples, electronic device 120 may be configured to capture images of physical environment 102 including table 106 and books 112 (illustrated in the field of view of electronic device 120). In some examples, in response to a trigger, the electronic device 120 may be configured to display a virtual object 110 (e.g., two-dimensional virtual content) in the computer-generated environment (e.g., represented by a character illustrated in FIG. 1) that is not present in the physical environment 102, but is displayed in the computer-generated environment positioned on (e.g., anchored to) the top of a computer-generated representation 106' of real-world table 106. For example, virtual object 110 can be displayed on the surface of the computer-generated representation 106' of the table in the computer-generated environment next to the computer-generated representation 112' of real-world books 112 displayed via electronic device 120 in response to detecting the planar surface of table 106 in the physical environment 102.

It should be understood that virtual object 110 is a representative virtual object and one or more different virtual objects (e.g., of various dimensionality such as two-dimensional or three-dimensional virtual objects) can be included and rendered in a three-dimensional computer-generated environment. For example, the virtual object can represent an application or a user interface displayed in the computer-generated environment. In some examples, the virtual object can represent content corresponding to the application and/or displayed via the user interface in the computer-generated environment. In some examples, the virtual object 110 is optionally configured to be interactive and responsive to user input, such that a user may virtually touch, tap, move, rotate, or otherwise interact with, the virtual object 110. In some examples, the virtual object 110 may be displayed in a three-dimensional computer-generated environment within an object animation application running on the electronic device 120. In some such examples, as described in more detail below, the virtual object 110 may be viewable and/or configured to be interactive and responsive to multiple users and/or user input provided by multiple users, respectively. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
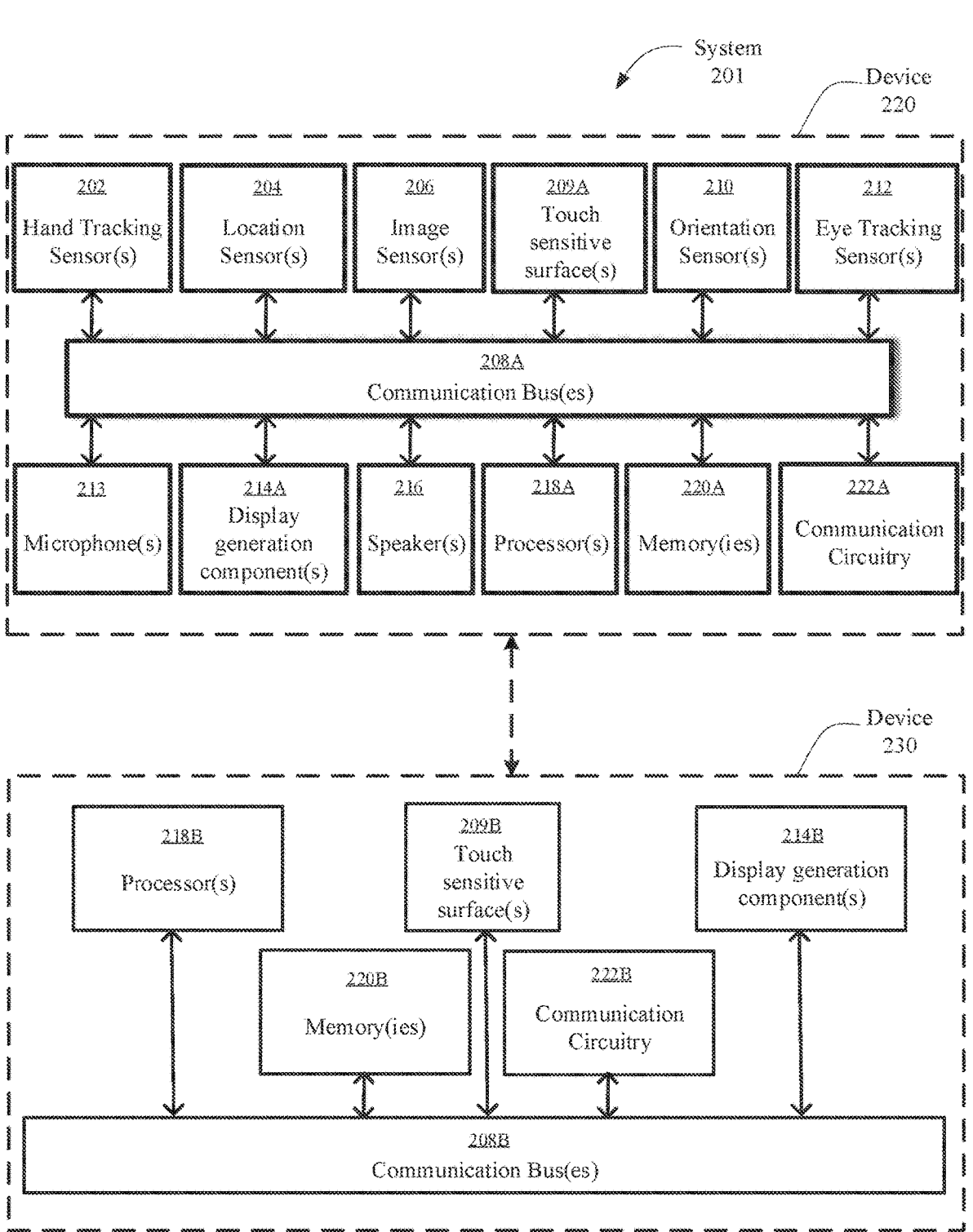
FIG. 2 illustrates a block diagram of an exemplary architecture for a system according to some examples of the disclosure.

FIG. 2 illustrates a block diagram of an exemplary architecture for a system 201 according to some examples of the disclosure. In some examples, system 201 includes multiple devices. For example, the system 201 includes a first electronic device 220 and a second electronic device 230, wherein the first electronic device 220 and the second electronic device 230 are in communication with each other. In some examples, the first electronic device 220 and/or the second electronic device 230 are a portable device, such as a mobile phone, smart phone, a tablet computer, a laptop computer, an auxiliary device in communication with another device, etc., respectively.

As illustrated in FIG. 2, the first electronic device 220 optionally includes various sensors (e.g., one or more hand tracking sensor(s) 202, one or more location sensor(s) 204, one or more image sensor(s) 206, one or more touch-sensitive surface(s) 209A, one or more motion and/or orientation sensor(s) 210, one or more eye tracking sensor(s) 212, one or more microphone(s) 213 or other audio sensors, etc.), one or more display generation component(s) 214A, one or more speaker(s) 216, one or more processor(s) 218A, one or more memories 220A, and/or communication circuitry 222A. In some examples, the second electronic device 230 optionally includes various sensors (e.g., one or more image sensor(s) and/or one or more touch sensitive surface(s) 209B), one or more display generation component(s) 214B, one or more processor(s) 218B, one or more memories 220B, and/or communication circuitry 222B. One or more communication buses 208A and 208B are optionally used for communication between the above-mentioned components of devices 220 and 230, respectively. First electronic device 220 and second electronic device 230 optionally communicate via a wired or wireless connection (e.g., via communication circuitry 222A-222B) between the two devices.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B include one or more general processors, one or more graphics processors, and/or one or more digital signal processors. In some examples, memory 220A. 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some examples, memory 220A, 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some examples, display generation component(s) 214A, 214B include a single display (e.g., a liquid-crystal display (LCD), organic light-emitting diode (OLED), or other types of display). In some examples, display generation component(s) 214A, 214B includes multiple displays. In some examples, display generation component(s) 214A, 214B can include a display with touch capability (e.g., a touch screen), a projector, a holographic projector, a retinal projector, etc. In some examples, devices 220 and 230 include touch-sensitive surface(s) 209A and 209B, respectively, for receiving user inputs, such as tap inputs and swipe inputs or other gestures. In some examples, display generation component(s) 214A, 214B and touch-sensitive surface(s) 209A, 209B form touch-sensitive display(s) (e.g., a touch screen integrated with devices 220 and 230, respectively, or external to devices 220 and 230, respectively, that is in communication with devices 220 and 230).

Devices 220 and/or 230 optionally includes image sensor(s). Image sensors(s) 206A optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from device 220/230. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, devices 220 and/or 230 use CCD sensors, event cameras, and depth sensors in combination to detect the physical environment around devices 220 and/or 230. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, device 220/230 uses image sensor(s) 206 to detect the position and orientation of device 220/230 and/or display generation component(s) 214A/214B in the real-world environment. For example, device 220/230 uses image sensor(s) 206 to track the position and orientation of display generation component(s) 214A/214B relative to one or more fixed objects in the real-world environment.

In some examples, device 220 includes microphone(s) 213 or other audio sensors. Device 220 uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Device 220 includes location sensor(s) 204 for detecting a location of device 220 and/or display generation component(s) 214A. For example, location sensor(s) 204 can include a GPS receiver that receives data from one or more satellites and allows device 220 to determine the device's absolute position in the physical world.

Device 220 includes orientation sensor(s) 210 for detecting orientation and/or movement of device 220 and/or display generation component(s) 214A. For example, device 220 uses orientation sensor(s) 210 to track changes in the position and/or orientation of device 220 and/or display generation component(s) 214A, such as with respect to physical objects in the real-world environment. Orientation sensor(s) 210 optionally include one or more gyroscopes and/or one or more accelerometers.

Device 220 includes hand tracking sensor(s) 202 and/or eye tracking sensor(s) 212, in some examples. Hand tracking sensor(s) 202 are configured to track the position/location of one or more portions of the user's hands, and/or motions of one or more portions of the user's hands with respect to the extended reality environment, relative to the display generation component(s) 214A, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214A. In some examples, hand tracking sensor(s) 202 and/or eye tracking sensor(s) 212 are implemented together with the display generation component(s) 214A. In some examples, the hand tracking sensor(s) 202 and/or eye tracking sensor(s) 212 are implemented separate from the display generation component(s) 214A.

In some examples, the hand tracking sensor(s) 202 can use image sensor(s) 206 (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some examples, one or more image sensor(s) 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by a respective eye tracking camera/illumination source(s).

Device 220/230 and system 201 are not limited to the components and configuration of FIG. 2, but can include fewer, other, or additional components in multiple configurations. In some examples, system 201 can be implemented in a single device. A person or persons using device 220/230 or system 201, is optionally referred to herein as a user or users of the device(s). Attention is now directed towards exemplary graphical user interfaces for animating motion and/or movement of an object in a two-dimensional environment on a first electronic device (e.g., corresponding to device 230) and/or in a three-dimensional environment presented via a second electronic device (e.g., corresponding to device 220). As discussed below, in some examples, the first electronic device may communicate with the second electronic device to coordinate an animation of a virtual object through the streaming of XR data between the first electronic device and the second electronic device. In some examples, the virtual object includes a character (e.g., a humanoid), an animal, text representation, an inanimate object, and/or any other object whose motions and/or movements can be created and modified in an authoring environment on the first electronic device and/or the second electronic device. In some examples, individual motions and/or movements of the virtual object may be interpolated to create the animation.

Figure 3A:
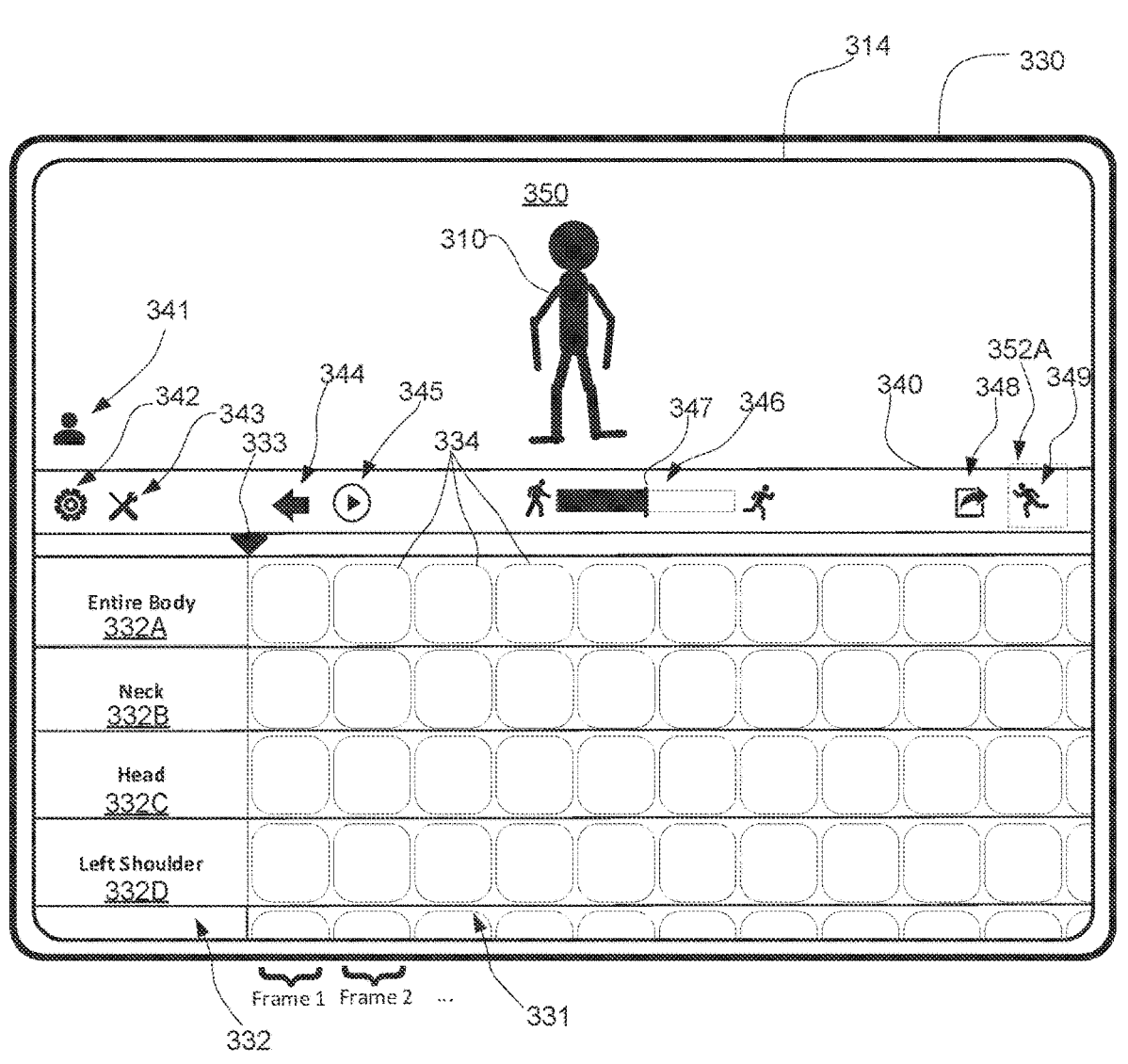
FIGS. 3A-3O illustrate example interactions with a graphical user interface of a motion editing and creation application on an electronic device according to some examples of the disclosure.
Figure 3B:
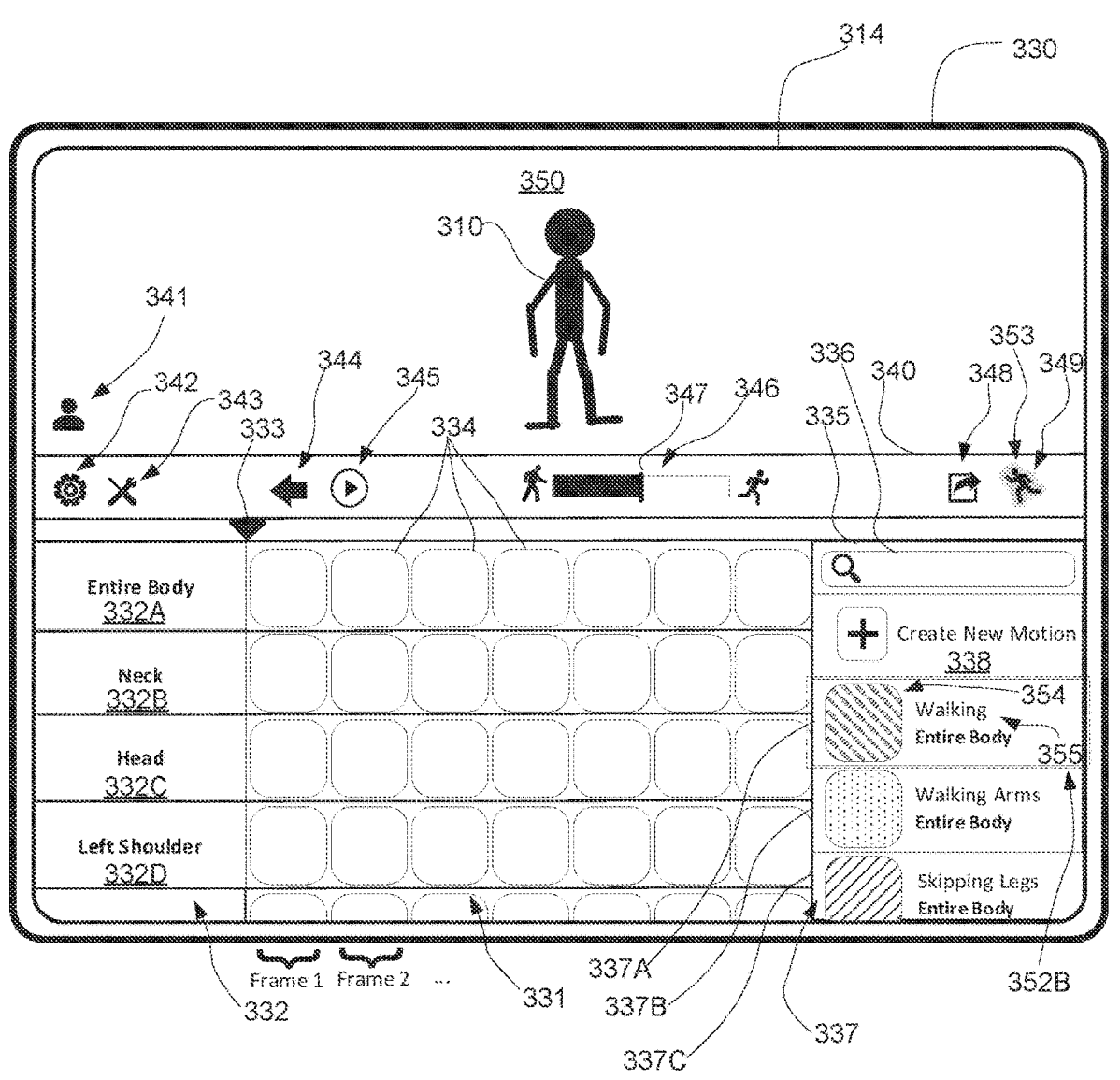
Figure 3C:
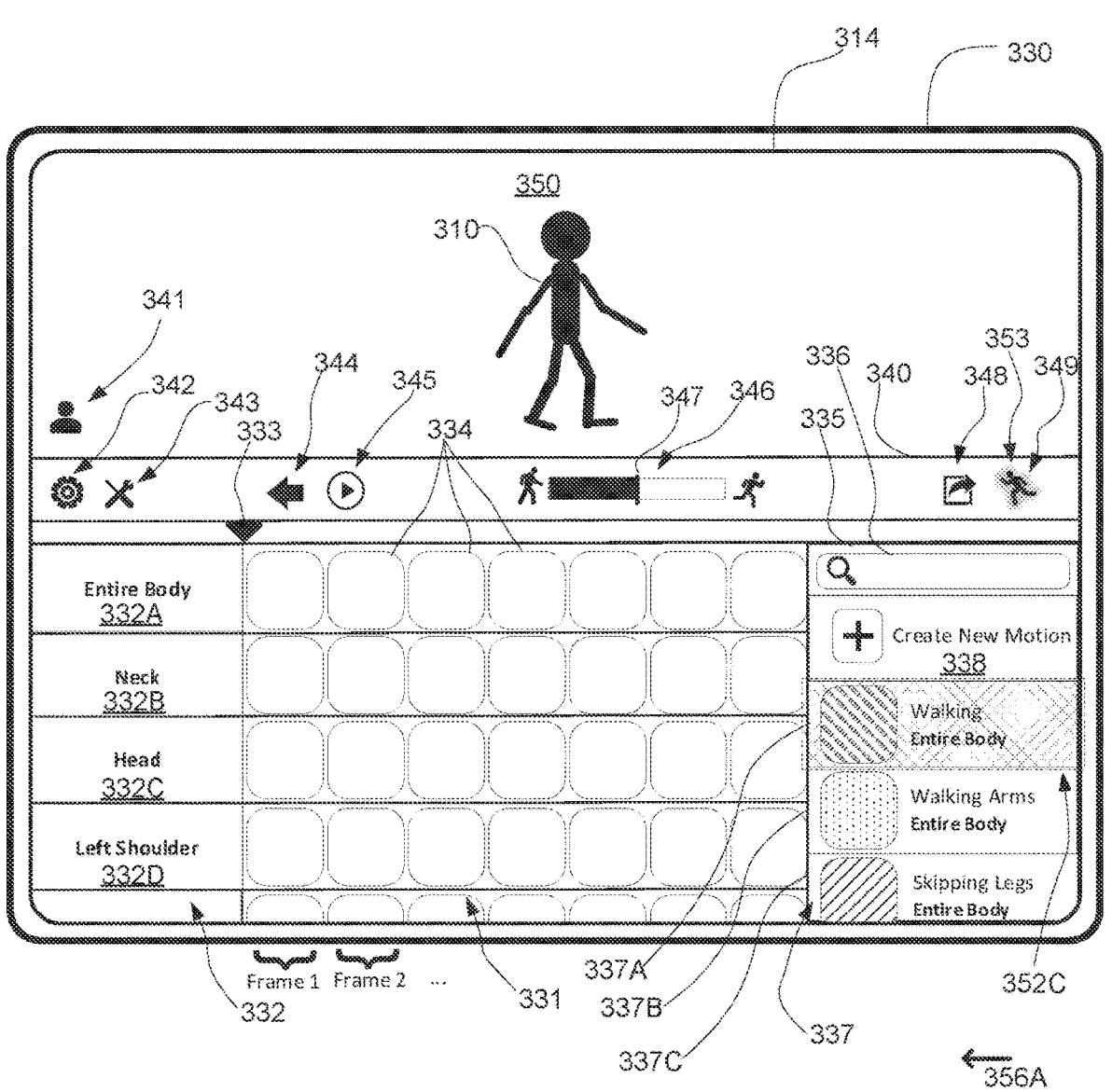
Figure 3D:
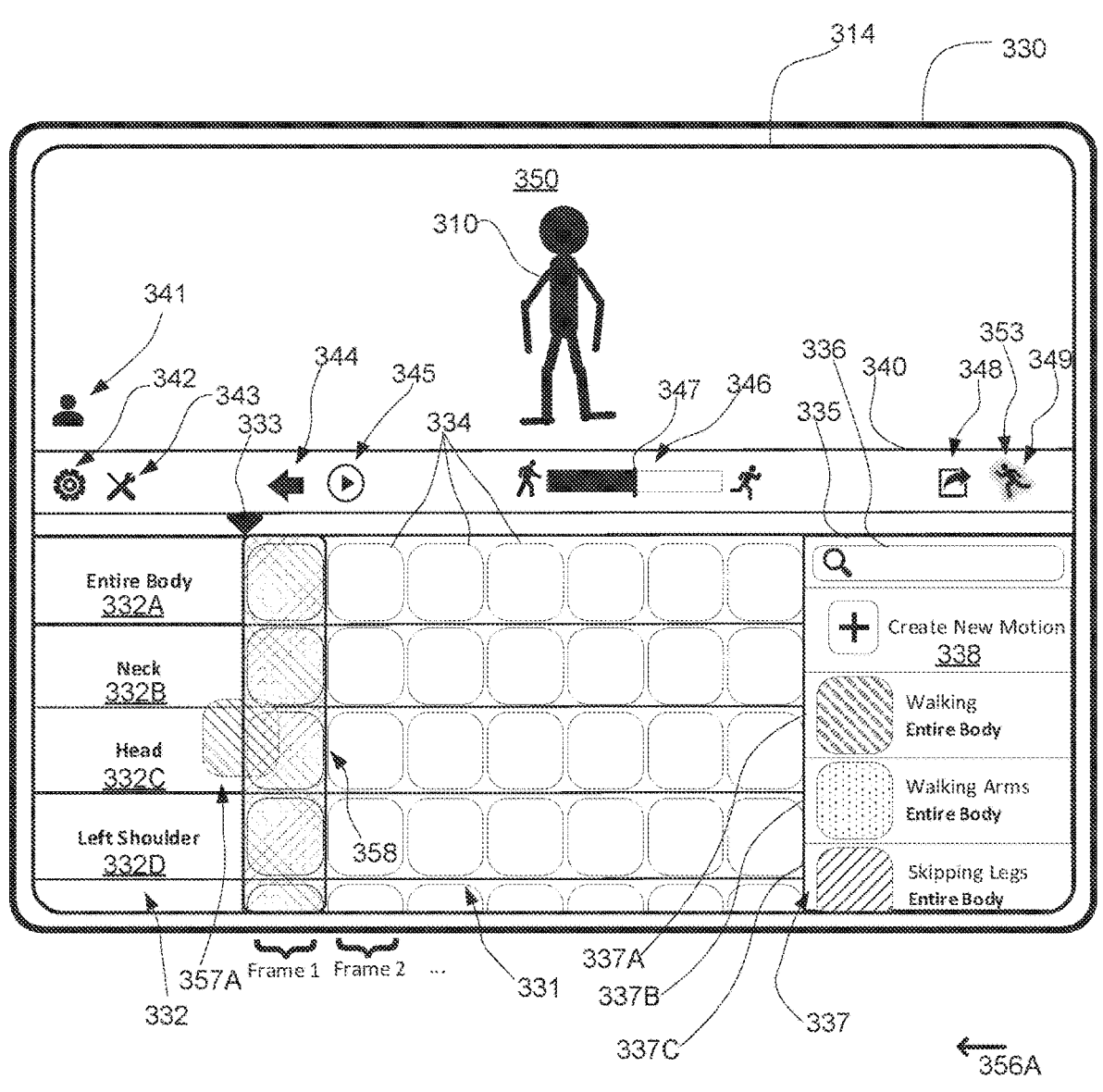
Figure 3E:
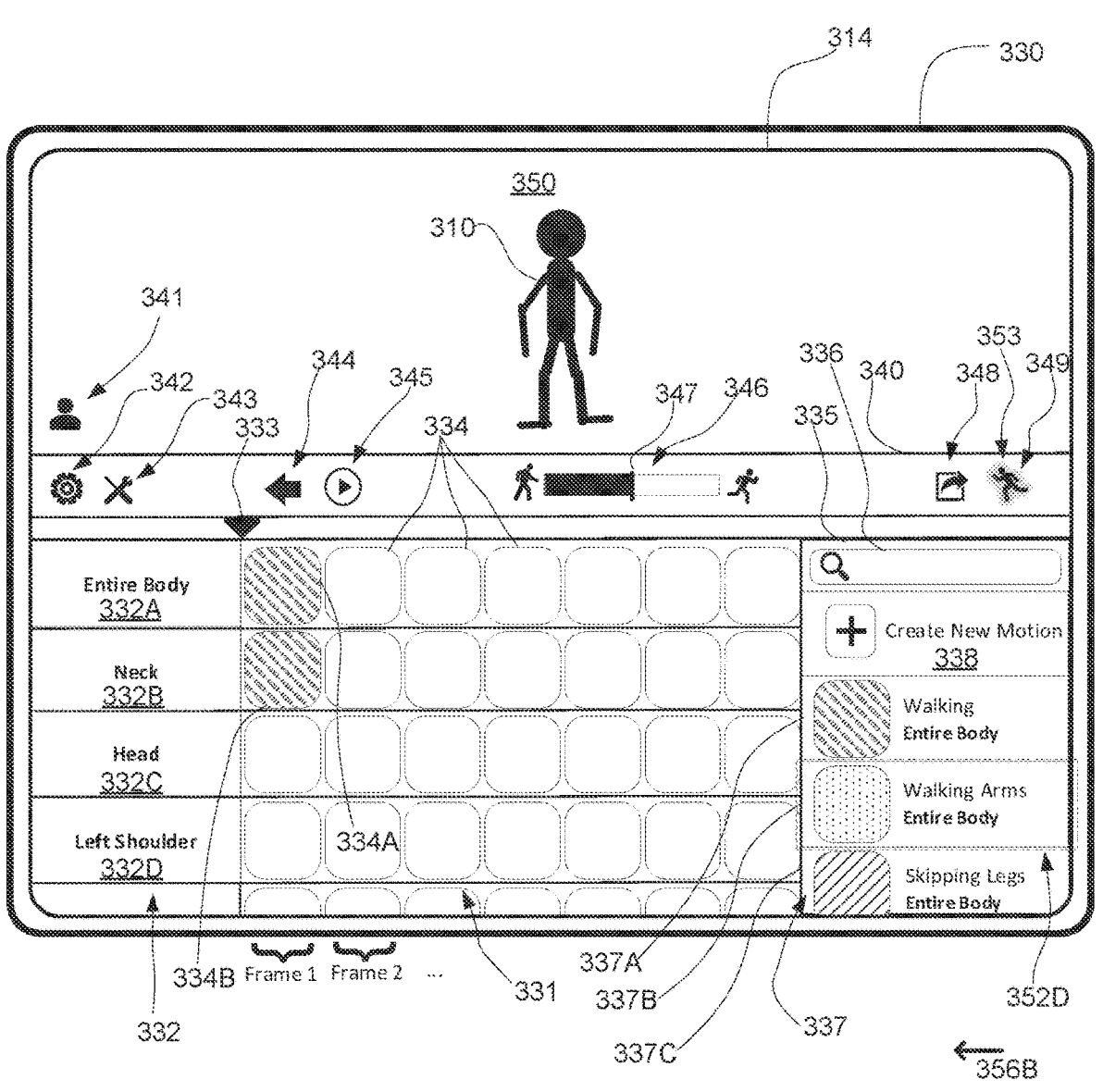
Figure 3F:
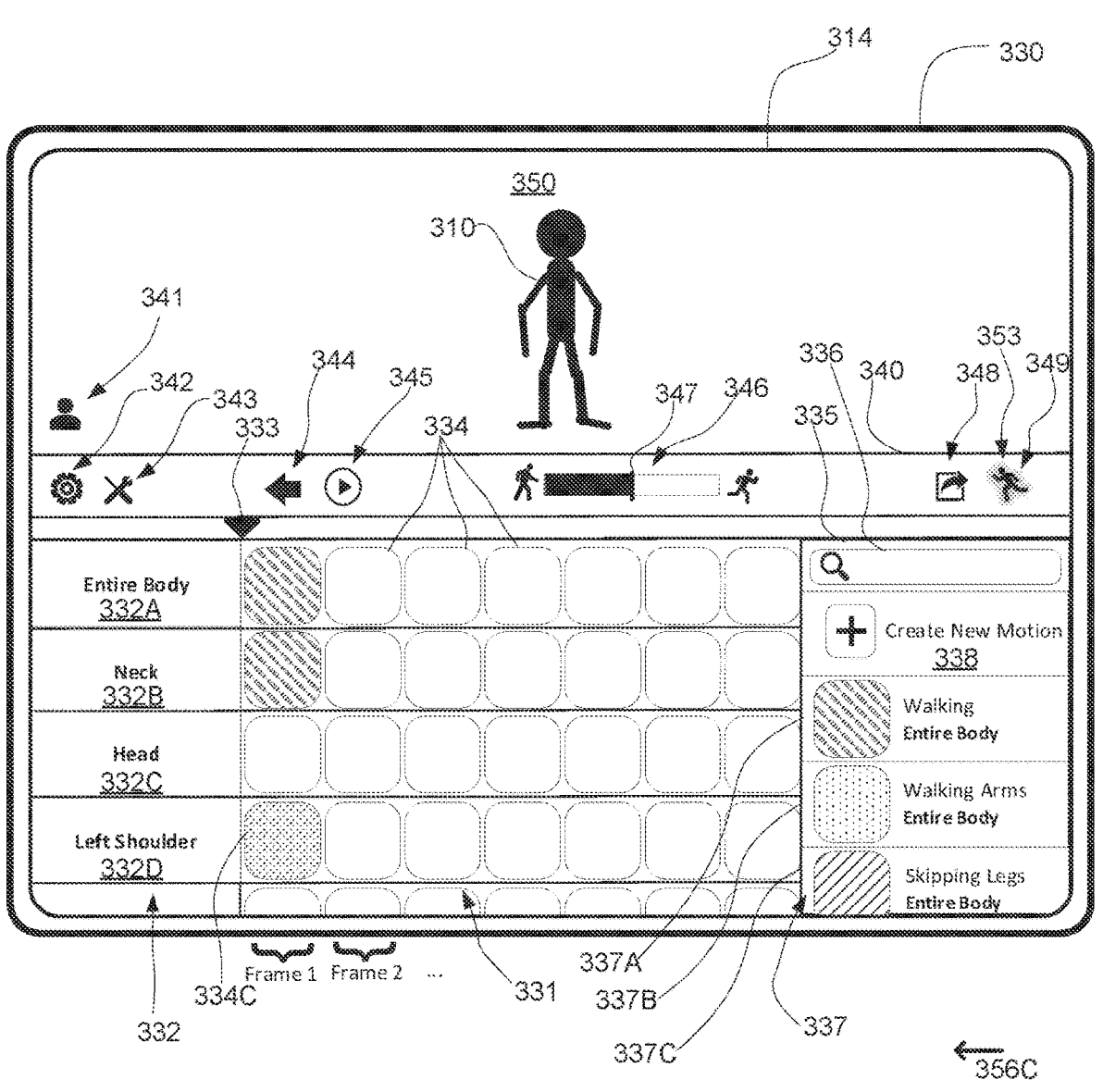
Figure 3G:
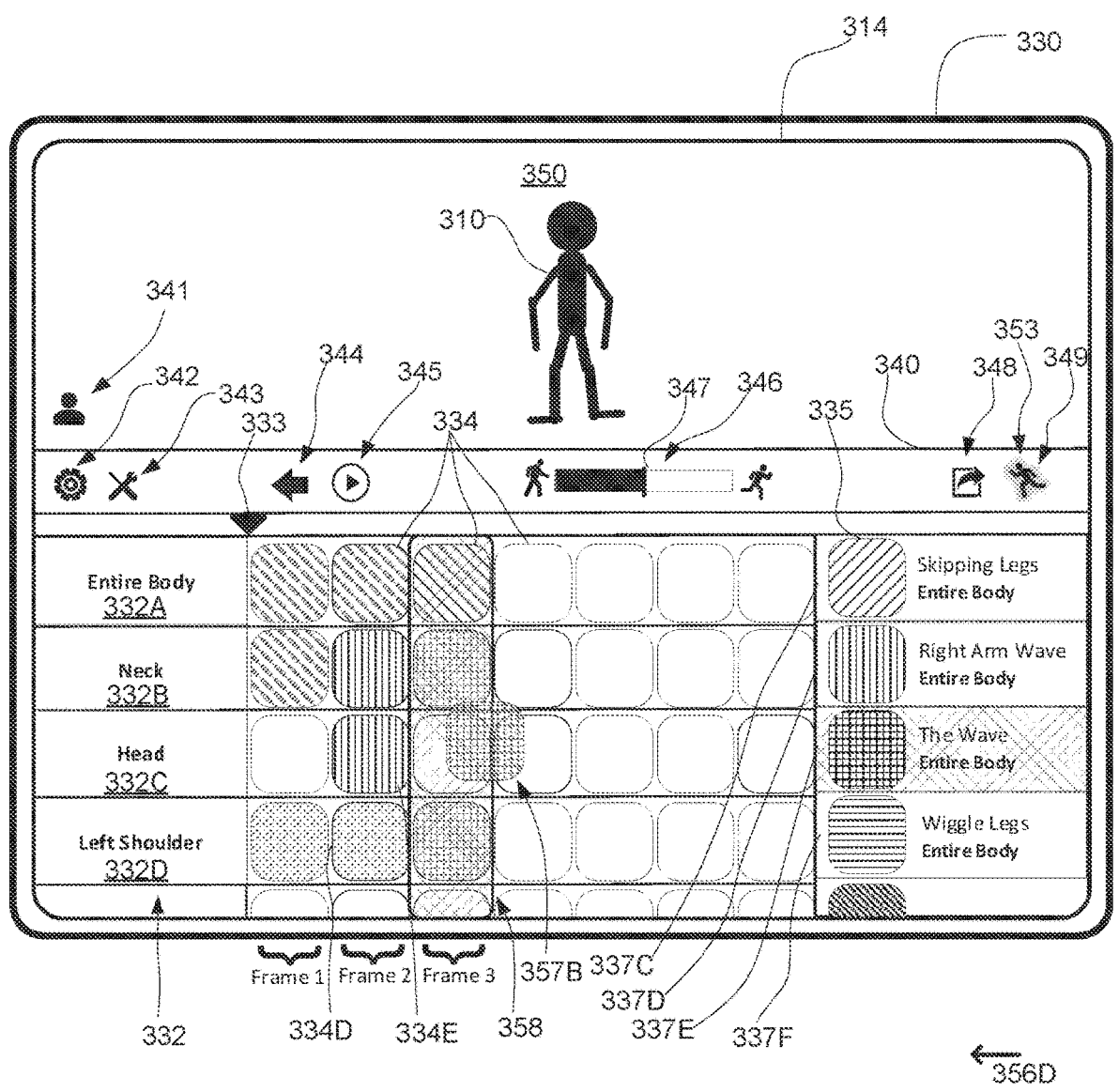
Figure 3H:
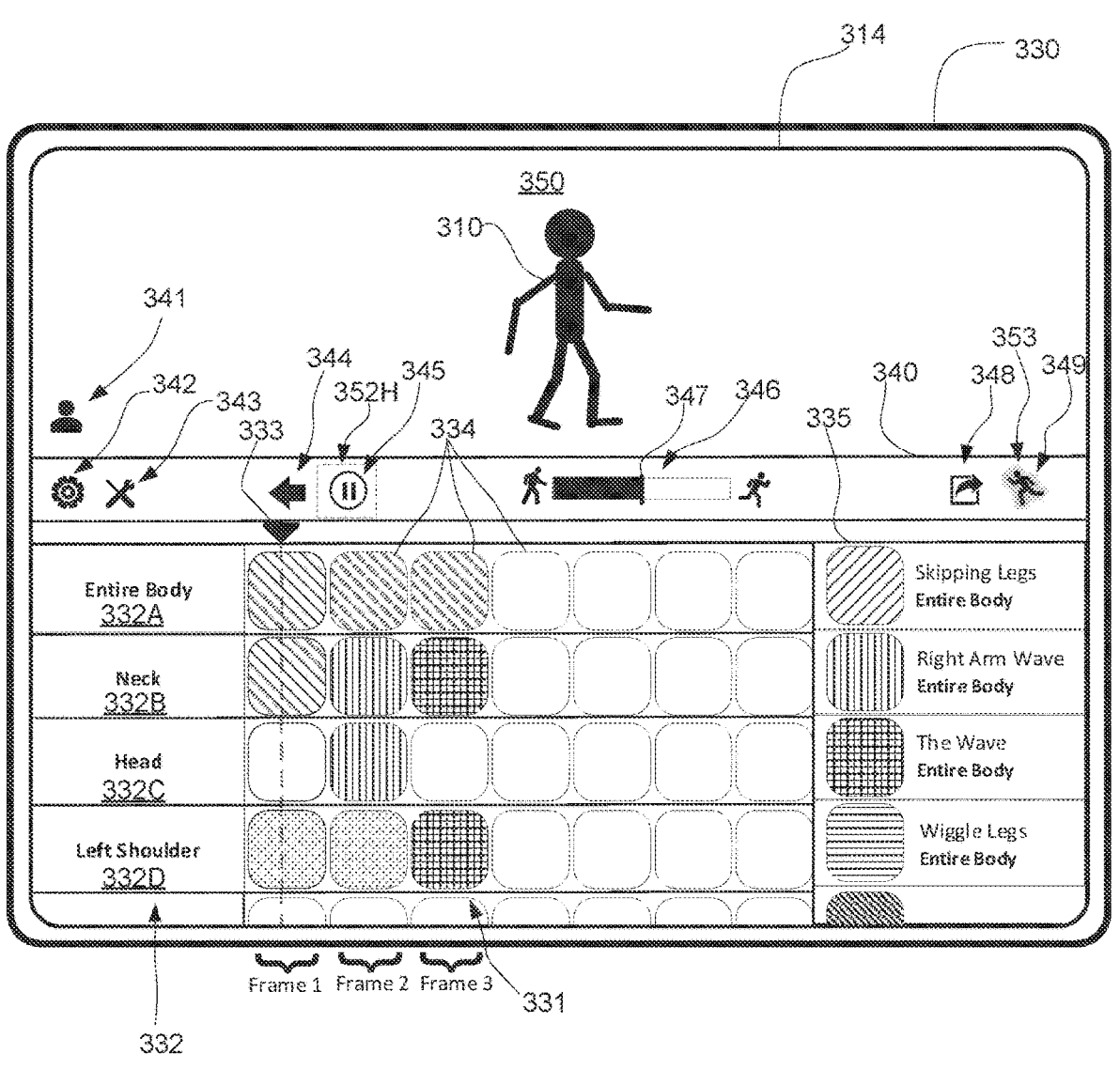
Figure 3I:
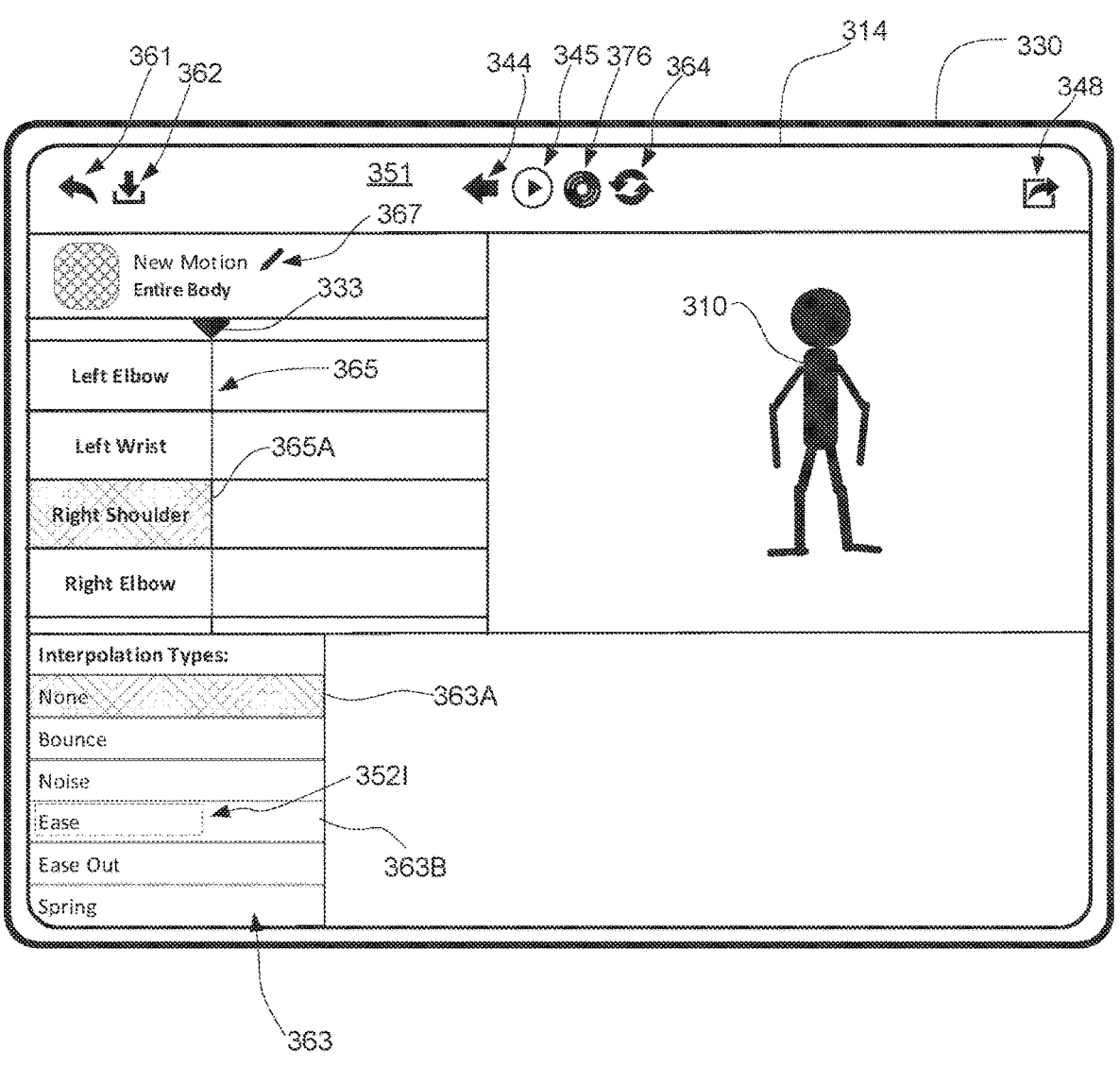
Figure 3J:
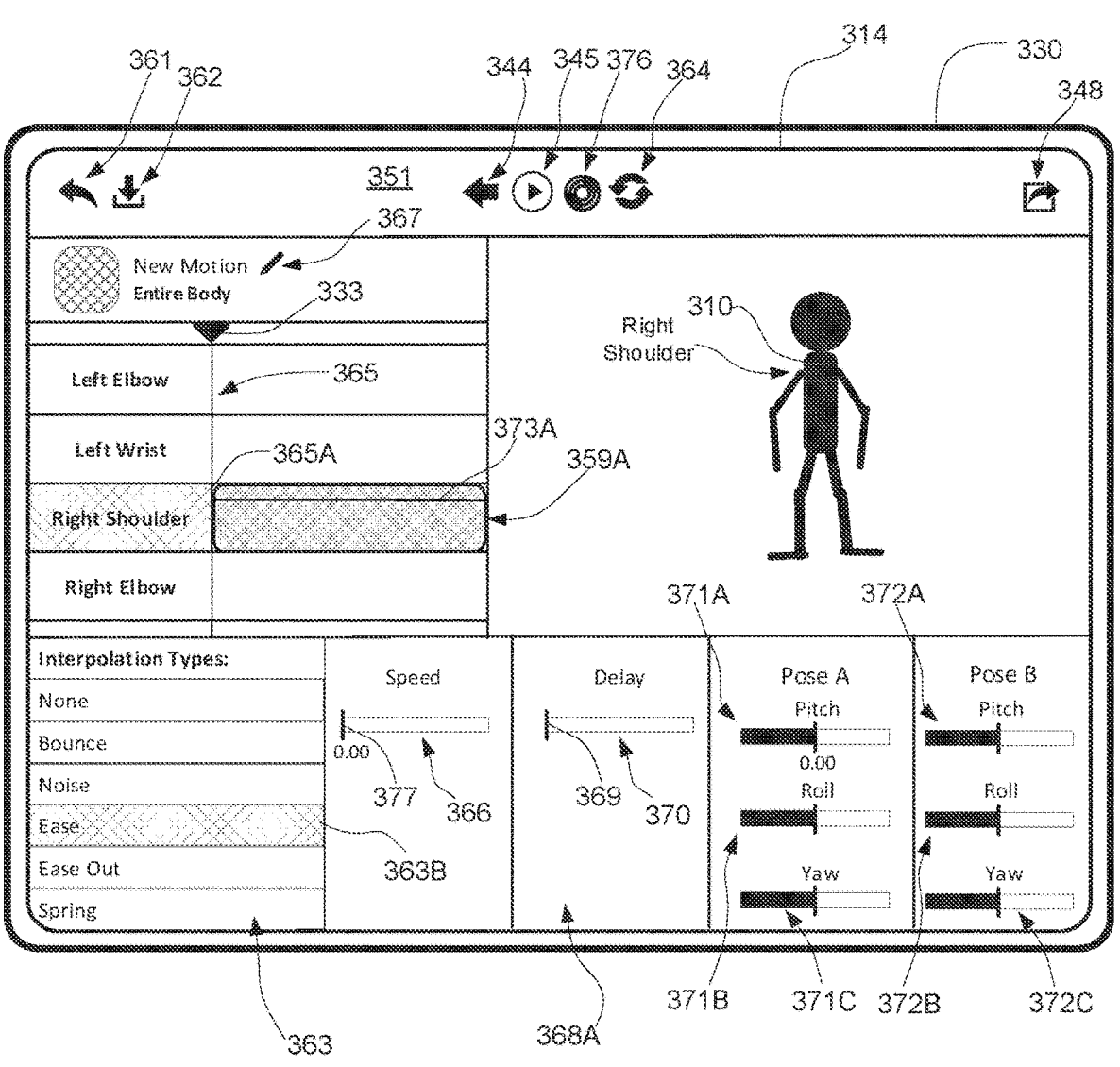
Figure 3K:
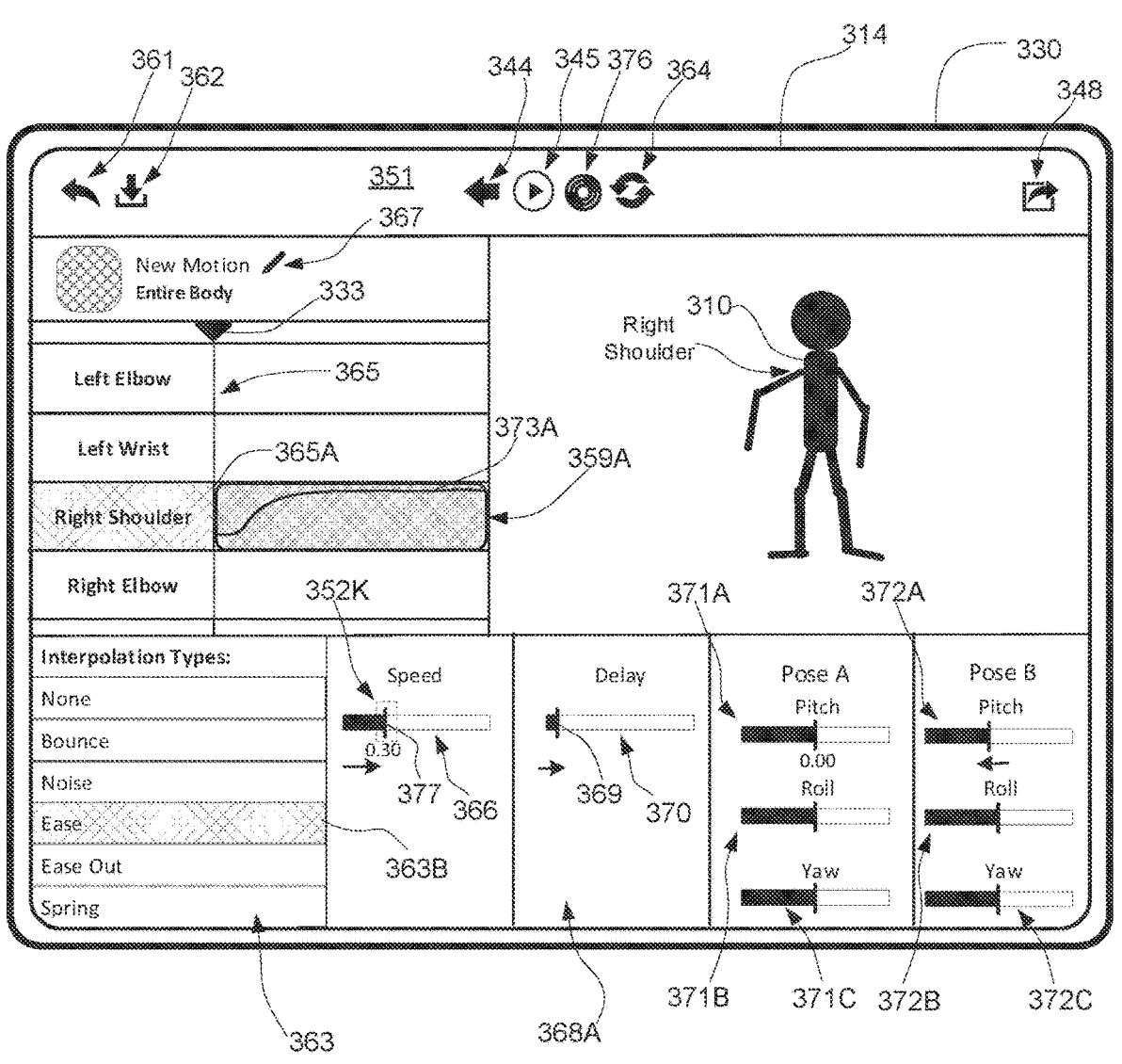
Figure 3L:
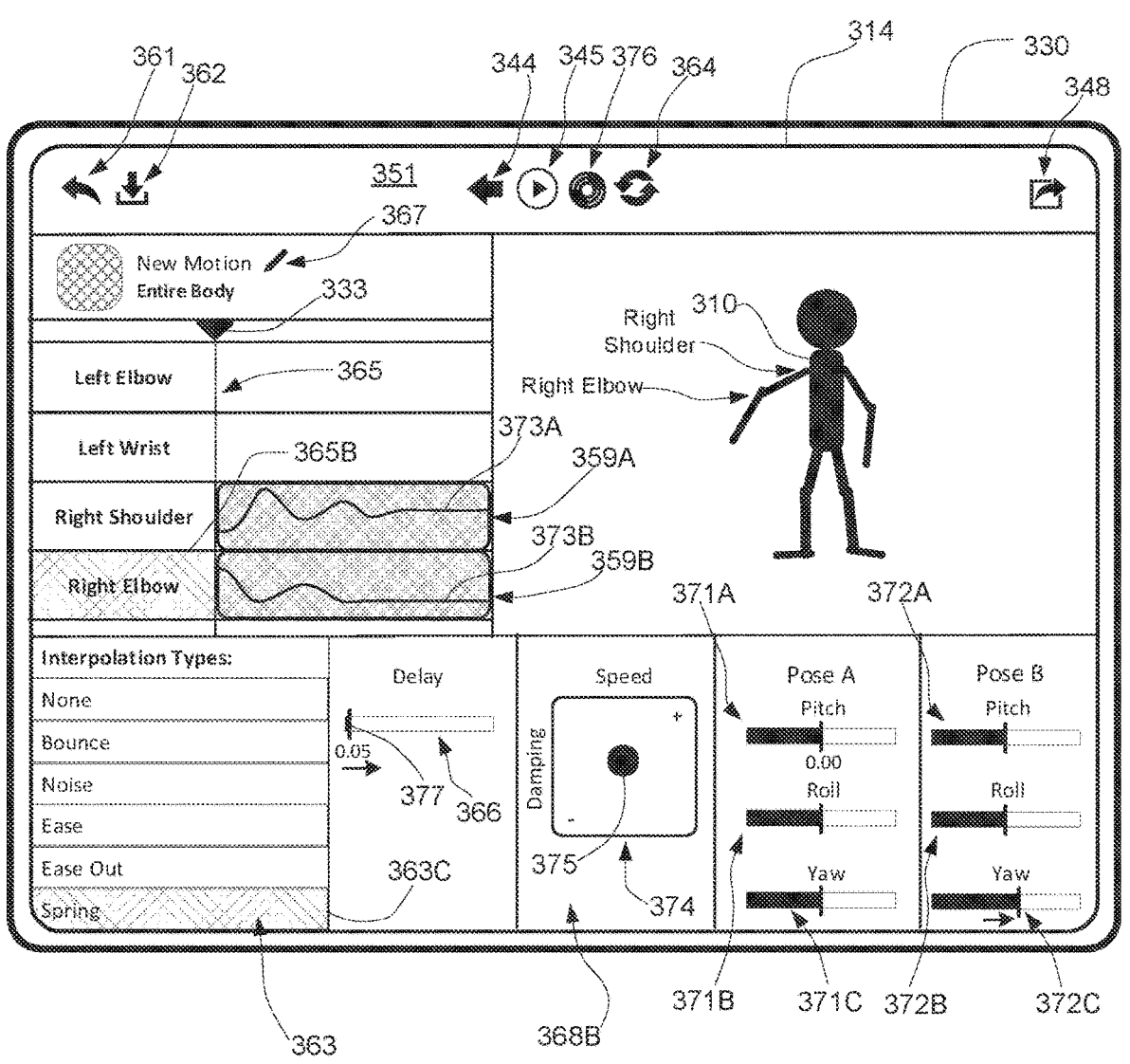
Figure 3M:
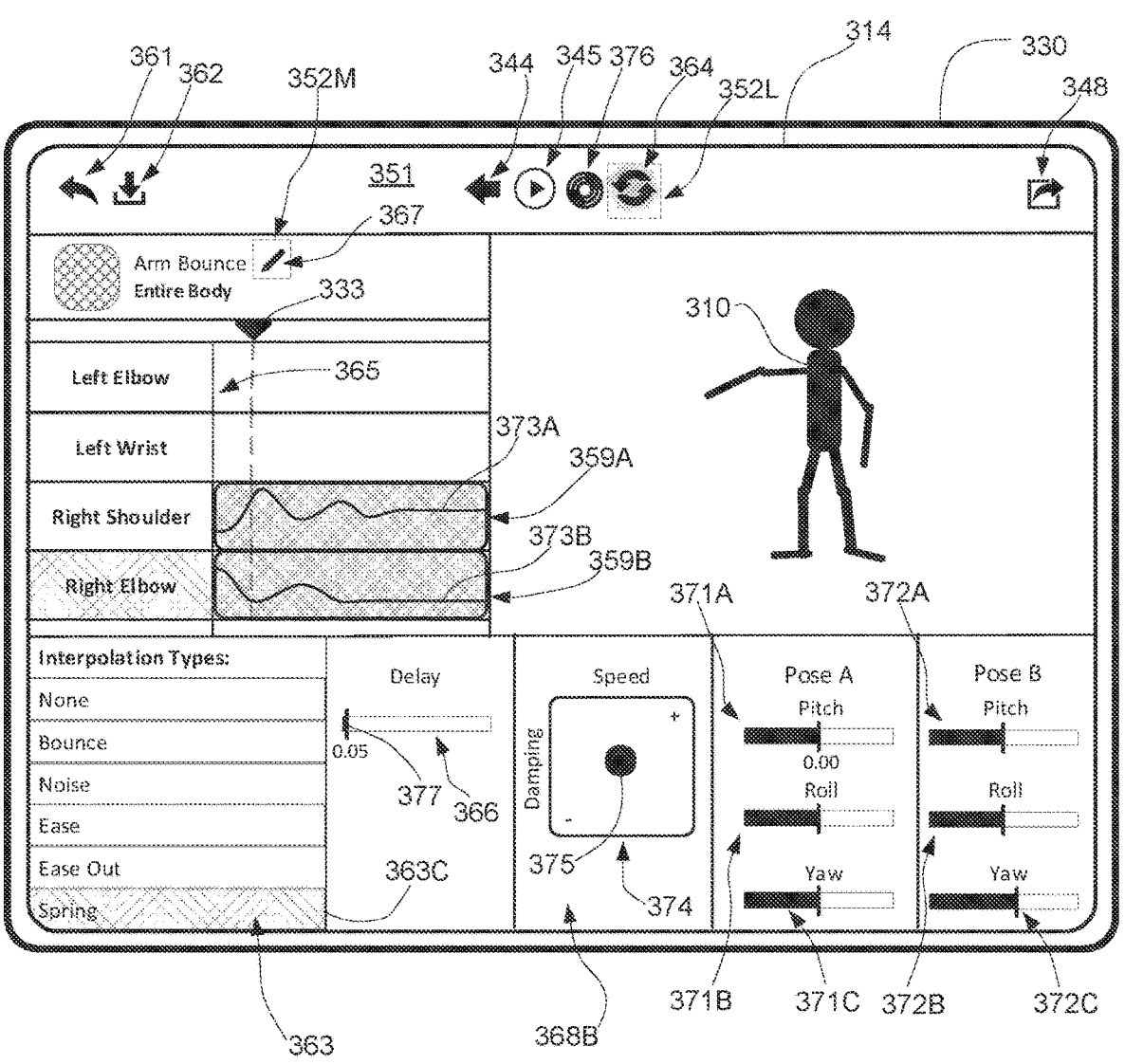
Figure 3N:
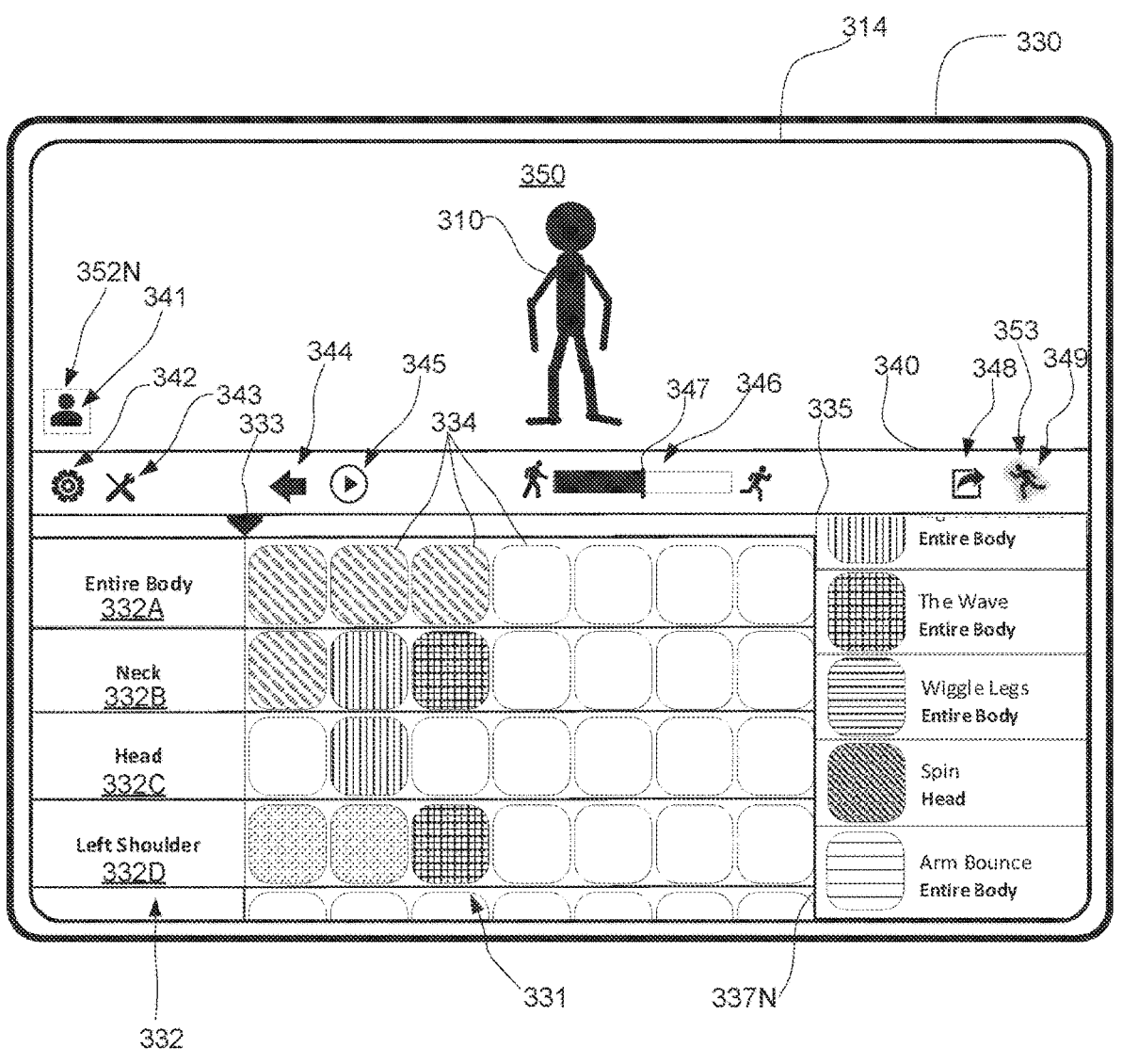
Figure 3O:
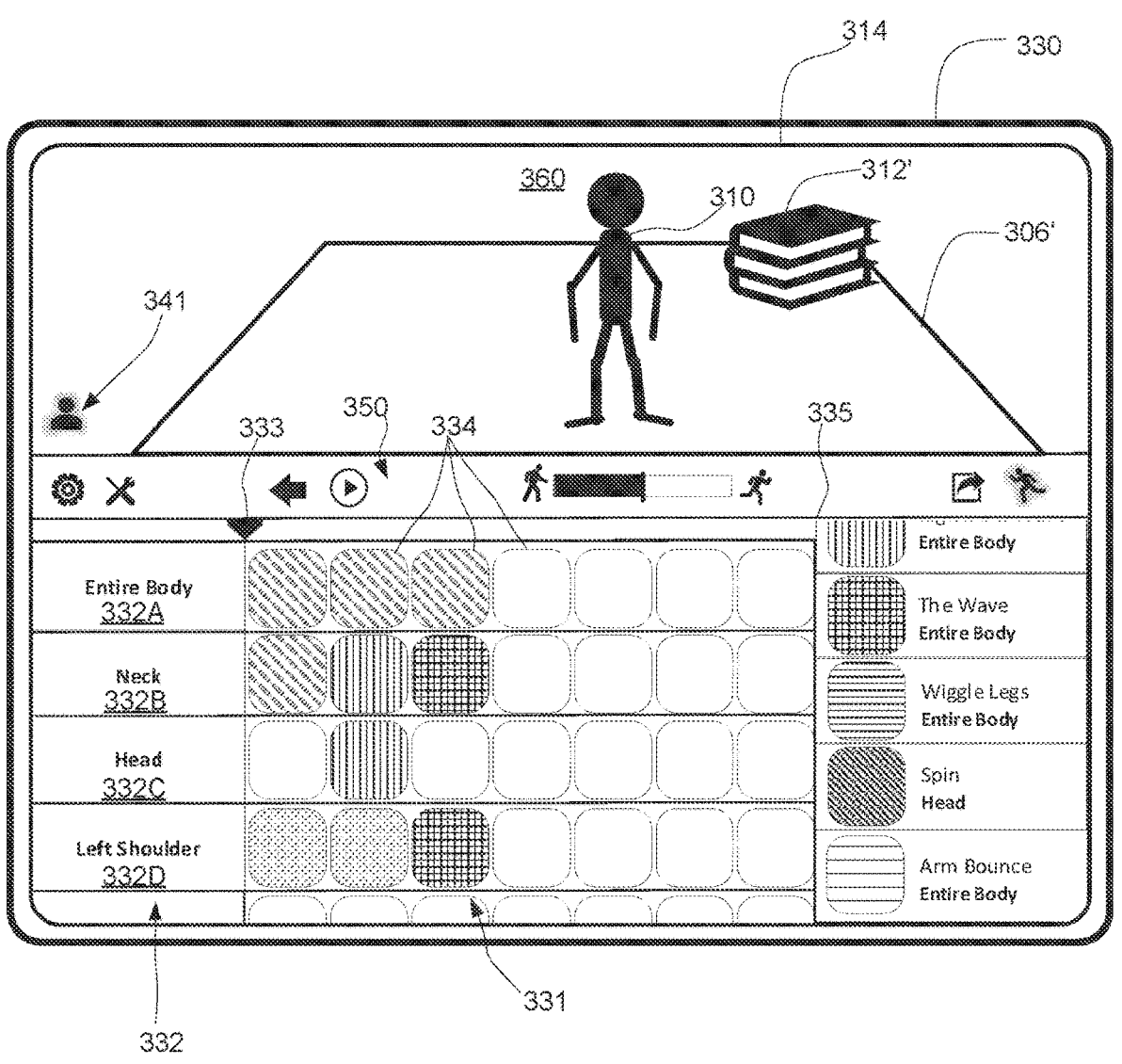

FIGS. 3A-3O illustrate example interactions with a graphical user interface of a motion editing and creation application on an electronic device according to some examples of the disclosure. In some examples, the electronic device 330 optionally corresponds to device 101 or 220/230, and/or may be a laptop computer, a desktop computer, and/or a tablet computer. In the example of FIGS. 3A-3O, the electronic device is optionally in communication with a display 314 (e.g., corresponding to display generation component 214B in FIG. 2) and/or one or more input devices (e.g., a mouse, a trackpad, a keyboard, etc.). In some examples, the display 314 is optionally integrally formed with the electronic device 330 and/or includes a touch-sensitive surface (e.g., corresponding to touch sensitive surface 209B).

FIG. 3A illustrates an animation editor user interface 350 displayed via display 314 of the electronic device 330. In some examples, the animation editor user interface 350 is optionally associated with a content creation application running on the electronic device 330. For example, the animation editor user interface 350 may be displayed on the display 314 in response to selection of an application icon displayed on the display 314 (e.g., in a home screen user interface of electronic device 330). As shown in FIG. 3A, the animation editor user interface may include a first object 310. In some examples, the first object 310 may be a virtual agent that may be configured to be animated (e.g., perform motion) according to a plurality of motion effects, as discussed below. In some examples, the first object 310 may be a digital model imported into the content creation application. In some examples, the first object 310 may be or include three-dimensional data, such as a three-dimensional point cloud. In some examples, the first object 310 may be a scan or captured image of a real-world object (e.g., a physical object, such as a table, a chair, a lamp, a desktop computer, a laptop computer, a cup, etc.). In some examples, the first object 310 may be displayed in a presentation region of the animation editor user interface 350, such as a top or upper region, as shown in FIG. 3A. In the example of FIG. 3A, the first object 310 is optionally displayed with a first pose in the animation editor user interface. In some examples, the first pose is optionally a resting pose or a default pose.

In some examples, the animation editor user interface 350 may include an animation timeline 331 including a plurality of cells 334. As shown in FIG. 3A, the plurality of cells 334 may be arranged in a grid format within the animation timeline 331. For example, as shown, the plurality of cells 334 may be divided into a plurality of rows and columns within the animation timeline 331. In some examples, the animation timeline 331 may be scrollable (e.g., in a downward direction) to reveal additional rows of cells 334. In some examples, each column of the animation timeline 331 corresponds to a respective time frame. For example, as shown in FIG. 3A, a first column in the animation timeline optionally corresponds to a first time frame ("Frame 1"), a second column, after the first column, optionally corresponds to a second time frame ("Frame 2"), after the first time frame, and so on. In some examples, each time frame may represent a predefined duration within the animation timeline 331. For example, each time frame corresponds to a 3-second interval, a 5-second interval, a 10-second interval, a 30-second interval, etc. In some examples, each time frame is equal in duration, such that a duration of the first time frame is equal to that of the second time frame.

In some examples, each row of the animation timeline 331 corresponds to a respective portion of the first object 310. For example, as shown in FIG. 3A, the animation editor user interface 350 optionally includes a plurality of user interface objects 332 identifying a plurality of portions (e.g., joints, segments, parts, etc.) of the first object 310. In some examples, the plurality of user interface objects 332 are predefined and are identified (e.g., labeled) by the electronic device 330 according to an anatomy or structure of the first object 310. For example, the first object 310 is optionally a humanoid, and thus includes a body (corresponding to user interface object 332A (labeled "Entire Body")), a neck (corresponding to user interface object 332B (labeled "Neck")), a head (corresponding to user interface object 332C (labeled "Head")), a left shoulder (corresponding to user interface object 332D (labeled "Left Shoulder")), and so on, as shown in FIG. 3A. In some examples, the labels assigned to the plurality of user interface objects 332 are equivalents of particular joints/portions of the object identified by the electronic device 330. For example, in some scenarios, the first object 310 may alternatively be a non-humanoid character (e.g., an animal, a bug, an insect, a flower, etc.), an inanimate object (e.g., a cup, a table, a lamp, a chair, etc.), a textual representation (e.g., the word "Hello"), and the like. In such scenarios, the portions/joints of the object identified by the plurality of user interface objects 332 may be representative, rather than refer to actual or literal anatomical parts. For example, the user interface object 332D ("Left Shoulder") may represent/refer to a portion of a butterfly character that is between a left wing and a body of the butterfly, and/or the user interface object 332C ("Head") may represent/refer to a portion of a textual representation of the word "Hello" that includes the topmost ends of the letters "H," "e," "l," "l," and/or "o" in the word "Hello." It should be understood that, in some examples, the labels assigned to the plurality of user interface objects 332 may be different from those shown in FIG. 3A. Additionally, it should be understood that, in some examples, the labels assigned to the plurality of user interface objects 332 for a given row may refer to multiple portions/joints of the object depending on the character that is being animated within the animation editor user interface 350. As discussed herein below, each portion/joint of the first object 310 may be animated according to a user-selected motion effect to produce movement/motion of the first object 310.

As shown in FIG. 3A, the animation editor user interface 350 may further include a controls toolbar 340 that comprises a plurality of selectable options for controlling an animation of the first object 310. For example, the controls toolbar 340 optionally includes a settings option 342 that is selectable to initiate processes for (e.g., display user interfaces for) saving data corresponding to the animation of the first object 310, altering an appearance of the animation editor user interface 350, and/or launching/opening previously saved projects saved within memory of the electronic device 330. In some examples, the controls toolbar 340 further includes a tools option 343 that may be selectable to initiate a process for altering an appearance of the first object 310, selecting a new character/object to replace the first object 310 (e.g., from an existing library of characters/objects), and/or uploading a new character/object to replace the first object 310 (e.g., from another application and/or from memory of the electronic device 330). In some examples, the controls toolbar 340 also includes a reset option 344, which is optionally selectable to reset an animation of the first object 320. For example, the animation timeline 331 optionally includes a play head scrubber 333 that marks a current time within the animation timeline 331. In the example of FIG. 3A, the play head scrubber 333 is currently positioned at a beginning of the animation timeline 331 (e.g., at time "0"). In some examples, when the play head scrubber 333 is positioned at a different location (e.g., farther along) the animation timeline 331, the electronic device 330 may move the play head scrubber 333 back to the beginning of the animation timeline 331 in response to receiving a selection of the reset option 344.

In some examples, the controls toolbar 340 further includes an animation speed bar 346 having a selectable scrubber bar 347, as shown in FIG. 3A. For example, the user of the electronic device 330 may select the scrubber bar 347 and move the scrubber bar 347 in a first direction (e.g., a rightward direction) within the speed bar 346 to increase a speed of the animation of the first object 310, and/or move the scrubber bar 347 in a second direction, different from the first direction (e.g., a leftward direction), within the speed bar 346 to decrease the speed of the animation of the first object 310. In some examples, the controls toolbar 340 may also include a share option 348, as shown in FIG. 3A. In some examples, the share option 348 may be selectable to initiate a process to share data corresponding to the animation of the first object 310 with a second electronic device and/or a second user (e.g., via email, messages, cloud storage upload, etc.). As shown in FIG. 3A, the controls toolbar 340 may also include a motions option 349. As discussed in more detail below, the motion option 349 may be selectable to display a library of motion effects within the animation editor user interface 350.

In some examples, as shown in FIG. 3A, the animation editor user interface 350 may include a presentation option 341 displayed within the presentation region of the animation editor user interface 350. As discussed in more detail with reference to FIG. 3O, the presentation option 341 is optionally selectable to cause the electronic device 330 to present the first object 310 as a three-dimensional object in a computer-generated environment (e.g., within a pass-through environment displayed in the presentation region). In FIG. 3A, the user of the electronic device 330 is optionally providing a selection input 352A directed toward the motions option 349 of the controls toolbar 340. For example, the electronic device 330 receives a tap or touch input detected on at touch-sensitive surface of the display 314 at a location associated with the motions option 349, a click input detected via a mouse or trackpad, a verbal command, etc.

In some examples, in response to receiving the selection input 352A, the electronic device 330 displays a library 335 of a plurality of motion effects within the animation editor user interface 350, as shown in FIG. 3B. For example, as shown, the library 335 may be displayed over a portion of the animation timeline 331. Additionally, in some examples, in response to receiving the selection input 352A, the electronic device 330 may display the motions option 349 with a visual effect (e.g., highlighting, blurring, bolding, etc.), as indicated by highlight 353, to indicated selection of the motions option 349. In some examples, the library 335 includes representations of a plurality of motion effects 337. For example, the plurality of motion effects 337 optionally define movement and/or motion for the first object 310. In some examples, the plurality of motion effects 337 may be predefined/preconfigured for the first object 310. For example, as shown in FIG. 3B, the plurality of motion effects 337 includes a first motion effect 337A, a second motion effect 337B, a third motion effect 337C, and so on, presented as a scrollable list within the library 335. In some examples, the representations of the plurality of motion effects 337 each optionally includes an icon 354 and/or a label 355. In some examples, the icon 354 and/or the label 355 may identify the motion associated with a respective motion effect. For example, as discussed above with reference to FIG. 3A, each row of the animation timeline 331 may designate a particular portion or portions of the first object 310 that may be animated. The label 355 of the first motion effect 337A, for example, optionally identifies the motion ("Walking") associated with the first motion effect 337A, as well as the portion/portions of the first object ("Entire Body") that can be animated to perform the motion. For example, as shown in FIG. 3B, the walking motion associated with the first motion effect 337A can be applied to the portion identified by user interface object 332A ("Entire Body") in the first row of the animation timeline 331 to cause the first object 310 to perform the walking motion, as discussed in more detail below. In some examples, the designation "Entire Body" optionally refers to two or more portions of the first object 310, such as a right leg and a left leg of the first object 310, and/or a right foot and a left foot of the first object 310. In some examples, the plurality of motion effects 337 may be suggested motion effects for the user. For example, the electronic device 330 may include and/or prioritize display of the representations of the plurality of motion effects 337 based on motion effects already included in the animation timeline 331 (e.g., discussed in more detail below), an animation speed of a previous motion effect included in the animation timeline 331, motion effect type (e.g., groups of related motion effects (e.g., related based on joints of the first object 310, movement/motion type, animation speed, etc.) may be displayed together within the library 335), animation history (e.g., from previous and/or similar animation projects), popularity (e.g., based on usage by multiple users), etc.

As shown in FIG. 3B, in some examples, the library 335 may include a motion creation option 338 that is selectable to initiate a process for creating a new/custom motion effect for animating the first object 310. For example, as discussed in more detail with reference to FIG. 3I, selection of the motion creation option 338 may cause the electronic device 330 to display a motion creation user interface for creating the new motion effect. Additionally, as shown in FIG. 3B, the library 335 may include a search bar 336 through which the user may input a search query for particular motion effects (e.g., using a digital or physical keyboard in communication with the electronic device 330, a verbal command, etc.). In some examples, the user of the electronic device 330 may preview a particular motion effect by selecting the representation corresponding to the particular motion effect in the library 335. For example, as shown in FIG. 3B, the user of the electronic device 330 may provide a selection input (e.g., a tap or touch input, click input, verbal command, gesture, etc.) 352B directed to the representation of the first motion effect 337A.

In some examples, as shown in FIG. 3C, in response to receiving the selection input 352B, the electronic device 330 optionally causes the first object 310 to perform the motion associated with the first motion effect 337A (e.g., in the presentation region). Additionally, in some examples, in response to receiving the selection input 352B, the electronic device 330 may display the representation of the first motion effect 337A with a visual effect, such as highlight, as shown in FIG. 3C. In some examples, the first object 310 may continuously (e.g., for an unlimited duration) perform the walking motion associated with the first motion effect 337A until a subsequent input is received (e.g., selection of a representation of a different motion effect in the library 335). In some examples, a respective motion effect may be added to the animation timeline 331 to animate the first object 310 according to the motion associated with the respective motion effect. For example, as shown in FIG. 3C, the user of the electronic device 330 is optionally providing a selection input (e.g., a tap or touch input, click input, verbal command, gesture, etc.) 352C directed to the representation of the first motion effect 337A, followed by movement input 356A in a respective direction. For example, after the selection input 352C, the electronic device 330 detects movement of the representation of the first motion effect 337A (e.g., a drag of a finger of the hand of the user across the display 314 of the electronic device 330 or the touch-sensitive surface of a trackpad, or movement of a mouse) in a leftward direction.

In some examples, as shown in FIG. 3D, in response to receiving the selection input 352C and/or the movement input 356A, the electronic device 330 displays a ghost representation 357A of the first motion effect 337A. Additionally, as shown in FIG. 3D, in response to receiving the selection input 352C and/or the movement input 356A, the first object 310 optionally no longer performs the walking motion associated with the first motion effect and returns to the first/default pose. As shown in FIG. 3D, in accordance with the movement input 356A, the ghost representation 357A of the first motion effect 337A is moved at least partially over a respective cell of the plurality of cells 334 in the first column of the animation timeline 331. In some examples, in response to detecting the movement of the ghost representation 357A to the respective cell within the first column of the animation timeline 331, the electronic device 330 visually emphasizes (e.g., highlights/selects/ boldens) the first column of the animation timeline 331, as indicated by highlight 358. In some examples, while the first column of the animation timeline 331 is visually emphasized, release of the ghost representation 357A of the first motion effect 337A optionally adds the representation of the first motion effect 337A to one or more rows of the first column, as discussed below.

In some examples, in response to detecting release of the selection input 352C and/or the movement input 356A (e.g., detecting liftoff from the touch-sensitive surface of the display 314 or trackpad, or a release of the click on the mouse), the electronic device 330 populates cells of one or more rows of the first column of the animation timeline with the representation of the first motion effect 337A, as shown in FIG. 3E. As discussed above, the first motion effect 337A optionally corresponds to a walking motion for the "Entire Body" of the first object 310. Accordingly, as shown in FIG. 3E, the representation of the first motion effect 337A populates a first cell 334A and a second cell 334B that intersects a first row corresponding to the user interface object 332A and a second row corresponding to the user interface object 332B, respectively, within the first column. Additionally, the electronic device 330 animates the first object 310 for the first time frame according to the motion effects displayed in the first column of the animation timeline 331. For example, for the first time frame of the animation timeline 331, the "Entire Body" (corresponding to user interface object 332A) and the "Neck" (corresponding to the user interface object 332B) of the first object 310 are animated to perform a walking motion in accordance with the first motion effect 337A. It should be understood that, in some examples, the user interface object 332A identifying the "Entire Body" of the first object 310 may be populated with a representation of a motion effect to animate all portions of the first object 310 according to the motion effect. In some such examples, only the cell (e.g., first cell 334A) corresponding to the row of the user interface object 332A may be populated in a respective column of the animation timeline 331 rather than every cell corresponding to every row of the user interface objects 332 in the respective column.

In some examples, multiple motion effects may be added to the same column to overlay animations of the first object 310 during a respective time frame. For example, as shown in FIG. 3E, the user of the electronic device 330 is providing a selection input 352D directed to the representation of the second motion effect 337B (e.g., corresponding to "Walking Arms" motion), followed by movement input 356B corresponding to movement of the representation of the second motion effect 337B toward the first column of the animation timeline 331 and release of the representation of the second motion effect 337B over the first column.

In some examples, in response to receiving the selection input 352D, movement input 356B, and/or release of the representation of the second motion effect 337B, the electronic device 330 adds the representation of the second motion effect 337B to the first column of the animation timeline 331. For example, as shown in FIG. 3F, the representation of the second motion effect 337B is added to a third cell 334C of the plurality of cells 334 that intersects a third row corresponding to the user interface object 332D (identifying "Left Shoulder") within the first column of the animation timeline 331. As discussed above, because the walking arms motion associated with the second motion effect 337B corresponds to motion of at least the left shoulder portion of the first object 310, as reflected in the first column of the animation timeline 331, the electronic device 330 animates the left shoulder portion of the first object according to the walking arms motion effect. It should be understood that additional or alternative portions of the first object 310 may be animated according to the walking arms motion effect that are not illustrated in the example of FIG. 3F. For example, a right shoulder, a left elbow, and/or a right elbow portions may also be animated to perform the walking arms motion, but the user interface objects 332 of which are displayed lower in the animation editor user interface 350 (e.g., currently out of view in the example of FIG. 3F), and thus would also be displayed with representations of the second motion effect 337B.

In some examples, adding a representation of a respective motion effect to a column within the animation timeline 331 that already includes one or more motion effects may cause the electronic device 330 to overwrite the previous one or more motion effects. For example, with reference to FIG. 3F, if the representation of the third motion effect 337C (corresponding to "Skipping Legs" motion) were added to the first column of the animation timeline 331 (e.g., in addition to or instead of the representation of the second motion effect 337B), the electronic device 330 may replace the representation of the first motion effect 337A in the cells 334 of the first column with the representation of the third motion effect 337C. Accordingly, in some such examples, the electronic device 330 may animate the relevant portions of the first object 310 (e.g., the "Entire Body" and/or the "Neck," among others) according to the skipping legs motion rather than the walking motion. In some examples, individual representations of motion effects may be deleted/removed from individual cells 334 of the animation timeline 331. For example, the user of the electronic device 330 may select the third cell 334C in the first column of the animation timeline 331, which optionally causes the electronic device 330 to display a delete option (e.g., an "X" or "Delete" affordance) that is selectable to remove the representation of the second motion effect 337B from the third cell 334C and remove the walking arms animation from the left shoulder portion of the first object 310 over the first time frame.

In some examples, the user of the electronic device 330 may add motion effects to alternative and/or subsequent columns within the animation timeline 331 to animate the first object 310 over alternative and/or subsequent time frames in the animation timeline 331. For example, the user of the electronic device 330 may provide additional movement inputs 356C directed to representations of respective motion effects 337 within the library 335 and release the representations of the respective motion effects 337 over a second, third, fourth, etc. column within the animation timeline 331, as shown in FIG. 3G. For example, as shown in FIG. 3G, the user of the electronic device 330 has added first motion effect 337A (corresponding to "Walking" motion) to the second column and the third column in the animation timeline 331, motion effect 337D (corresponding to "Right Arm Wave" motion) to the second column in the animation timeline 331, and second motion effect 337B (corresponding to "Waving Arms" motion) to the second column in the animation timeline 331. In the example of FIG. 3G, the user of the electronic device 330 is adding (e.g., via movement input 356D) motion effect 337E (corresponding to "The Wave" motion), represented by ghost representation 357B, to the third column of the animation timeline 331, which is displayed with visual emphasis, represented by highlight 358. In some examples, in addition to visually emphasizing the column to which a respective motion effect will be added, the electronic device 330 may display previews of the representation of the respective motion effect in the cells of the column to which the representations will be added. For example, as shown in FIG. 3G, in the third column of the animation timeline 331 (corresponding to a third time frame ("Frame 3")), visual indications (e.g., translucent representations) of the motion effect 337E are optionally displayed in a cell in the second row (corresponding to user interface object 332B) and in a cell in the fourth row (corresponding to user interface object 332D) that indicate that the motion effect 337E will be added those cells in the third column of the animation timeline, as shown in FIG. 3H.

In some examples, the animated motion of the first object 310 defined according to the motion effects placed within the animation timeline 331 may be presented within the animation editor user interface 350. For example, as discussed previously with reference to FIG. 3A, the controls toolbar 340 includes the play option 345. In some examples, in response to receiving selection of the play option 345 (e.g., via selection input 352H), the animated motion of the first object 310 over the first three time frames (Frames 1-3) of the animation timeline 331 may be displayed in the presentation region of the animation editor user interface 350, as shown in FIG. 3H. In some examples, as the animation of the first object 310 is being presented in the animation editor user interface 350, the play head scrubber 333 may advance along the play head of the animation timeline 331 in accordance with an advance of the animation over the animation timeline 331. For example, in FIG. 3H, the animated motion of the first object 310 includes walking motion and walking arms motion defined by the motion effects of the first column, as reflected by the location of the play head scrubber 333. In some examples, the user of the electronic device 330 can pause the animation of the first object 310 by reselecting the play option 345, and/or can reset the animation of the first object 310 (e.g., move the play head scrubber 333 to the beginning of the animation timeline) by selecting the reset option 344 in the controls toolbar 340.

In some examples, the play head scrubber 333 may be manually moved along the play head of the animation timeline 331 to manually advance forward in the animation of the first object 310. For example, in FIG. 3G, the user of the electronic device 330 may provide a selection input followed by a movement input directed to the play head scrubber 333 to move the play head scrubber 333 from the first time frame to the third time frame to view the animation of the first object 310 at the third time frame. In some examples, as the play head scrubber 333 is moved (e.g., manually) according to the user input, the animation of the first object 310 optionally changes as the play head scrubber 333 is moved through the motion effects of the animation timeline 331.

In some examples, the plurality of cells 334 of the animation timeline 331 may be alternatively arranged in a nonsequential format. For example, the first column of the animation timeline 331 (labeled Frame 1 in FIG. 3H) may not necessarily correspond to the first motions that the first object 310 is animated to as discussed herein above. In some examples, the columns of the animation timeline 331 may be selected to play in any order (e.g., a nonsequential order and/or not necessarily the left-to-right order of columns shown and described above). In some examples, the columns shown in FIG. 3H may alternatively describe different sets/groups of motions that are selectable by the user, rather than time frames within the animation timeline 331. In some such examples, a separate animation timeline user interface (not shown) may be displayed concurrently with the plurality of cells 334 arranged in the columnar format shown in FIG. 3H (e.g., the animation timeline user interface may be displayed adjacent to, above, or below the plurality of cells 334). In some examples, when the user selects a particular column, motion effects that are associated with cells in that column will generate an animation of the first object 310, and a motion block (not shown) may be added to the animation timeline user interface (not shown) indicating that the first object 310 has been animated over a particular time frame according to the motion effects of the selected column. The user may select subsequent columns including representations of motion effects to generate animated motion of the first object 310 over subsequent time frames in the animation timeline. In some examples, in response to receiving a selection (e.g., a tap, touch, or click input) directed to a particular motion block in the animation timeline user interface (not shown), the electronic device 330 may visually emphasize (e.g., display, highlight, bolden, etc.) the cells of the column that are associated with the generated motion block.

As described above with reference to FIG. 3B, the library 335 of motion effects optionally includes a motion creation option 338 that is selectable to initiate a process for creating a new/custom motion effect for animating the first object 310. In some examples, in response to detecting selection of the motion creation option 338 (e.g., via a selection input, such as a tap, touch, click, or verbal command), the electronic device 330 may display a motion creation user interface 351, as shown in FIG. 3I. For example, the motion creation user interface 351 replaces display of the animation editor user interface 350. In some examples, the motion creation user interface 351 includes a representation of the first object 310. As shown in FIG. 3I, the motion creation user interface 351 optionally includes a plurality of control affordances. For example, as shown, the motion creation user interface 351 may include a back/return option 361 that is selectable to cause the electronic device 330 to navigate backward and redisplay the animation editor user interface 350. In some examples, the motion creation user interface 351 may include a save option 362 that is selectable to save/create the new motion effect, as discussed in more detail below.

As shown in FIG. 3I, the motion creation user interface 351 may also include a reset option 344, which optionally has one or more of the characteristics of the reset option 344 of the animation editor user interface 350, and a play option 345, which optionally has one or more of the characteristics of the play option 345 of the animation editor user interface 350. In some examples, the motion creation user interface 351 may include a record option 376. For example, the record option 376 may be selectable to cause the electronic device 330 to display a motion capture user interface (not shown) via which the user of the electronic device 330 can record (e.g., capture via one or more cameras in communication with the electronic device 330) movements of a second user (different from the user of the electronic device 330) for generating motion effects based on the captured movements of the second user. In some examples, the electronic device 330 can record movements of a non-human user for generating the motion effects, such as movements of an animal (e.g., a dog or cat), movements of branches swaying in the wind, and/or movements of autonomous machines (e.g., robots), as examples. In some examples, the motion creation user interface 351 optionally includes a loop option 364, which, when selected, causes the first object 310 to perform the customized motion in the animation editor user interface 350 for an unending (i.e., looping) time period, as discussed in more detail later. As shown in FIG. 3I, the motion creation user interface 351 may include a share option 348, which optionally has one or more of the characteristics of share option 348 of the animation editor user interface 350.

As shown in FIG. 3I, in some examples, a title of the motion effect may be included in the motion creation user interface 351. For example, as shown, a current title of the motion effect may be "New Motion," and a current designation for the motion effect may be "Entire Body". In some examples, the title and designation shown in FIG. 3I may be an initial/default title and designation. For example, as shown, an editing tool or option 367 may be provided that allows the user of the electronic device 330 to change/customize the title and/or designation of the custom motion effect, as discussed in more detail later. As similarly described above with reference to the animation editor user interface 350, in some examples, the motion creation user interface 351 optionally includes a plurality of user interface objects 365 identifying a plurality of portions of the first object 310. In some examples, the plurality of user interface objects 365 are similar to and/or correspond to the plurality of user interface objects 332 of the animation editor user interface 350. For example, as shown, the plurality of user interface objects 365 identify the "Left Elbow," "Left Wrist," "Right Shoulder," and "Right Elbow" portions of the first object 310. In some examples, the motion creation user interface 351 may include a play head scrubber 333, which optionally has one or more characteristics of the play head scrubber 333 of the animation timeline 331 described above. In some examples, the user of the electronic device 330 may begin authoring the custom motion effect by selecting one or more user interface objects 365. For example, as shown in FIG. 3I, the user of the electronic device 330 has selected a first user interface object 365A corresponding to the right should portion of the first object 310, which is displayed with visual emphasis (e.g., highlight/shading) to indicate selection/focus.

In some examples, in response to detecting the selection of one of the user interface objects 365, the electronic device 330 may display a plurality of interpolation types 363 in the motion creation user interface 351. In some examples, the interpolation types 363 may define a motion curve for the custom motion effect, which optionally controls characteristics of the animation applied to the first object 310, as described below. As described in more detail later, the interpolation types 363 may be based on mathematical and/or scientific (e.g., physics-based) relationships. As shown in FIG. 3I, the right shoulder portion of the first object (corresponding to first user interface object 365A) is not initially/currently associated with an interpolation type, as indicated by the visual emphasis (e.g., highlight/shading) of the first interpolation type 363A (labeled "None"). In some examples, the user of the electronic device 330 may generate a motion curve for the right shoulder portion of the first object by selecting one of the predefined interpolation types (e.g., other than the first interpolation type 363A). For example, as shown, the user is providing a selection input 352I, such as a tap, touch, click, or verbal command, directed toward a second interpolation type 363B corresponding to "Ease Out" effect.

In some examples, as shown in FIG. 3J, in response to receiving the selection input 352I, the electronic device 330 generates and displays a first motion curve 373A corresponding to the second interpolation type 363B. In some examples, the first motion curve 373A is optionally displayed within time element 359A adjacent to the first user interface object 365A. In some examples, the time element 359A optionally corresponds to a time frame of the animation timeline 331 of the animation editor user interface 350. For example, as described previously with reference to FIG. 3A, each column of the animation timeline 331 optionally corresponds to a respective time frame having a respective duration within the animation timeline 331. In some such examples, a duration of the time element 359A may correspond to the respective duration of the respective time frame of each column of the animation timeline 331.

Additionally, as shown in FIG. 3J, in response to receiving the selection input 352I, the electronic device 330 may display a plurality of predefined motion parameters 368A corresponding to the second interpolation type 363B. In some examples, the predefined motion parameters 368A may be displayed in a column format adjacent to the plurality of interpolation types 363. In some examples, the predefined motion parameters 368A include one or more speed parameters, one or more time delay parameters, one or more first pose parameters, and/or one or more second pose parameters. For each category of motion parameters, one or more control affordances may be displayed that are interactable to adjust one or more corresponding motion parameters. For example, as shown in FIG. 3J, the speed category of the motion parameters 368A optionally includes a speed bar 366 including a first slider 377. In some examples, the first slider 377 is optionally selectable to initiate a process to adjust a value of the speed parameter. For example, as shown in FIG. 3J, a current value ("0.00") of the speed parameter may be initially set to a lowest value as a default. Selection of the first slider 377 (e.g., via a tap, touch, click, or verbal command) and movement of the first slider 377 in a first direction (e.g., rightward direction) within the speed bar 366 may increase the value of the speed parameter. In some examples, the speed parameter optionally controls a speed at which the custom motion is performed. In some examples, the value of the speed parameter is displayed with the speed bar 366 (e.g., below the first slider 377), and optionally changes based on a change in position of the first slider 377 within the speed bar 366.

As shown in FIG. 3J, in some examples, the delay parameter of the motion parameters 368A optionally includes a delay bar 370 including a second slider 369. In some examples, the second slider 369 is optionally selectable to initiate a process to adjust a value of the delay parameter. For example, as shown in FIG. 3J, a current value of the delay parameter may be initially set to a lowest value as a default. As similarly discussed above, selection of the second slider 369 (e.g., via a tap, touch, click, or verbal command) and movement of the second slider 369 in the first direction (e.g., rightward direction) within the delay bar 370 may increase the value of the delay parameter. In some examples, the delay parameter optionally controls a duration of a time delay after which the custom motion is performed.

In some examples, the one or more motion parameters 368A includes one or more pose parameters, as shown in FIG. 3J. For example, a first plurality of pose parameters (e.g., corresponding to Pose A) optionally controls a starting pose (e.g., orientation, position, arrangement, etc.) for the featured portion (e.g., the right shoulder portion) of the first object 310, and a second plurality of pose parameters (e.g., corresponding to Pose B) optionally controls an ending pose for the featured portion of the first object 310. For example, the starting pose for the right shoulder portion of the first object 310 determines the pose of the right shoulder portion at a beginning (e.g., a first end) of the duration of the time element 359A, and the ending pose determines the pose of the right shoulder portion at an end (e.g., a second end) of the duration of the time element 359A. Accordingly, in some examples, the starting pose of the featured portion of the first object 310 may selectively be different from or the same as the ending pose of the featured portion of the first object 310 as determined by the first plurality of pose parameters and the second plurality of pose parameters, respectively. As shown in FIG. 3J, the first plurality and the second plurality of pose parameters may each include a pitch parameter, a roll parameter, and a yaw parameter optionally controlling the three degrees of freedom of the featured portion of the first object 310 at the starting pose and at the ending pose, respectively. For example, the first plurality of pose parameters is optionally provided with a first pitch bar 371A, a first roll bar 371B, and a first yaw bar 371C. In some examples, the first pitch bar 371A, the first roll bar 371B, and the first yaw bar 371C may each include a slider (e.g., similar to sliders 377 and/or 369) that is selectable to initiate adjustment of a value of one of the first plurality of pose parameters. Similarly, as shown, the second plurality of pose parameters is optionally provided with a second pitch bar 372A, a second roll bar 372B, and a second yaw bar 372C. In some examples, the second pitch bar 372A, the second roll bar 372B, and the second yaw bar 372C may each include a slider (e.g., similar to sliders 377 and/or 369) that is selectable to initiate adjustment of a value of one of the second plurality of pose parameters.

As mentioned above, the one or more motion parameters 368A may be selectively adjusted to create a custom motion effect for a respective portion of the first object 310. For example, as shown in FIG. 3K, the speed parameter, the delay parameter, and one of the second plurality of pose parameters have been selectively adjusted by the user to create a motion effect for the right shoulder portion of the first object 310. As shown, the user has provided a selection input 352K directed to the first slider 377, and has moved the first slider 377 rightward within the speed bar 366, which optionally causes the electronic device 330 to increase the value of the speed parameter (e.g., to a value of "0.30"). Additionally, the user has provided a selection input (e.g., similar to selection input 352K) directed to the second slider 369 and has moved the second slider 369 rightward within the delay bar 370, which optionally causes the electronic device to increase the value of the speed parameter. As shown in FIG. 3K, the user has also provided a selection input directed to a slider of the pitch parameter of the second plurality of pose parameters, and has moved the slider leftward within the second pitch bar 372A, which optionally causes the electronic device 330 to decrease the value of the pitch parameter for the second pose of the first object 310. As shown in FIG. 3K, in response to receiving the adjustments of the one or more motion parameters 368A, the electronic device 330 updates the first motion curve 373A. For example, first motion curve 373A optionally plots a positional change of the right shoulder portion of the first object 310 over the duration of time of the time element 359A. The changes to the pose parameters (e.g., corresponding to Pose B) optionally affects the positional component of the first motion curve 373A, and the speed and delay parameters optionally affect the rate of change (i.e., the slope) of the first motion curve 373A. Accordingly, the custom motion effect is optionally defined according to the first motion curve 373A, which optionally dictates the movement pattern of the right shoulder portion of the first object 310. Additionally, as shown in FIG. 3K, in response to receiving the adjustments of the one or more motion parameters 368A, the electronic device 330 updates an appearance of the first object 310 in real-time. For example, the right shoulder portion of the first object 310 is displayed in a raised or elevated state (e.g., with respect to a surface on which the first object would be placed) within 5, 10, 20, 25, 30, 40, 50, 100, 200, 300, etc. milliseconds of detecting the changes to the motion parameters 368A.

In some examples, the custom motion effect can target more than one portion of the first object 310. For example, as shown in FIG. 3L, the user of the electronic device 330 has selected a second user interface object 365B corresponding to a second portion of the first object 310 (e.g., the "Right Elbow" portion). Additionally, as shown, the user has assigned interpolation type 363C (e.g., corresponding to "Spring") for the motion of the second portion of the first object 310. Accordingly, as shown in FIG. 3L, the electronic device 330 is optionally displaying a second time element 359B for the second portion (e.g., the right elbow portion) of the first object 310, the second time element 359B displaying a second motion curve 373B. As similarly described above with reference to FIG. 3K, the second motion curve 373B may define the movement/motion of second portion of the first object 310. In some examples, as mentioned previously above, the interpolation types 363 may be (e.g., as a baseline) based on real-world (e.g., mathematical and/or physics-based) relationships. For example, as shown in FIG. 3L, because the interpolation type 363C (corresponding to "Spring") has been selected by the user, the second portion (the right elbow portion) of the first object may move according to a spring-based model, as indicated by the second motion curve 373B. As similarly discussed above, the second motion curve 373B may be adjusted by adjusting one or more motion parameters corresponding to the interpolation type 363C. For example, as shown in FIG. 3L, the electronic device 330 is optionally displaying one or more motion parameters 368B corresponding to the interpolation type 363C. For example, the one or more motion parameters 368B optionally include a delay parameter, a speed parameter, a first plurality of pose parameters and a second plurality of pose parameters. In some examples, the one or more motion parameters 368B corresponding to the interpolation type 363C are optionally similar to the one or more motion parameters 368A corresponding to the second interpolation type 363B discussed above. In some examples, the user has adjusted a value of the delay parameter (e.g., by adjusting a position of the first slider 377 within the speed bar 366, which has increased the value to "0.05" from a starting value of "0.00") and has adjusted a value of the yaw parameter (e.g., by adjusting the value of the yaw bar 372C) of the second plurality of pose parameters (e.g., corresponding to Pose B), which are reflected by the shape and form of the second motion curve 373B. In some examples, as shown in FIG. 3K, the speed parameter may be presented as a value having a speed component and a damping component. For example, the speed parameter may be adjusted via a pad element 374 having a dongle 375 which is movable to set the speed component (e.g., horizontally along a surface of the pad element 374) and the damping component (e.g., vertically along the surface of the pad element 374).

As similarly discussed above with reference to FIG. 3K, the second motion curve 373B optionally defines a motion of the right elbow portion of the first object 310 from a first pose (e.g., first positional value(s) defined by the Pose A parameters) to a second pose (e.g., second positional value(s) defined by the Pose B parameters), wherein the delay and speed parameters define the rate of change of the second motion curve 373B. In some examples, as shown in FIG. 3K, the electronic device 330 may alter an appearance in real-time to reflect the changes to the one or more motion parameters defining the motion of the right elbow portion of the first object 310. For example, the right elbow portion of the first object 310 is displayed in a raised or elevated state (e.g., with respect to a surface on which the first object would be placed) within 5, 10, 20, 25, 30, 40, 50, 100, 200, 300, etc. milliseconds of detecting the changes to the motion parameters 368B.

In some examples, the user of the electronic device 330 may view a preview of the custom motion effect by selecting one of the play option 345 and/or the loop option 364. For example, as shown in FIG. 3M, the user of the electronic device 330 has provided a selection input 352L (e.g., a tap, touch, click, or verbal command) directed to the loop option 364, which optionally causes the electronic device 330 to loop the motion (e.g., continuously play the motion) according to durations of the time elements 359A and 359B. As shown in FIG. 3M, in response to receiving the selection input 352L, the electronic device 330 may cause the first object 310 to perform the motions defined by the first motion curve 373A and the second motion curve 373B. For example, as shown, the electronic device 330 has caused the right shoulder portion and the right elbow portion of the first object 310 to move in accordance with the first motion curve 373A and the second motion curve 373B (e.g., in accordance with changes in position as defined by the motion curves 373A and 373B, which optionally causes the right shoulder and right elbow portions of the first object 310 to concurrently perform a bouncing motion). In some examples, as the electronic device 330 presents the motion of the first object 310, the electronic device 330 optionally moves the play head scrubber 333 across the motion creation user interface 351 (e.g., in a rightward direction) corresponding to an advance in time over the durations of the time elements 359A and 359B. In some examples, the play head scrubber 333 may be selectable to move the play head scrubber 333 to a respective position of the time elements 359A and 359B, which optionally corresponds to a particular pose of the right shoulder portion and of the right elbow portion ranging between the first pose and the second pose.

Thus, as outlined above, the user of the electronic device may easily and efficiently create custom motion effects that target movement of particular portions of an object, while viewing a preview of the custom motion effects presented on the object in real time. For example, presenting a real-time preview of the motion effect allows the user to instantly evaluate the custom motion effect, as well as make further customizations and/or modifications as needed or desired. Additionally, as discussed below, the custom motion effects can be saved to the library of motion effects of the animation editor user interface, which enables the user to easily and efficiently animate one or more objects at various moments in the future, as desired.

As discussed previously herein, the motion creation user interface 351 may include an edit option 367 and/or a save option 362. As shown in FIG. 3M, by selecting the edit option 367 via selection input 352M, the user of the electronic device 330 can provide a name to the custom motion, such as "Arm Bounce," for example. In some examples, in response to receiving selection of the edit option 367, the electronic device 330 may display a plurality of options (not shown) that allow the user to modify the name of the motion effect, an appearance (e.g., color, design, tag, keyword, etc.) of the icon corresponding to the motion effect, etc. Additionally, in some examples, in response to receiving a selection of the save option 362, the electronic device 330 may add the new motion effect to the library 335 of motion effects of the animation editor user interface 350, as shown in FIG. 3N. For example, as shown in FIG. 3N, a respective motion effect 337N (e.g., labeled "Arm Bounce") corresponding to the custom motion effect created in the motion creation user interface 351 in the example above is displayed within the library 335 (e.g., at a bottom of the scrollable list of motion effects in the library 335). As discussed above with reference to FIGS. 3A-3H, the respective motion effect 337N can then be selectively added to one or more cells 334 of the animation timeline 331 to animate the first object 310 according to the respective motion effect 337N (e.g., which causes the right shoulder portion and the right elbow portion of the first object 310 to perform an arm bouncing effect, as discussed above). Thus, as outlined above, the disclosed method enables the user of the electronic device to easily, intuitively, and efficiently animate an object by dragging and dropping one or more predefined motion effects and/or one or more user-created motion effects into respective columns within the animation timeline.

In some examples, the animation timeline 331 includes motion blocks (not shown) corresponding to the animations of the first object 310 over the plurality of time frames of the animation timeline 331. For example, the animation timeline 331 may include the motion blocks above each column containing representations of motion effects 337. In some examples, a transition block (e.g., similar in appearance to motion curves 373A, 373B in FIG. 3M) may be displayed between successive motion blocks that identifies an interpolation type for the transition between the successive motion blocks. For example, the user may select a particular transition block to change the interpolation type for the transition between successive motions (e.g., as similarly described above with reference to FIGS. 3I-3L). Additionally, in some examples, the user may change a duration of the transition between successive motions by selecting a particular transition block.

In some examples, the first object 310 may alternatively be presented as a virtual object within a computer-generated environment (e.g., in a passthrough environment). For example, as shown in FIG. 3N, the user of the electronic device 330 is optionally providing a selection input 352N directed to the presentation option 341 discussed previously with reference to FIG. 3A. In some examples, as shown in FIG. 3O, in response to receiving the selection input 352N, the electronic device 330 may present the first object 310 in a computer-generated environment 360 viewed via the display 314 of the electronic device 330. For example, the electronic device 330 may capture (e.g., via one or more cameras in communication with the electronic device 330) portions of a physical environment surrounding the electronic device 330, which optionally includes a table 306 and a stack of books 312. As shown in FIG. 3O, the first object 310 may be presented as a virtual object, which is optionally displayed on (e.g., anchored to) a top surface of a representation 306' of the real-world table and in front of a representation 312' of the real-world stack of books. In some examples, the computer-generated environment 360 is optionally presented as passthrough (e.g., using the one or more cameras) in the upper presentation region of the animation editor user interface 350. In some examples, the user of the electronic device 330 may create, edit, preview, and customize the animation of the first object 310 in the computer-generated environment 360 using the various controls of the animation editor user interface 350 and in accordance with the various methods described above with reference to FIGS. 3A-3N.

In some examples, the motion of the first object 310 may be animated using a high-level motion approach (e.g., a higher-level of abstraction that represents behavior of all applicable joints/portions of the objects for the specified motion) rather than the joint/portion-centered approach outlined above. For example, multiple (e.g., two or more, or all of the) portions of the first object 310 may be concurrently animated to cause the first object 310 to perform movement/motion according to the motion effects presented in the animation editor user interface 350 (e.g., in the library 335 of motion effects). In some examples, the user may activate the high-level approach by providing selection input (e.g., a tap, touch, click, verbal command, etc.) directed toward a record option displayed in the animation editor user interface 350 (e.g., similar to record option 376 in FIG. 3J).

In some examples, the electronic device 330 may animate the first object 310 using the high-level approach according to a first mode (e.g., first recording mode) or a second mode (e.g., second recording mode). For example, the user of the electronic device 330 may utilize the library of high-level motion effects (e.g., similar to or the same as motion effects 337) to animate the first object 310 in the first mode, and/or may utilize recognition of various inputs or gestures (e.g., hand gestures) of the user to animate the first object 310 in the second mode. Each of the high-level motion effects selected using the various inputs or gestures can be added to a recorded animation. At the conclusion of the recording, the recorded animation can be used to animation an object. In some examples, each selection using the various inputs or gestures can cause a transition between a first high-level motion effect and a second high-level motion effect. The timing of the transition in the recorded animation can be in accordance with timing of the input or gesture (e.g., a first input one second after starting recording can cause a first transition of the animation effect one second after the beginning of the application of the recorded application effect) or serialized to follow sequentially (e.g., allowing for time for a transition in the animation, but otherwise having each high-level motion effect occur back-to-back in the recorded animation).

In some examples, while operating in the first mode, the electronic device 330 can animate movement of the first object 310 in accordance with user input directed toward the motion effects 337. For example, after selecting the record option (not shown) in the animation editor user interface 350, the user of the electronic device 330 may individually select (e.g., via selection input) one or more motion effects 337 to cause the electronic device 330 to animate the first object according to the particular motion effects selected (e.g., with transitions indicated by each subsequent selection of a new motion effect during recording). With reference to FIG. 3N, while in the first mode, if the electronic device 330 receives a selection of the motion effect "Wiggle Legs," the electronic device 330 animates the first object 310 to perform movement that corresponds to Wiggle Legs (e.g., movement of the leg portions of the first object 310 in a "wiggling" fashion). As described herein, the electronic device 330 updates display of the first object 310 in real time (e.g., within 0.05, 0.1, 0.5, 1, 1.5, 2, etc. seconds of receiving the selection of the Wiggle Legs motion effect). In some examples, a representation of the Wiggle Legs motion effect is added to a portion of the animation timeline 331 (e.g., and not necessarily within the cells 334 of the animation timeline 331). For example, the electronic device 330 updates display of the animation timeline 331 to no longer include the cells 334 and displays the representation of the Wiggle Legs motion effect in a top region or bottom region of the updated animation timeline 331 (not shown). In some examples, while recording an animation, animation timeline 331 can be used to represent (temporarily) the timeline for the animation that is in the process of being recorded. In some examples, a separate animation timeline, (not shown) can be displayed in the recording modes.

In some examples, while in the first mode, a duration of a particular animated movement corresponds to a duration of a selection of a particular motion effect in the library of motion effects 337. For example, continuing the above example, if the user of the electronic device 330 maintains selection (e.g., a tap/touch and hold) of the Wiggle Legs motion effect in FIG. 3N for a respective amount of time (e.g., 0.5, 1, 1.5, 2, 3, 4, 5, etc. seconds), the electronic device 330 optionally animates the first object 310 according to the Wiggle Legs motion effect for the respective amount of time in the animation timeline 331 (e.g., the first object 310 is animated to perform the Wiggle Legs motion for 0.5, 1, 1.5, 2, 3, 4, 5, etc. seconds). In some examples, selection of additional motion effects (e.g., "The Wave" or "Spin" in FIG. 3N) causes the electronic device 330 to subsequently animate the first object 310 according to the additionally selected motion effects. It should be understood that, in some examples, the animated motion of the first object 310 generated using the high-level approach above in the first mode can be selectively modified to edit a duration of a particular motion, remove a particular motion, and/or add a particular motion in the animation timeline 331, among other possibilities.

In some examples, as mentioned above, the electronic device 330 may animate the first object 310 using the high-level approach in a second mode. For example, while operating in the second mode, the user of the electronic device 330 can animate movement of the first object 310 by providing a particular gesture on a touch sensitive surface in communication with the electronic device 330 (e.g., on the touch sensitive surface of the display 314 or distinct from display 314). In some examples, the gesture provided on the touch sensitive surface determines the motion the electronic device 330 animates the first object 310. A correspondence between the motion effect for the first object 310 and the gesture can be stored in memory (and optionally can be user-configurable). It is understood that the gesture and corresponding motion effects described herein are exemplary and other correspondences between different gestures and different motion effects can be implemented. For example, a single-fingered gesture (e.g., provided by an index finger of a hand of the user) optionally causes the electronic device 330 to animate a walking motion for the first object 310, and a double-fingered gesture (e.g., provided by the index finger and middle finger of the hand of the user) optionally causes the electronic device 330 to animate a running motion for the first object 310. In some examples, a direction of motion of the first object 310 is determined based on a direction of movement of the gesture detected on the touch sensitive surface. For example, if the electronic device 330 detects movement of a single finger of the user rightward across the touch sensitive surface, the electronic device 330 optionally animates the first object 310 to walk in a rightward direction (e.g., relative to the animation editor user interface 350). Similarly, if the electronic device 330 detects movement of two fingers of the user leftward across the touch sensitive surface, the electronic device 330 optionally animates the first object 310 to run in a leftward direction. In some embodiments, the electronic device 330 ceases recording animation of the first object 310 in response to detecting an end of the gesture on the touch sensitive surface (e.g., in response to detecting liftoff of the finger(s) of the hand of the user). In some examples, the animation editor user interface 350 may include a guide (e.g., a menu, list, directory, etc.) that indicates the movement a particular gesture will generate.

In some examples, the gestures described above are detected by the electronic device 330 via one or more input devices other than a touch sensitive surface. For example, the electronic device 330 may detect the gestures via a hardware controller (e.g., a handheld controller including one or more buttons) in communication with the electronic device 330. In some examples, the gestures described above are optionally air gestures (e.g., described in more detail below with reference to FIGS. 4A-4P) that are detected via one or more sensors in communication with the electronic device 330 (e.g., such as image sensors 206 and/or hand tracking sensors 202 in FIG. 2). Accordingly, the user may animate the first object 310 by providing a selection input and/or a particular gesture, rather than the drag and drop approach described above with reference to FIGS. 3A-3O. Thus, as outlined above, one advantage of the disclosed method is the simplification of inputs needed to animate an object, which thereby improves user animation experience.

It should be understood that, in some examples, additional and/or alternative media effects may be utilized for animating the first object 310. For example, a library of audio effects (e.g., similar in appearance and function to library 335) may be provided in the animation editor user interface 350 that enables the user to add audio clips (e.g., corresponding to predefined chimes, voiceovers (e.g., recorded audio), sounds (e.g., laughs, cries, screams, groans, etc.), music, etc.) that are integrated as metadata with the selected motion effects. For example, the user may drag and drop representations of one or more audio clips onto respective columns of the animation timeline 331 in the animation editor user interface 350 in the manner described above to cause the electronic device 330 to overlay audio with the motions/movements of the first object 310. It should also be understood that the appearance of the user interfaces 350 and 351 provided in FIGS. 3A-3O are merely exemplary and that the user interfaces 350 and/or 351 may be alternatively configured or designed, and that additional or alternative user interface elements, options, objects, and/or controls may be provided within the user interfaces 350 and/or 351.

Additionally, it should be understood that the appearance (e.g., shape, design, color, emphasis, etc.) of the various user interface elements, options, objects, and/or controls are merely exemplary and that alternative appearances may be provided. Attention is now directed to user interfaces of a virtual motion capture application that are presented in a three-dimensional environment for animating motion of an object presented in the three-dimensional environment.

Figure 4A:
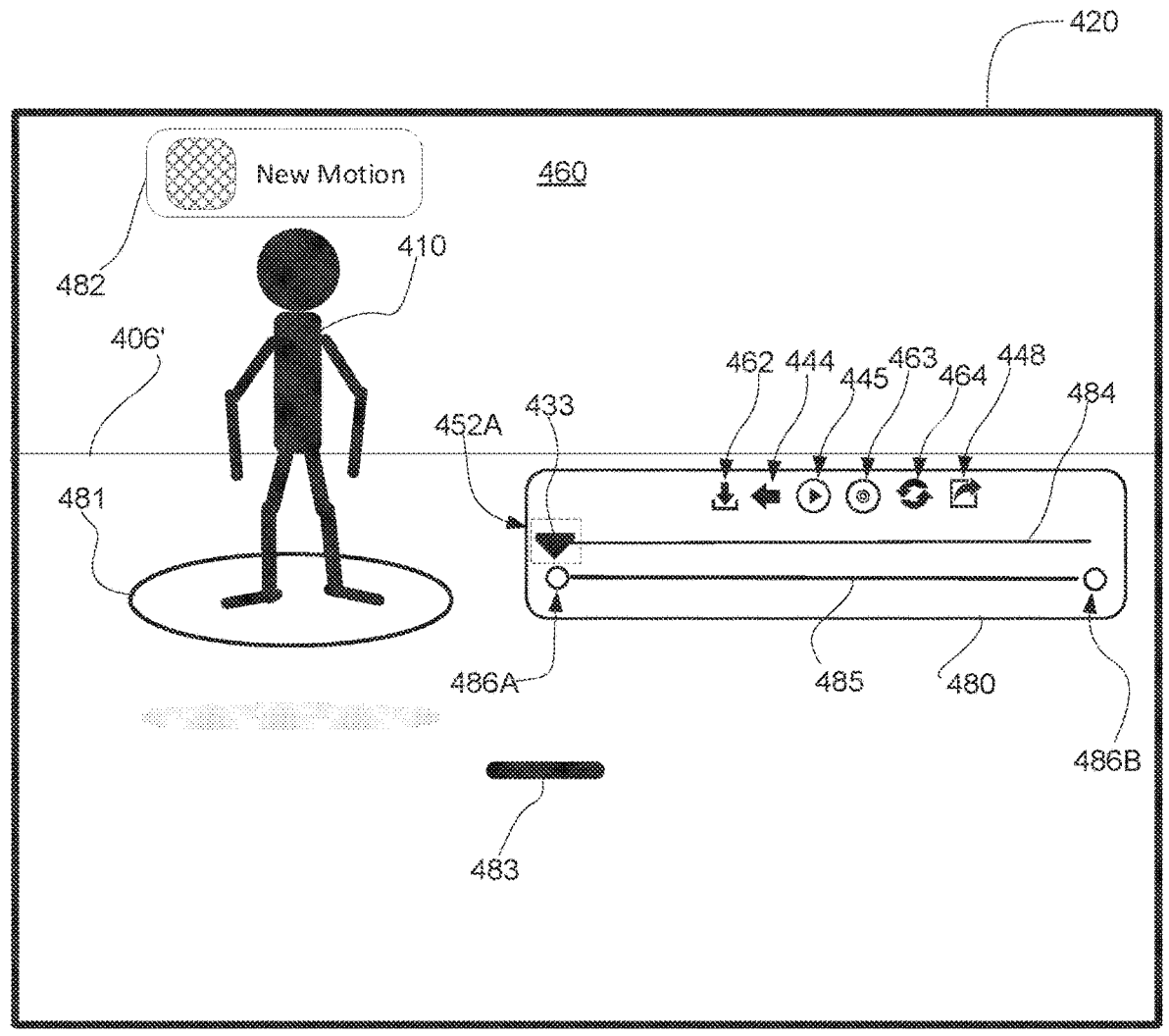
FIGS. 4A-4P illustrate example interactions with a three-dimensional graphical user interface of a virtual motion capture application according to some examples of the disclosure.
Figure 4B:
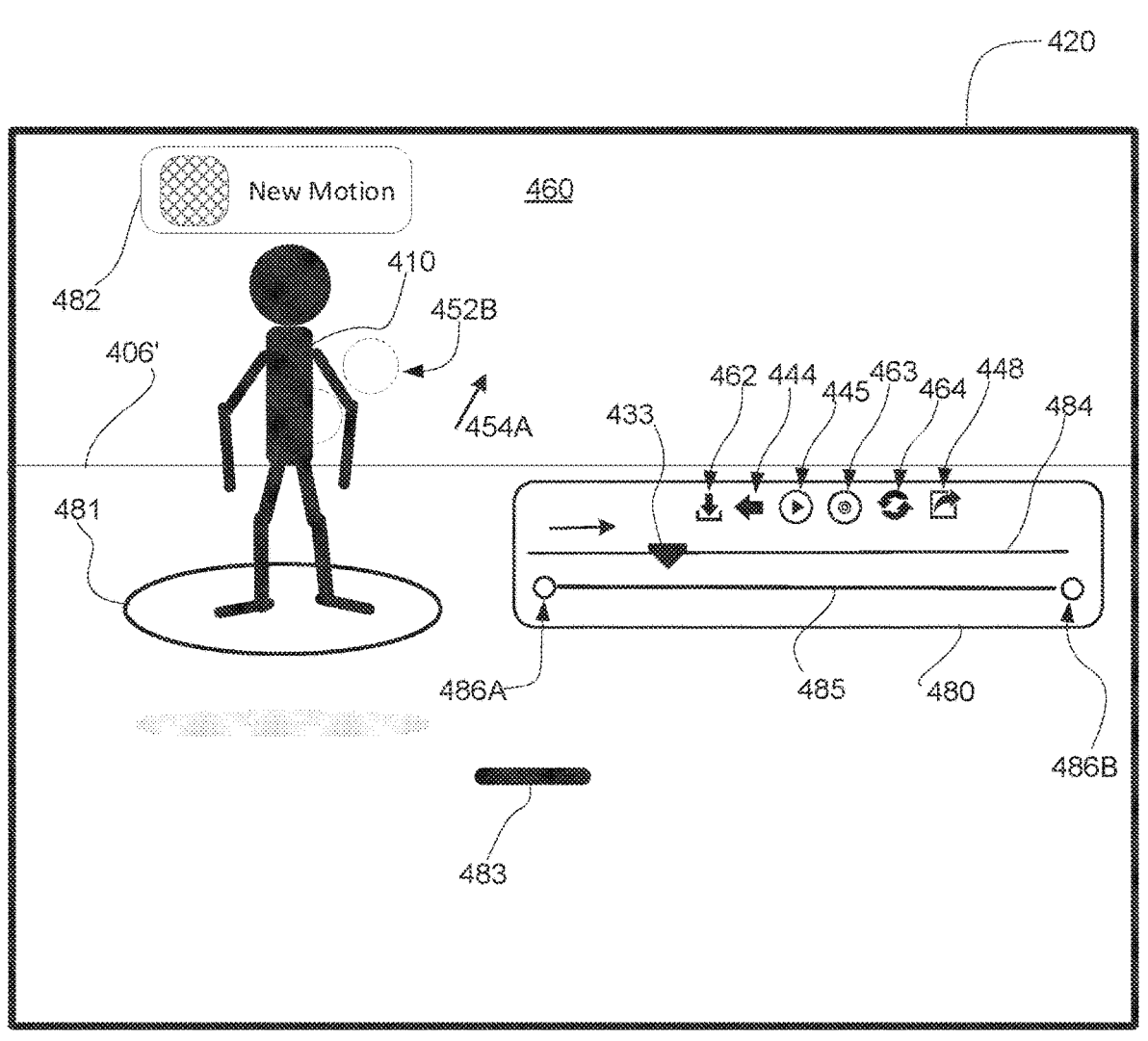
Figure 4C:
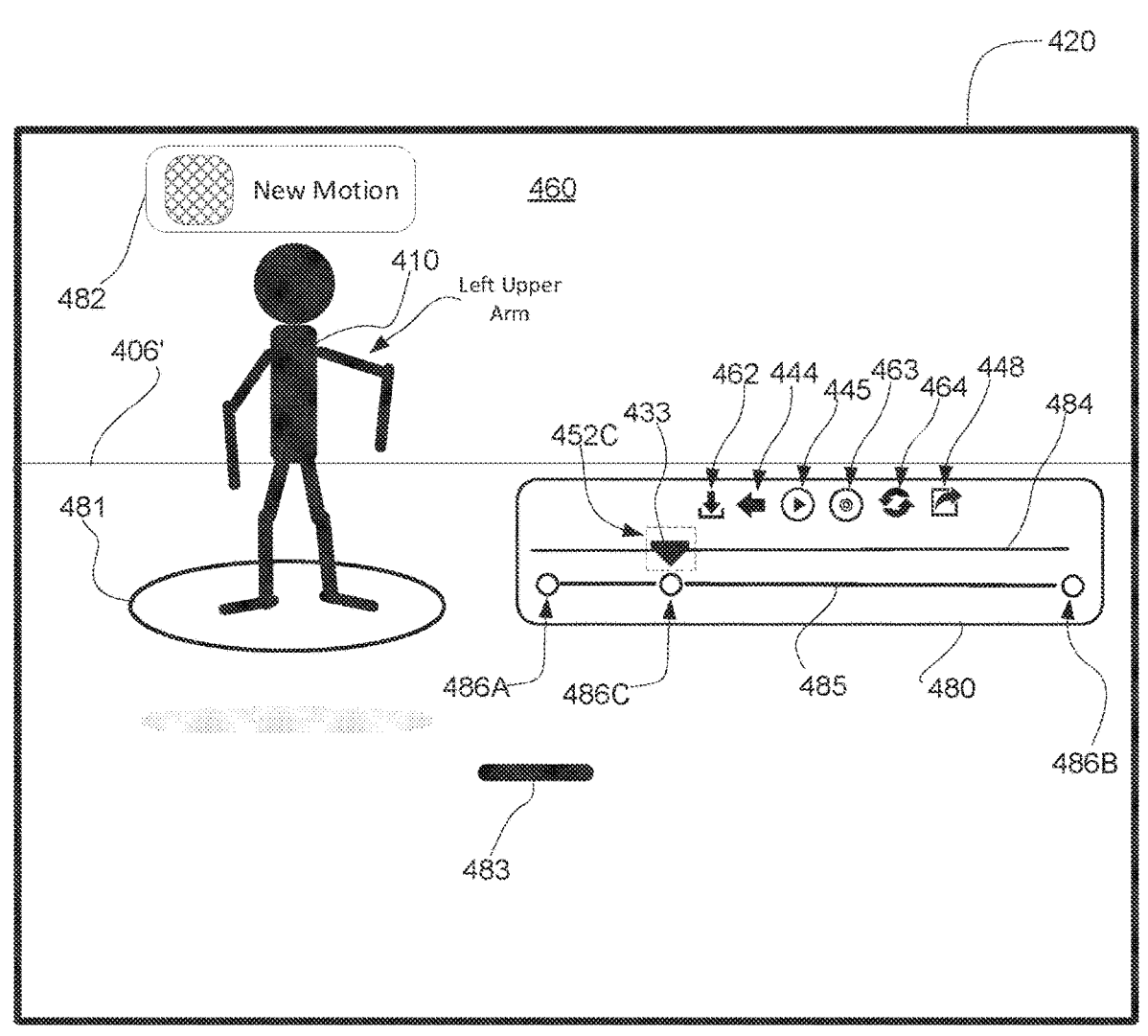
Figure 4D:
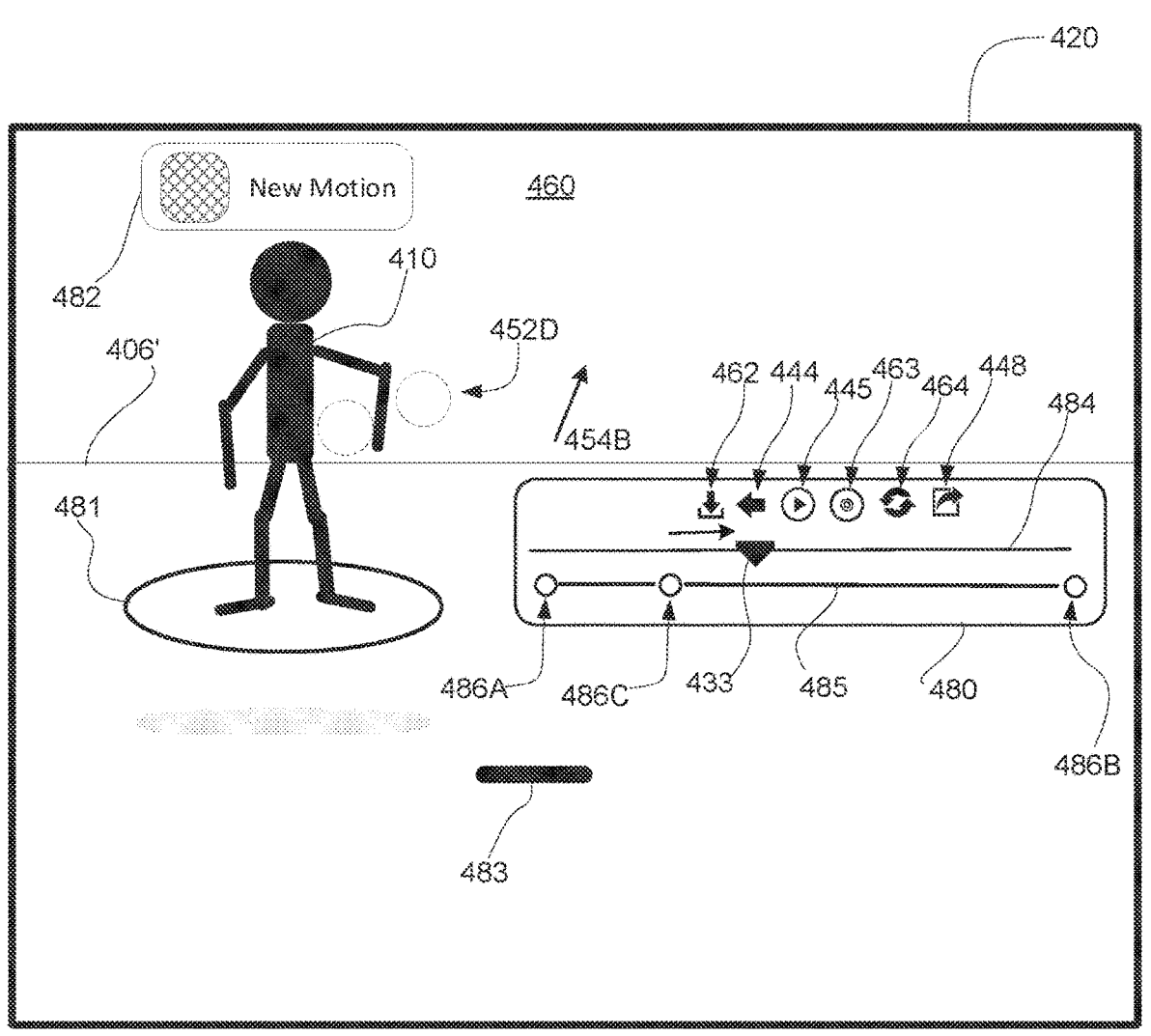
Figure 4E:
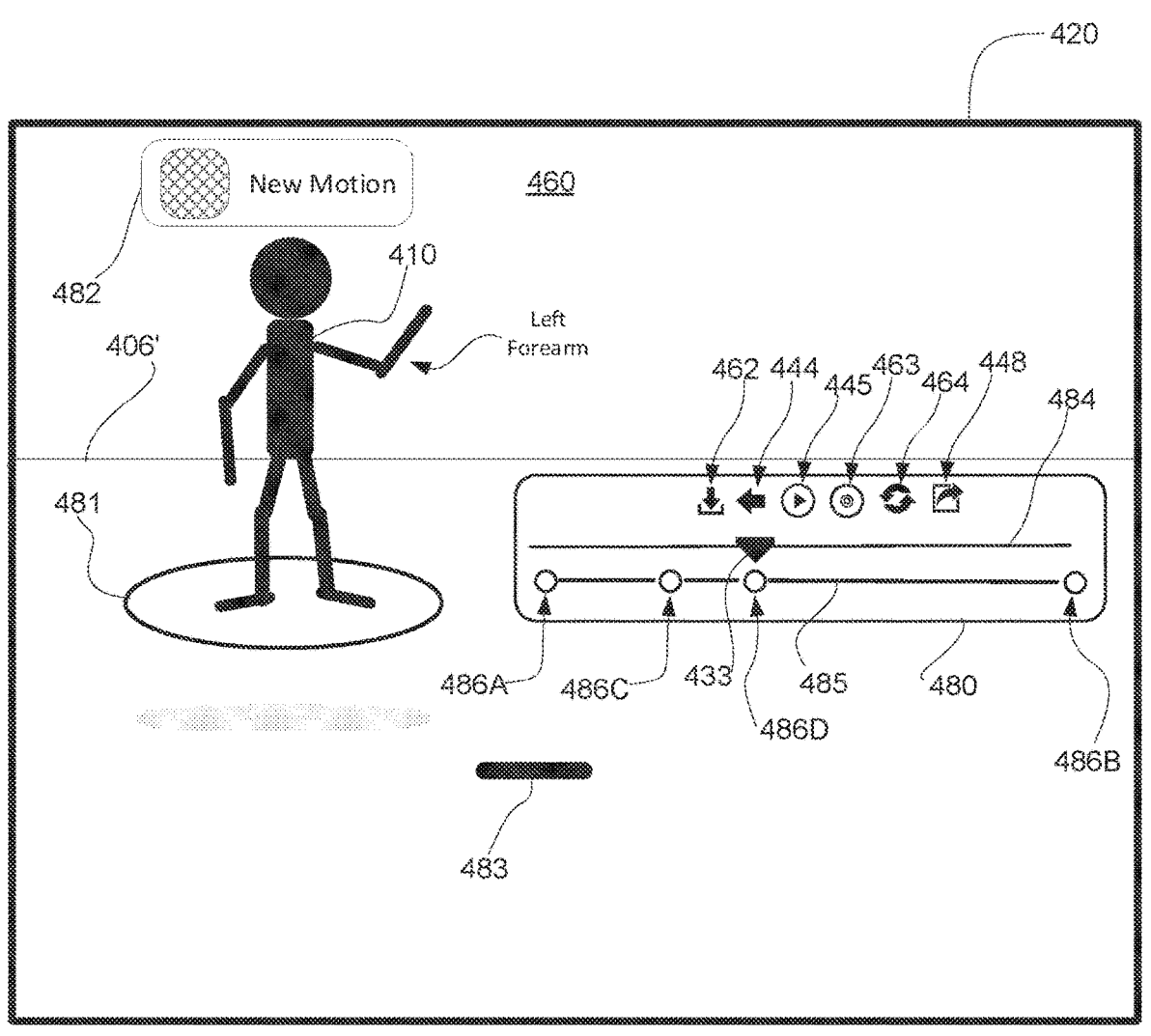
Figure 4F:
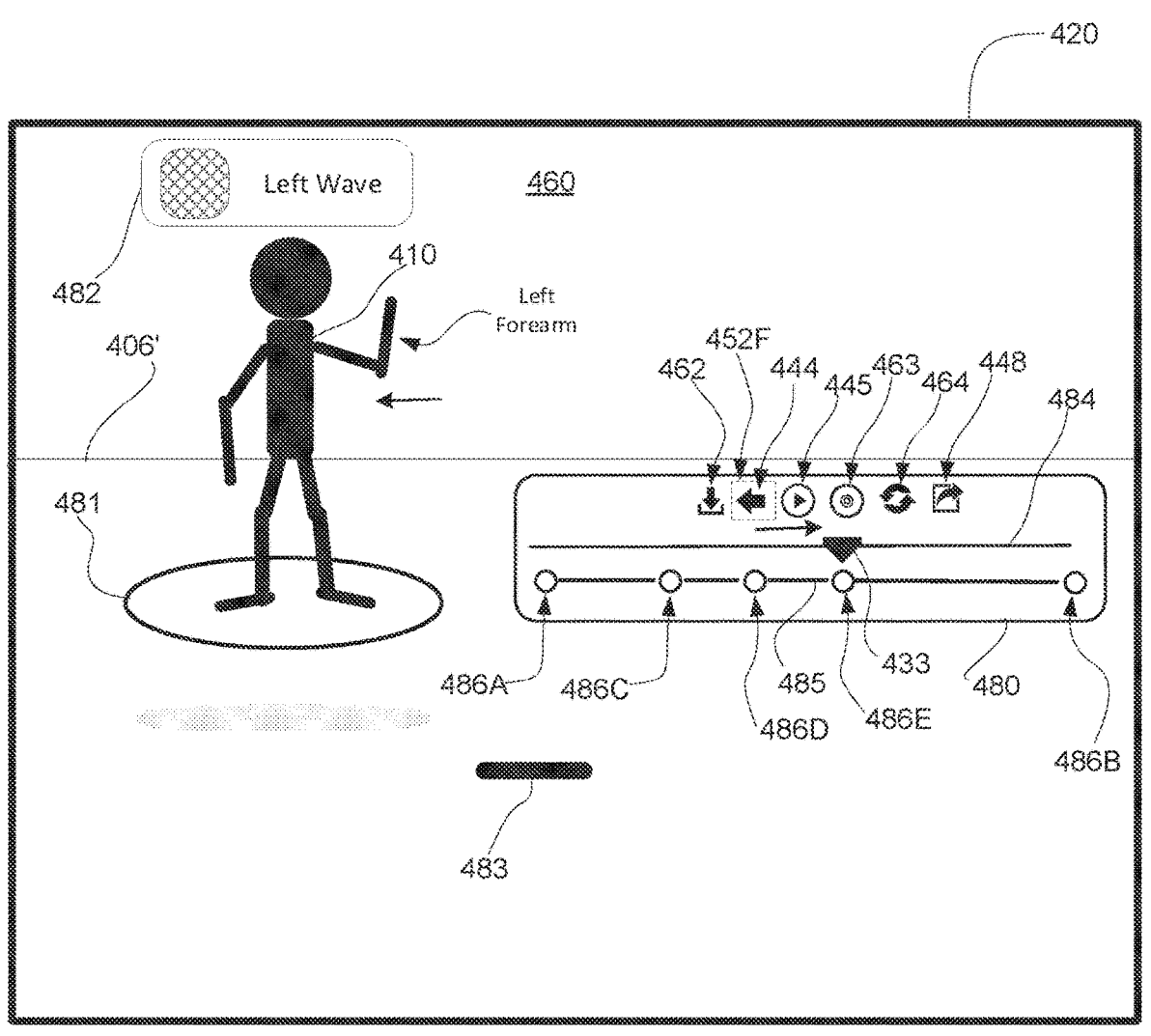
Figure 4G:
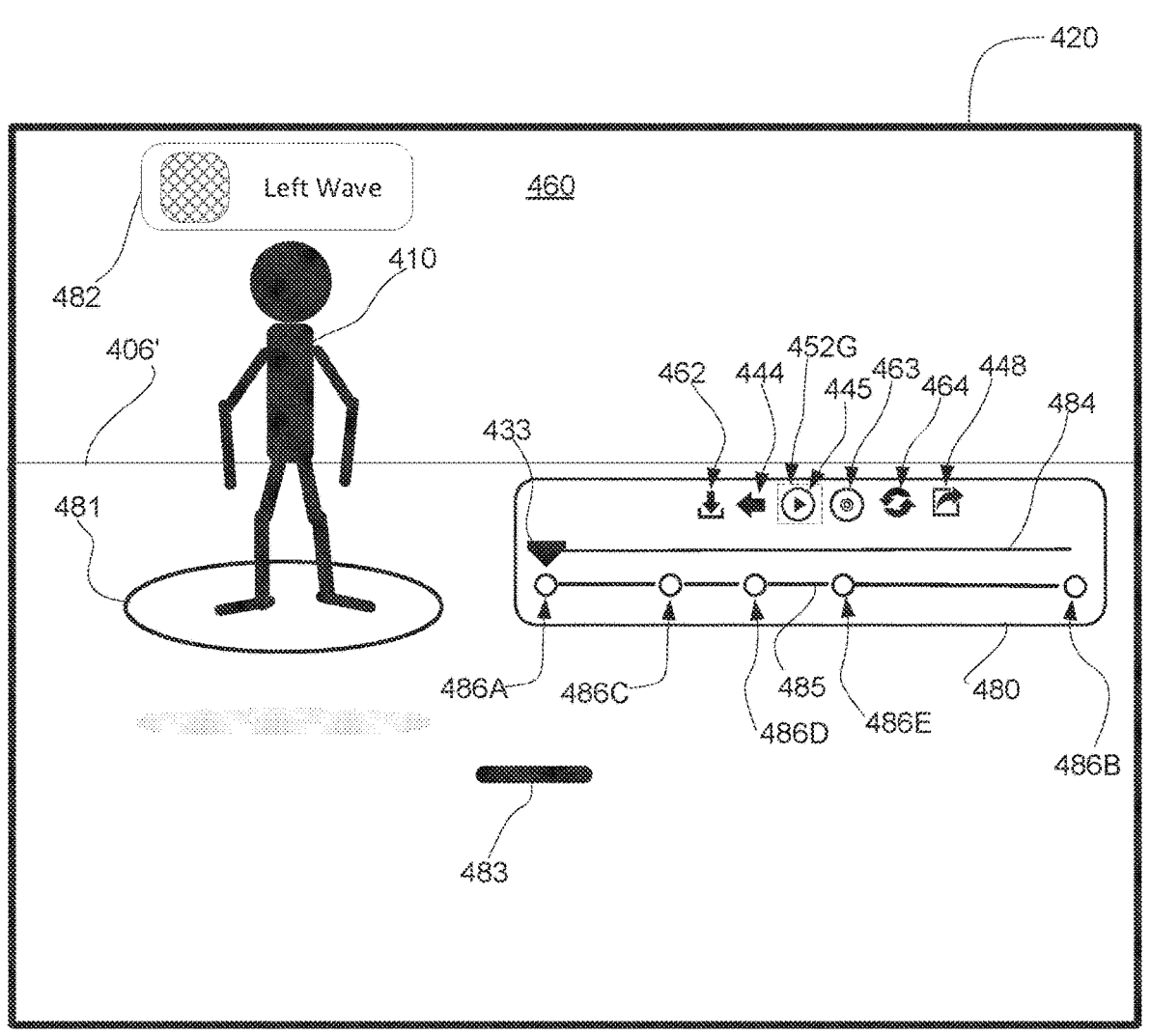
Figure 4H:
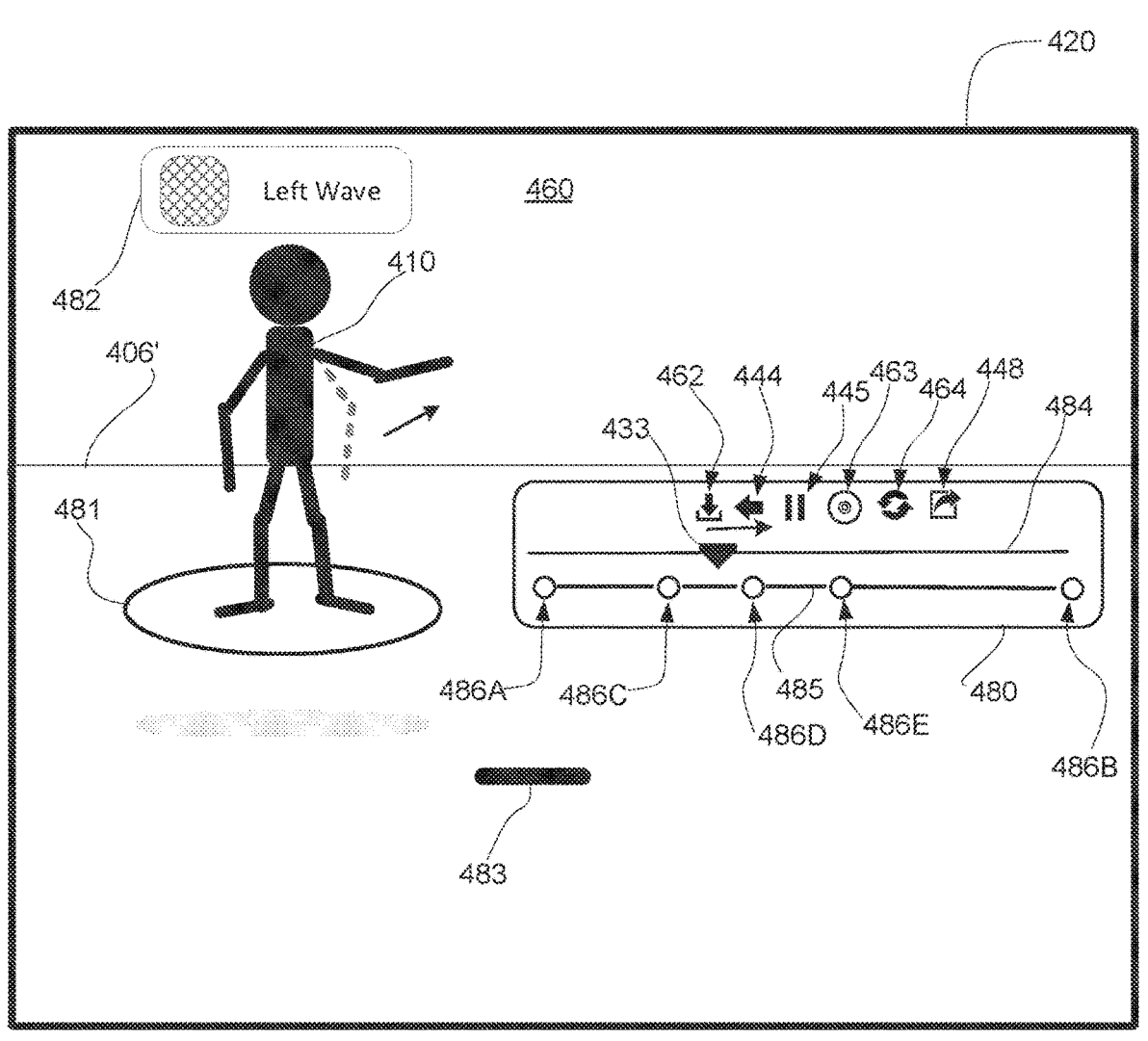
Figure 4I:
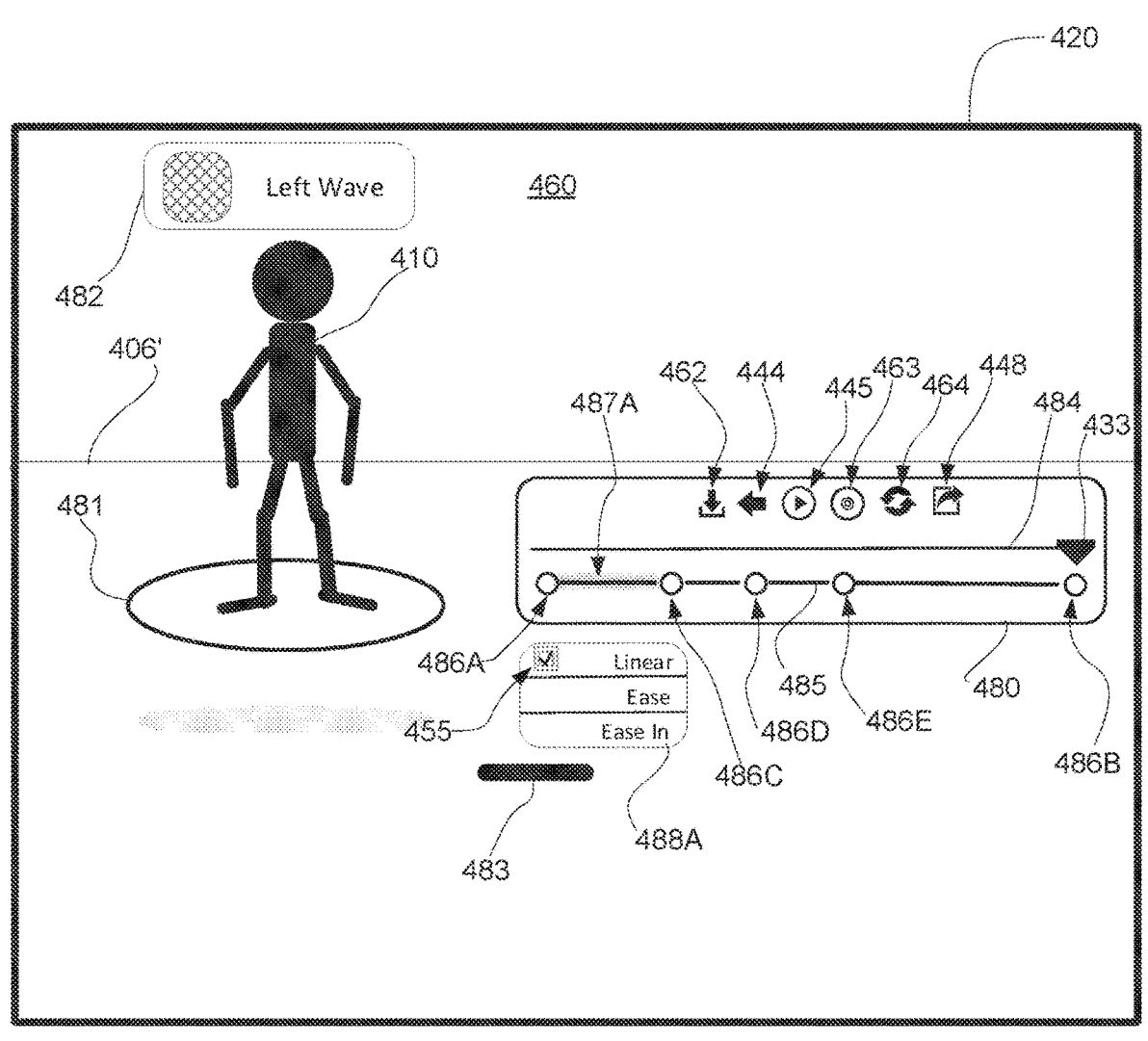
Figure 4J:
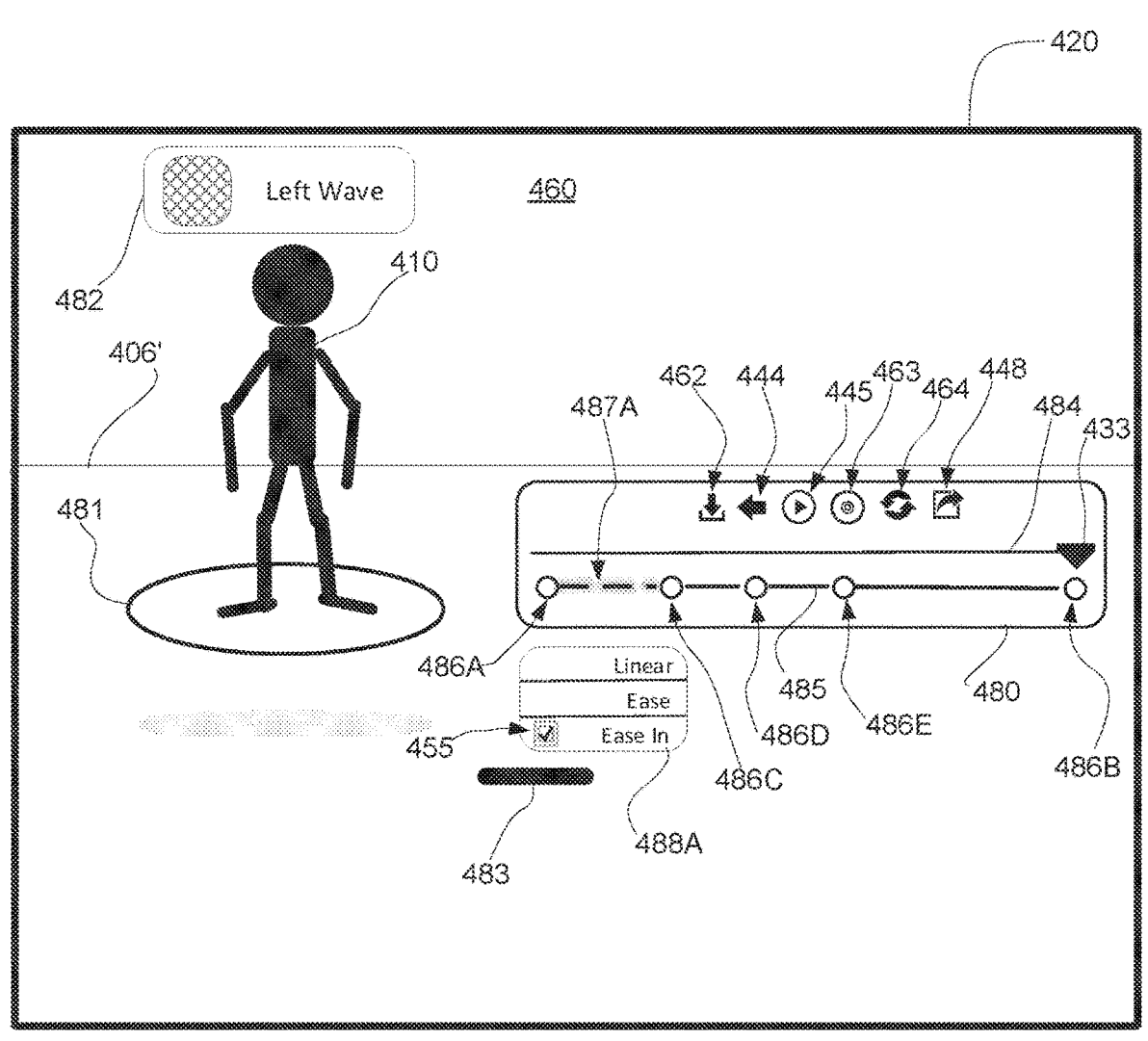
Figure 4K:
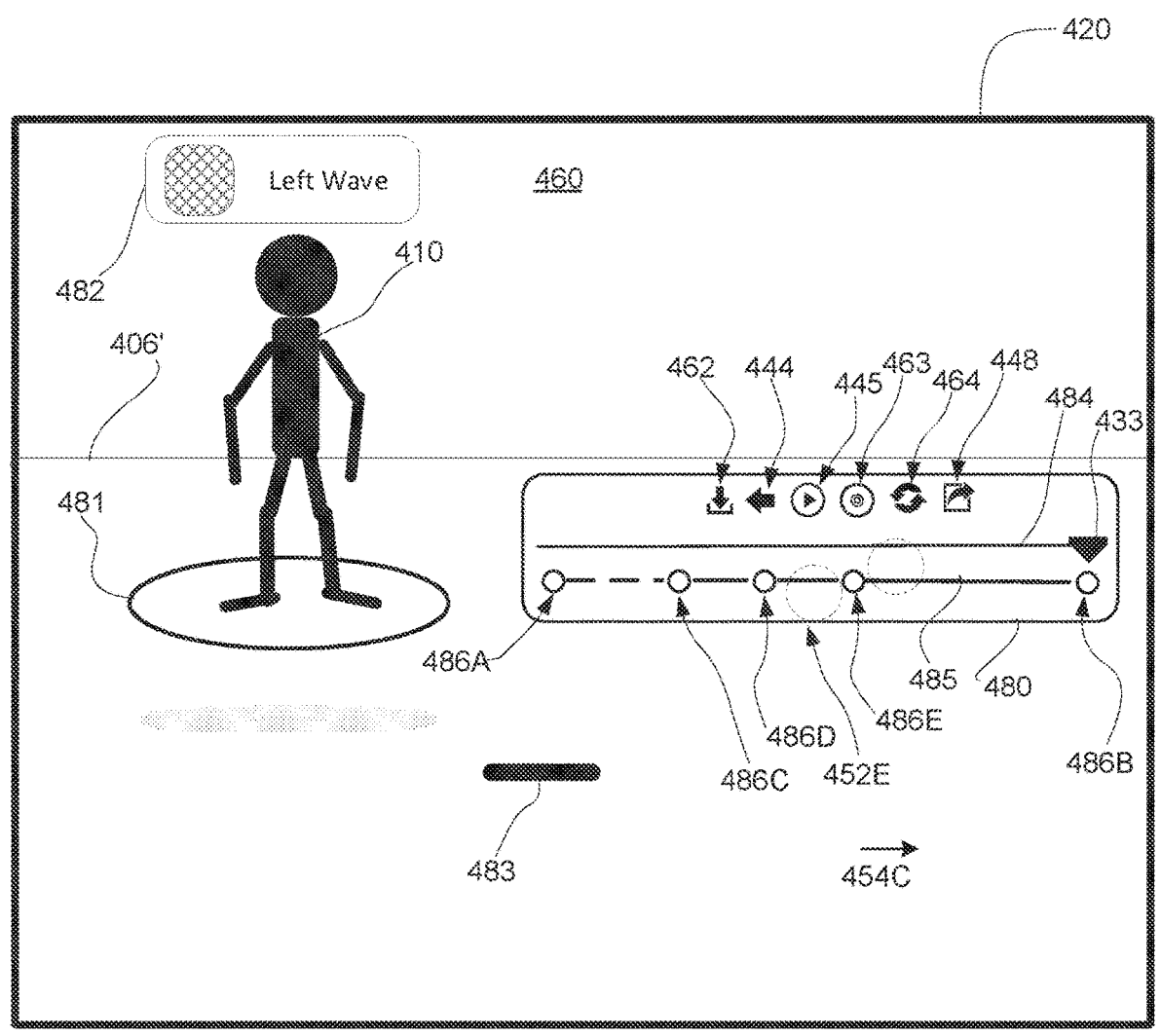
Figure 4L:
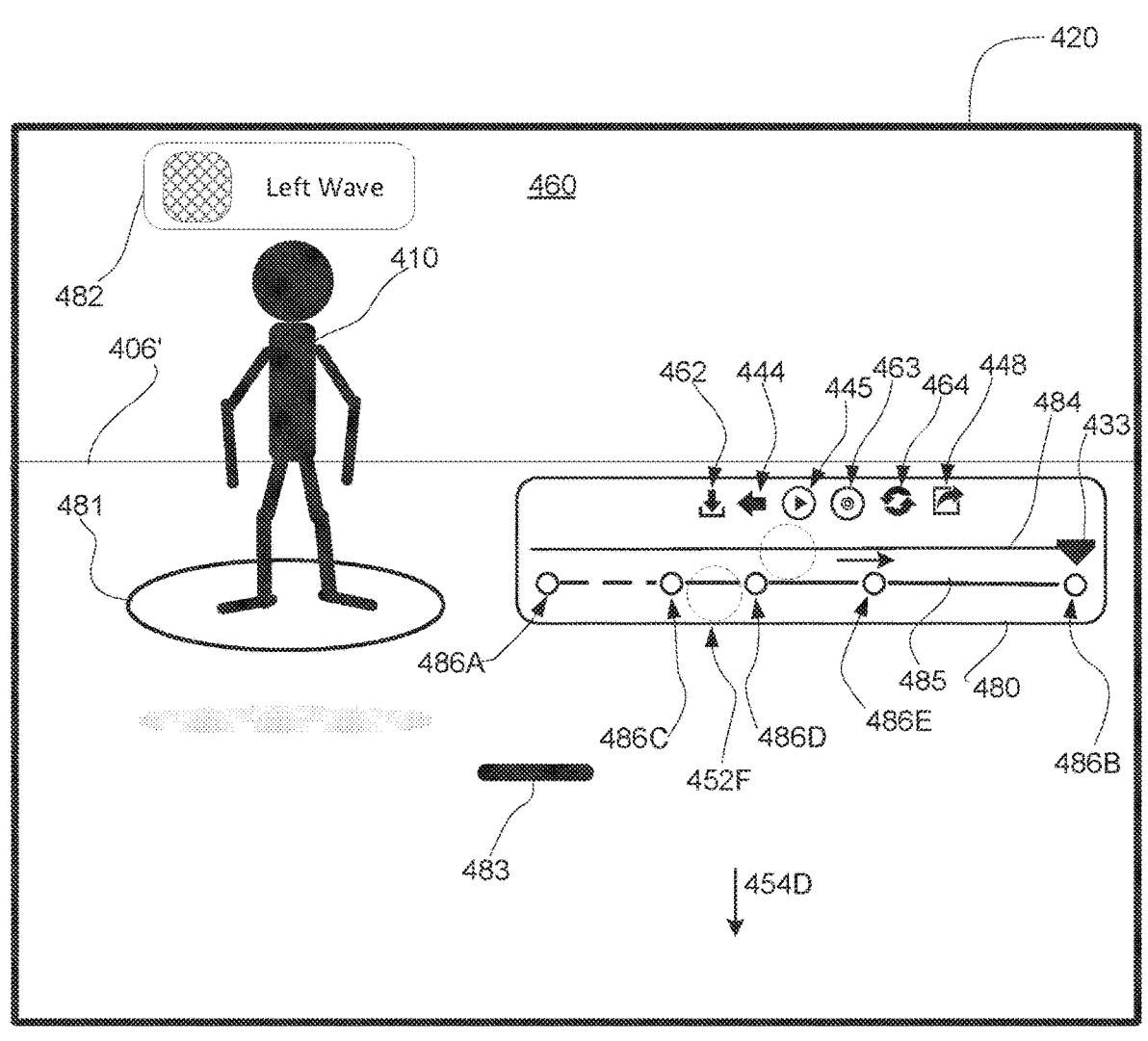
Figure 4M:
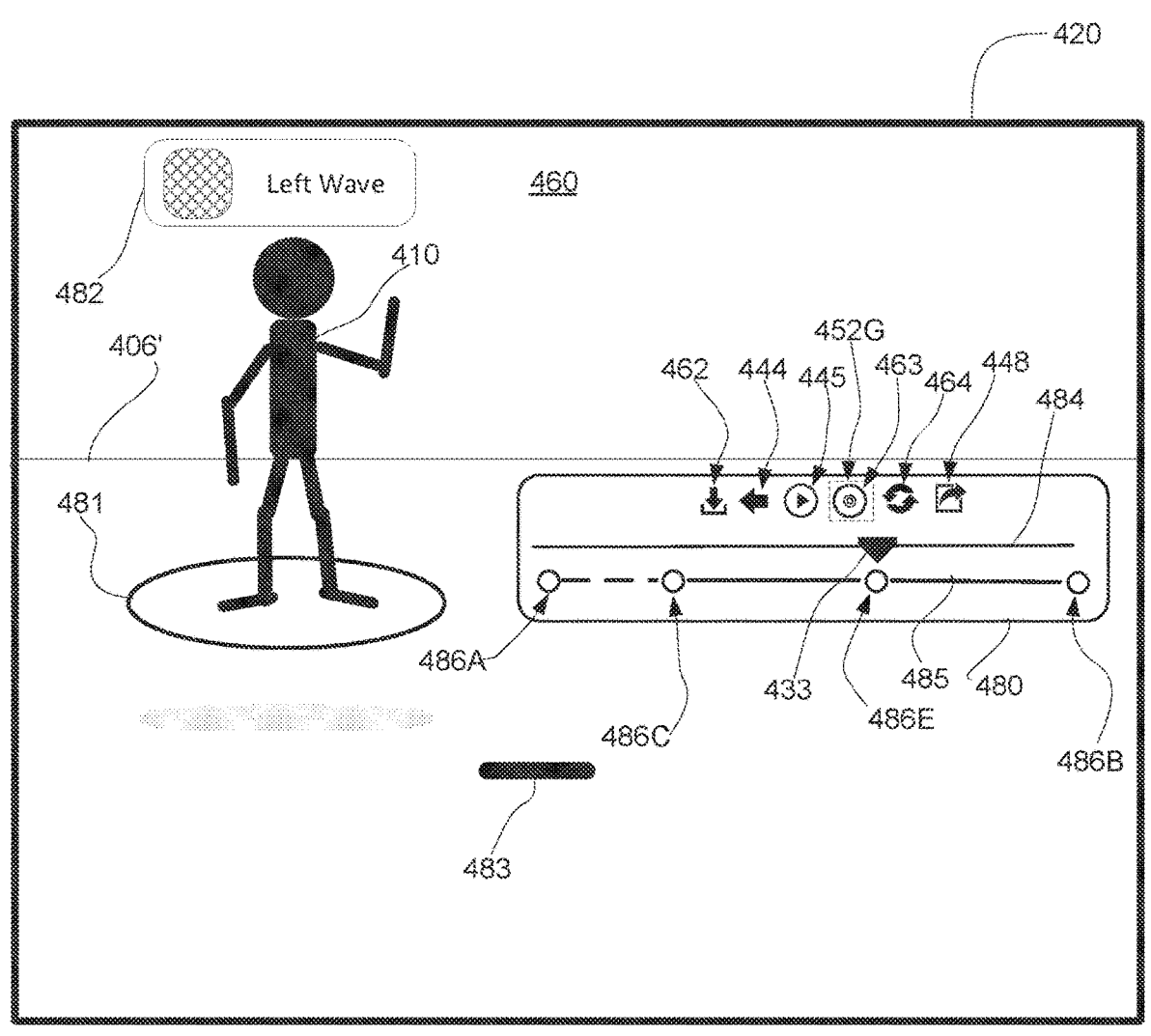
Figure 4N:
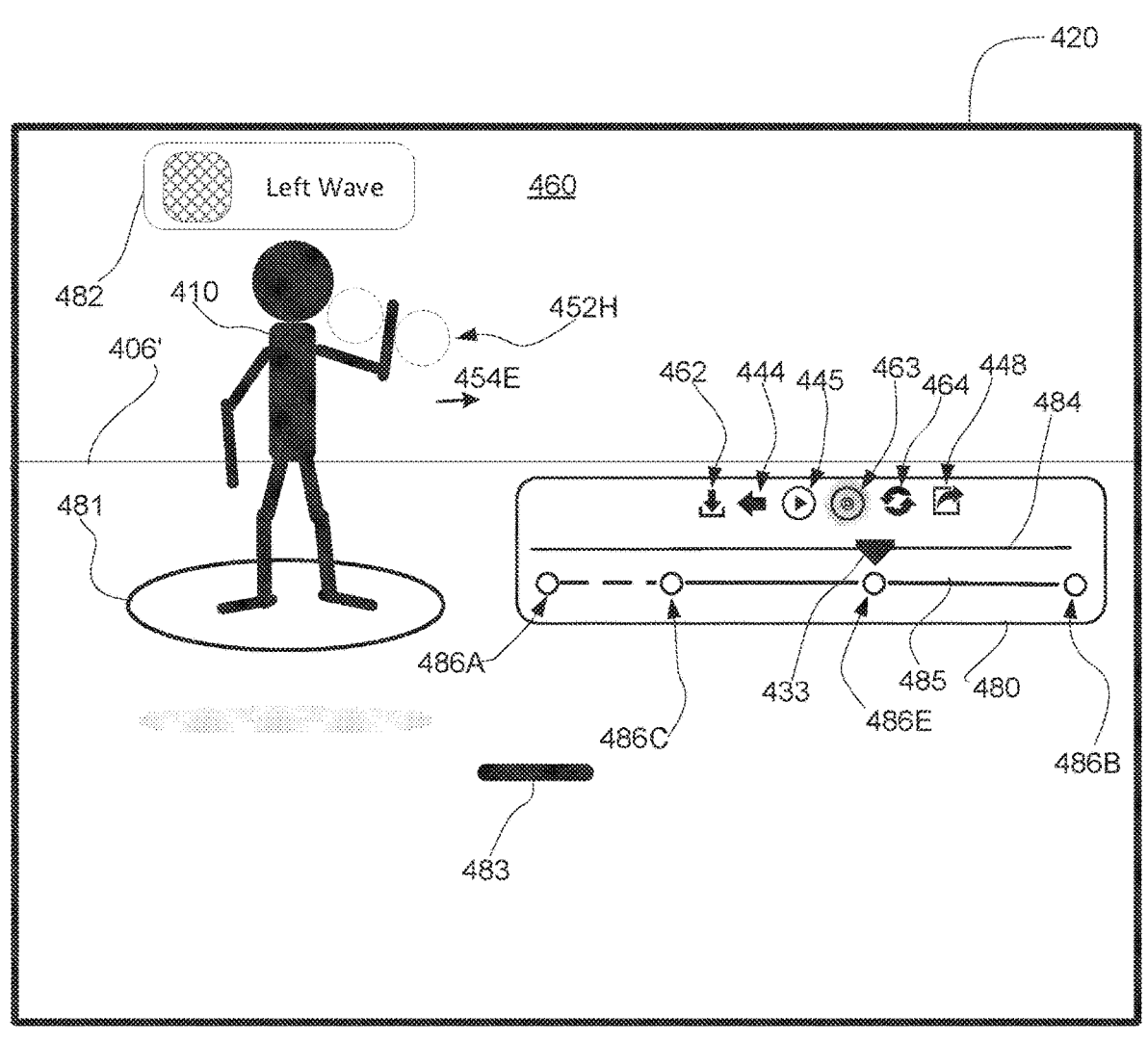
Figure 40:
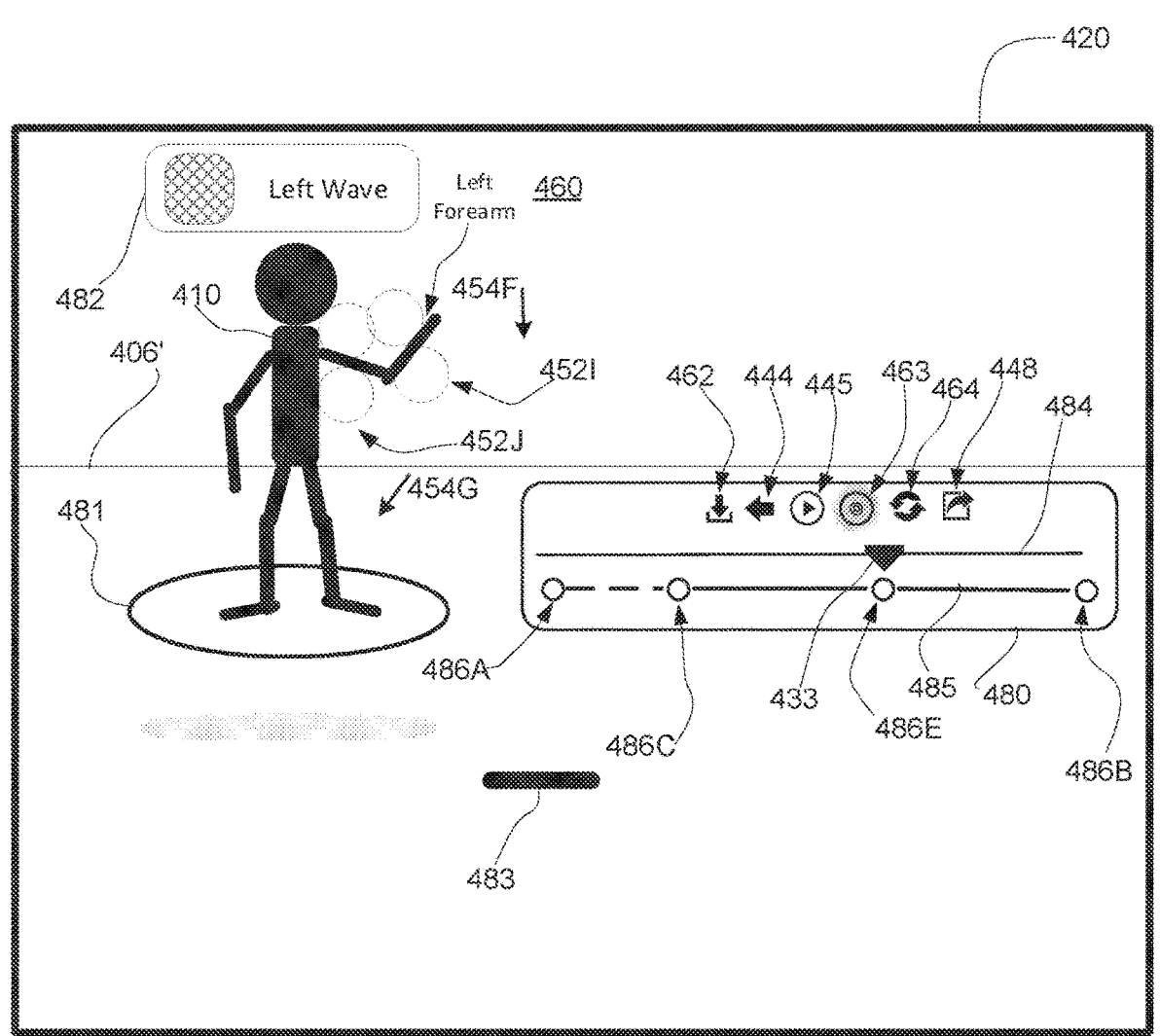
Figure 4P:
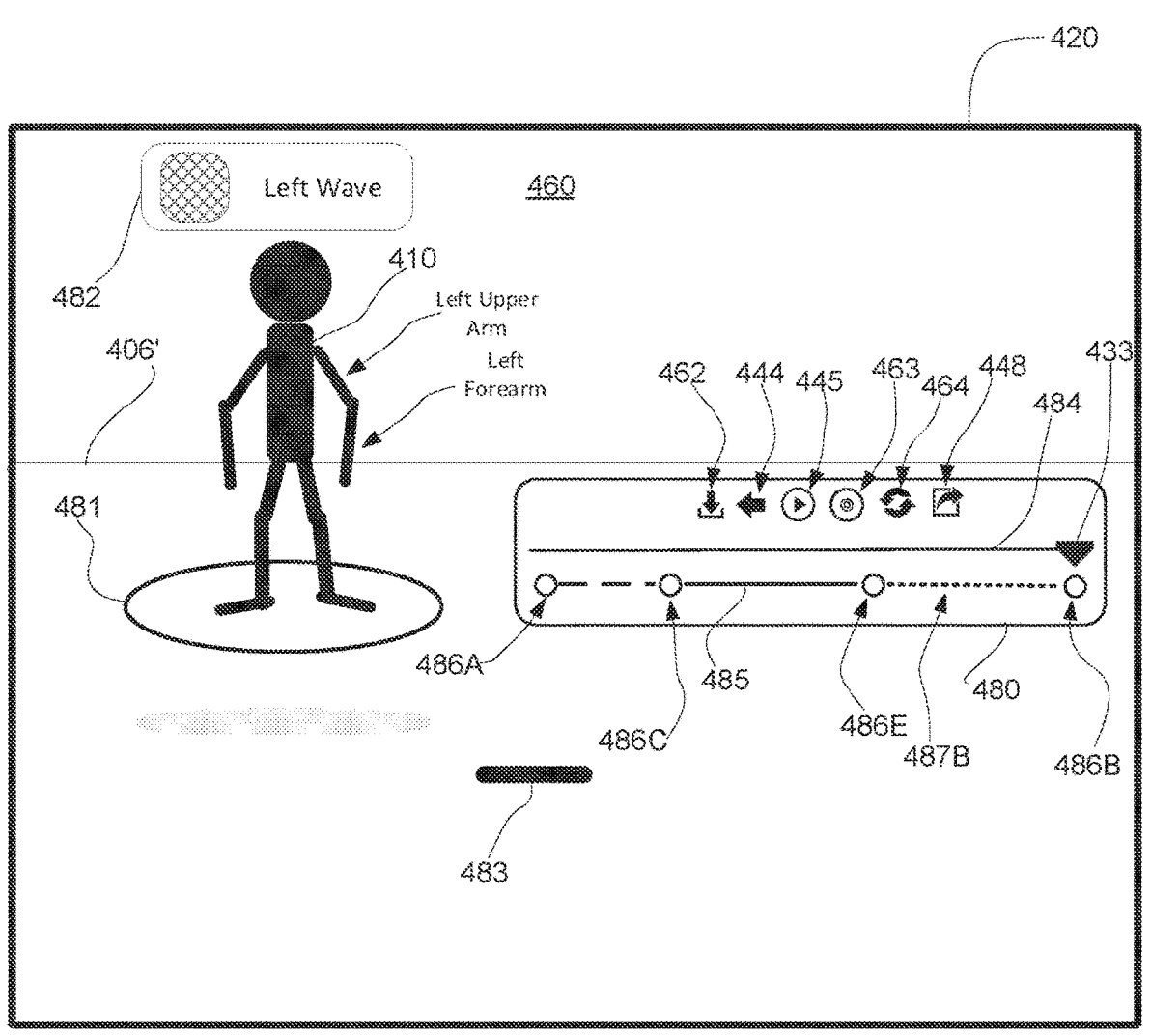

FIGS. 4A-4P illustrate example interactions with a three-dimensional graphical user interface 480 of a virtual motion capture application according to some examples of the disclosure. In some examples, the three-dimensional graphical user interface may be presented in a three-dimensional computer-generated environment 360 at an electronic device 420. The electronic device 420 may be similar to device 101 or 220, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, displays formed as lenses designed to be placed on a person's eyes (e.g., similar to contact lenses), respectively. In the example of FIGS. 4A-4P, a user is optionally wearing the electronic device 420, such that the three-dimensional environment 460 can be defined by X, Y and Z axes as viewed from a perspective of the electronic device (e.g., a viewpoint associated with the electronic device 420, which may be a head-mounted display, for example).

As shown in FIG. 4A, the electronic device 420 may be in a physical environment that includes a table 406 (e.g., a portion of the table, such as a top surface of the table). Thus, the three-dimensional environment 460 presented using the electronic device 420 optionally includes captured portions of the physical environment surrounding the electronic device 420, such as a representation of the table 406' (e.g., a representation of the top surface of the table). Additionally, in some examples, the three-dimensional environment 460 may include representations of the floor, ceiling, and walls of the room in which the electronic device 420 is located.

In some examples, the three-dimensional environment 460 may include a virtual object 410, as shown in FIG. 4A. In some examples, the virtual object 410 may be similar to or correspond to the first object 310 described with reference to FIGS. 3A-3O. For example, as discussed herein, the virtual object 410 may be three-dimensional model that has been imported into the virtual motion capture application for animation via the three-dimensional graphical user interface. In some examples, the three-dimensional graphical user interface is associated with the virtual motion capture application, which is optionally running on the electronic device 420. In some examples, the three-dimensional graphical user interface comprises a user interface element 480 (e.g., a three-dimensional application element), a platter 481 (e.g., on which the virtual object 410 is presented), and/or a project label 482 (e.g., identifying a name of the current project). In the example of FIG. 4A, the virtual object 410 may be a humanoid character to-be-animated using the user interface element 480. In some examples, the three-dimensional graphical user interface may be displayed with a grabber or handlebar affordance 483 that is optionally selectable to initiate movement of the platter 481 (e.g., and thus the virtual object 410), the project label 482, and/or the user interface element 480 within the three-dimensional environment 460.

In some examples, the user interface element 480 may include a plurality of control affordances that are selectable to perform corresponding actions involving the virtual object 410. For example, as shown in FIG. 4A, the user interface element 480 optionally includes a save affordance 462 that, when selected (e.g., via a selection input), causes the electronic device 420 to generate and store metadata (e.g., or update existing metadata) corresponding to the virtual object 410, including animations of the virtual object 410. In some examples, the user interface element 480 may include a reset affordance 444, which is selectable to reset an animation of the virtual object, as described in more detail later. Additionally, as shown in FIG. 4A, the user interface element 480 may include a play affordance 445 that, when selected, causes the electronic device 420 present the animation of the virtual object 410 (e.g., over a single cycle), as discussed in more detail below. In some examples, the user interface element 480 optionally includes a record affordance 463, which may be selectable to initiate a process for recording movements of the virtual object 410 over a defined time frame, as discuss in more detail later. In some examples, the user interface element 480 optionally includes a loop affordance 464, which may be selectable to cause the electronic device 420 to continuously (e.g., repeatedly over an infinite number of cycles) present the animation of the virtual object 410. Finally, as shown in FIG. 4A, the user interface element 480 may include a share affordance 448 that, when selected, optionally causes the electronic device 420 to initiate a process for sharing metadata corresponding to the virtual object 410, including the animation of the virtual object 410, with one or more second users at one or more second electronic devices via message, email, or text, for example, and/or with other applications optionally running on the electronic device 420.

In some examples, the user interface element 480 optionally includes an animation timeline 485, as shown in FIG. 4A. In some examples, the animation timeline 485 has one or more characteristics of the animation timeline 331 described above with reference to FIGS. 3A-3O. For example, the animation timeline 485 may define an animation period (e.g., a duration of time) over which one or more motions and/or movements of the virtual object 410 may be animated. For example, a first end (e.g., a left end) of the animation timeline 485 optionally corresponds to a starting point (e.g., time "0") of the animation period, and a second end (e.g., a right end) of the animation timeline 485 optionally corresponds to an ending point (e.g., time "n") of the animation period. In some examples, the duration of the animation period may be predefined, and/or may be selectively modified or defined (e.g., when the user initially opens a project in the virtual motion capture application on the electronic device 420). In some examples, one or more animated movements of the virtual object 410 may be dictated by one or more key frames associated with the animation timeline 485. For example, as shown in FIG. 4A, at the first end of the animation timeline 485, the user interface element 480 optionally includes a first key frame 486A, and at the second end of the animation timeline 485, a second key frame 486B. In some examples, a respective pose of the virtual object 410 may be associated with each of the one or more key frames. For example, the first key frame 486A may be associated with a first pose, which defines the pose (e.g., appearance of one or more portions) of the virtual object 410 at the start of the animation timeline 485. Similarly, the second key frame 486B may be associated with a second pose (similar to or different from the first pose), which defines the pose of the virtual object 410 at the end of the animation timeline 485. In some examples, the first key frame 486A and the second key frame 486B are included in the user interface element 480 as a default (e.g., without direct user input for adding the key frames to the animation timeline 485).

In some examples, the virtual motion capture application optionally enables the user to create animated motion using a pose-centered approach at the user interface element 480. For example, the user may directly (e.g., via input directed toward) manipulate one or more portions of the virtual object 410 to form new (e.g., subsequent) poses of the virtual object 410 at various points along the animation timeline 485, which results in one or more animated motions of the virtual object 410 (e.g., as the virtual object 410 transitions from one pose to one or more subsequent poses). To create a new pose for the virtual object 410, the user may manipulate a play head scrubber 433 included in the user interface element 480. For example, as shown in FIG. 4A, the play head scrubber 433 may be provided along a play head 484 disposed above the animation timeline 485. In some examples, the play head scrubber 433 indicates a current time within the animation timeline 485, which is optionally currently at the starting time of the animation timeline 485, as shown in FIG. 4A. As shown in FIG. 4A, the user is providing a selection input 452A directed toward the play head scrubber 433. For example, the electronic device 420 receives a pinch gesture (e.g., in which an index finger and thumb of a hand of the user make contact), a tap or touch gesture, or a verbal command while a gaze of the user is directed to the play head scrubber 433.

In some examples, as shown in FIG. 4B, the user of the electronic device 420 optionally translates the play head scrubber 433 (e.g., rightward) along the play head 484, which optionally corresponds to an advance in time along the animation timeline 485. In some examples, the user may directly manipulate the virtual object 410 to create a new pose for the virtual object 410 at the new time in the animation timeline 485. For example, as shown in FIG. 4B, the user is providing a selection input 452B directed to a left upper arm portion of the virtual object 410, followed by movement input 454A. For example, the electronic device 420 receives a pinch gesture while the gaze of the user is directed toward the left upper arm portion of the virtual object 410, followed by movement of the hand of the user in an upward and rightward direction from the viewpoint of the user while the user maintains the pinch gesture. In some examples, as shown in FIG. 4C, in response to receiving the selection input 452B and/or the movement input 454A, the electronic device 420 may move the left upper arm portion of the virtual object 410 in three-dimensional environment 460 in accordance with the movement input 454A. For example, as shown, the left upper arm portion of the virtual object 410 is optionally in a raised/elevated state relative to a top surface of the platter 481.

Additionally, in some examples, in response to receiving the movement input 454A raising/elevating the left upper arm portion of the virtual object 410, the electronic device 420 generates a new key frame corresponding to the new/third pose (e.g., in which the left upper arm portion of the virtual object 410 is raised/elevated). For example, as shown in FIG. 4C, at the location indicated by the play head scrubber 433, the electronic device 420 generates a third key frame 486C within the animation timeline 485. In some examples, the electronic device 420 interpolates the first pose of the virtual object 410 (e.g., shown in FIG. 4B, and corresponding to the first key frame 486A) and the third pose (e.g., corresponding to the third key frame 486C) to generate animated movement of the virtual object 410 as the virtual object 410 transitions from the first pose to the third pose.

Likewise, the electronic device interpolates the third pose and the second pose (e.g., corresponding to the second key frame 486B) to generated animated movement of the virtual object 410 as the virtual object 410 transitions from the third pose to the second pose. In some examples, the electronic device 420 optionally linearly interpolates successive poses to generate the animated movement. In some examples, as discussed in more detail later, the interpolation type applied between successive poses may be selectively modified or adjusted to change an appearance of the animated movement of the transition between successive poses.

In some examples, the user of the electronic device 420 may generate a subsequent animation of the virtual object 410 following the procedure above. For example, as shown in FIG. 4C, the user is optionally providing a selection input 452C directed to the play head scrubber 433 to move the play head scrubber further along the play head 484 to a point in the animation timeline 485 that is later in time, as shown in FIG. 4D. In FIG. 4D, the user of the electronic device 420 may provide a selection input 452D followed by movement input 454B corresponding to movement directed to a left forearm portion of the virtual object 410. For example, as shown, the user is providing movement in an upward and rightward direction relative to the viewpoint of the user. In some examples, as similarly described above, in response to receiving the selection input 452D and/or the movement input 454B, the electronic device 420 optionally moves the left forearm portion of the virtual object 410 in accordance with the movement input 454B. For example, as shown in FIG. 4E, the left forearm portion of the virtual object is shown in a raised/elevated state with respect to the top surface of the platter 481.

Additionally, as discussed above, in response to receiving the movement input 454B, the electronic device 420 may generate a fourth key frame 486D corresponding to a fourth pose of the virtual object 410 (e.g., in which the left forearm portion of the virtual object is raised/elevated). As shown in FIG. 4E, the fourth key frame 486D is optionally placed within the animation timeline 485 at a location indicated by the play head scrubber 433. Additionally, as similarly discussed above, the electronic device 420 may interpolate (e.g., linearly) the third pose (e.g., shown in FIG. 4D, and corresponding to the third key frame 486C) and the fourth pose (e.g., corresponding to the fourth key frame 486D) to generate subsequent animated movement of the virtual object 410 as the virtual object 410 transitions from the third pose to the fourth pose. In some examples, the electronic device 420 may also interpolate the fourth pose and the second pose (e.g., corresponding to second key frame 486B) to generate subsequent animated movement of the virtual object 410 as the virtual object 410 transitions from the fourth pose to the second pose. In some examples, the interpolations of the third pose and the fourth pose and the third pose and the second pose, respectively, optionally overwrite (e.g., replace) the interpolation of the third pose and the second pose generated previously and discussed above with reference to FIG. 4C.

As shown in FIG. 4F, in some examples, the user of the electronic device 420 may generate subsequent animations of the virtual object 410 according to the methods discussed above. For example, as shown, the user of the electronic device 420 has advanced the play head scrubber 433 along the play head 484 corresponding to an advancement of time along the animation timeline 485. As shown in FIG. 4F, electronic device 420 has generated a fifth key frame 486E at the advanced position in the animation timeline 485 corresponding to a fifth pose of the virtual object 410. For example, the user has provided input directed to the left forearm portion of the virtual object 410, and has moved the left forearm portion leftward relative to the viewpoint of the user. Accordingly, as discussed above, the electronic device 420 interpolates the fourth pose (shown in FIG. 4E, and corresponding to the fourth key frame 486D) and the fifth pose (e.g., corresponding to the fifth key frame 486E) to generate subsequent animated motion of the virtual object 410 as the virtual object 410 transitions from the fourth pose to the fifth pose. Additionally, in some examples, the electronic device 420 interpolates the fifth pose and the second pose (e.g., corresponding to the second key frame 486B) to generated subsequent animated motion of the virtual object 410 as the virtual object transitions from the fifth pose to the second pose.

Accordingly, in the examples discussed above, the user of the electronic device 420 has animated a left arm wave motion for the virtual object 410. In some examples, as mentioned above with reference to FIG. 4A, the user may selectively assign a name or label to the animated motion using the project label 482. As shown in FIG. 4F as an example, the user has assigned the name "Left Wave" to the animated motion discussed above (e.g., by providing input directed to the project label 482). In some examples, the user may initiate preview of the animation of the virtual object 410 by returning the play head scrubber 433 to the starting end of the animation timeline 485. In some examples, the user may provide input directed to the play head scrubber 433 to move the play head scrubber 433 (e.g., leftward) along the play head 484 to the starting position in the animation timeline 485. Additionally or alternatively, in some examples, as shown in FIG. 4F, the user may provide a selection input (e.g., a pinch gesture, tap or touch gesture, a verbal command, etc.) 452F directed to the reset affordance 444 of the user interface element 480.

In some examples, in response to receiving the selection input 452F, as shown in FIG. 4G, the electronic device may move the play head scrubber 433 along the play head 484 to a position corresponding to the first key frame 486A in the animation timeline 485. As shown in FIG. 4G, in response to receiving the selection input 452F, the electronic device 420 may also update the appearance of the virtual object 410, such that the virtual object 410 is displayed with the first pose corresponding to the first key frame 486A. In some examples, the user of the electronic device 420 may then preview the animation of the virtual object 410 by selecting the play affordance 445. For example, as shown in FIG. 4G, the user is providing a selection input 452G directed to the play affordance 445 (e.g., the user is providing a pinch gesture, a tap or touch gesture, or a verbal command while the gaze of the user is directed to the play affordance 445). In some examples, in response to receiving the selection input 452G, the electronic device 420 optionally presents the animation of the virtual object 410 in three-dimensional environment 460. As shown in FIG. 4H, the left upper arm and left forearm portions of the virtual object 410 optionally perform the left wave motion defined by the transitions between successive poses defined by the key frames 486A-486E, starting with the first pose at the first key frame 486A and ending with the second pose at the second key frame 486B. Additionally, as the virtual object 410 performs the animated motion, the play head scrubber 433 may move in real-time (e.g., within 0.5, 1, 5, 10, 15, 20, 35, 50, etc. milliseconds of receiving the selection of the play affordance 445) along the play head 484 to indicate advancement of time along the animation timeline 485. In some examples, the user of the electronic device 420 may pause/stop the animation of the virtual object 410 by providing a subsequent selection directed to the play affordance 445.

As discussed above, the electronic device 420 may generate animated motion for the virtual object 410 by interpolating successive poses. As mentioned above, in some examples, the electronic device 420 may default to (i.e., initially) interpolate successive poses using a linear interpolation model. In some examples, as described below, the user may selectively alter the interpolation type used to generate the animated motion to change an appearance (e.g., form, fluidity, smoothness, etc.) of the transitions between successive poses. As shown in FIG. 4I, in some examples, the user of the electronic device 420 may select (e.g., via a selection input, such as a pinch gesture, a tap or touch gesture, or a verbal command) a segment of the animation timeline 485 that is between successive key frames to view and/or modify the interpolation type for the animation of the virtual object between the key frames. For example, as shown, the user has selected a first segment 487A of the animation timeline 485 that is between the first key frame 486A (e.g., corresponding to the first pose) and the third key frame 486C (e.g., corresponding to the third pose). As shown in FIG. 4I, in response to receiving the selection of the first segment 487A, the electronic device 420 displays an interpolation window 488A in three-dimensional environment 460. In some examples, the interpolation window 488A includes a scrollable list of interpolation types for animating the transition from the first pose at the first key frame 486A to the third pose at the third key frame 486C, including a visual indicator 455 of a currently-implemented interpolation type (e.g., "Linear").

In some examples, the user of the electronic device 420 may select an alternative interpolation type from the interpolation window 488A to change the interpolation type. For example, as shown in FIG. 4J, the user has selected "Ease In" interpolation type in the interpolation window 488A. In some examples, in response to receiving selection of a respective interpolation type, the electronic device 420 updates display of the visual indicator 455, which is redisplayed at the "Ease In" interpolation type. Additionally, in some examples, the electronic device 420 optionally changes the interpolation type for the animation between the first key frame 486A and the third key frame 486C which may include altering display of the first segment 487A. For example, as shown in FIG. 4J, the electronic device 420 changes an appearance of the first segment 487A (e.g., from solid to dashed) to indicate that the interpolation type has been changed. In some examples, the user may provide a subsequent selection input (e.g., a pinch, tap or touch gesture, verbal command) directed to empty space in three-dimensional environment 460 or to the first segment 487A to cause the electronic device 420 to cease display of the interpolation window 488A.

In some examples, the user of the electronic device 420 may selectively change a position of a respective key frame within the animation timeline 485 to cause the virtual object 410 to perform a respective pose at a different time within the animation timeline 485. For example, as shown in FIG. 4K, the user of the electronic device 420 may provide a selection input 452E, such as a pinch gesture, directed to the fifth key frame 486E, followed by movement input 454C corresponding movement to move the fifth key frame 486E to a different location within the animation timeline 485. In some examples, in response to receiving the movement input 454C (e.g., and after receiving a release of the selection input 452E), the electronic device 420 moves the fifth key frame 486E in accordance with the movement input 454C. For example, as shown in FIG. 4L, the fifth key frame 486E has moved rightward along the animation timeline 485. In some such examples, the animated motion of the virtual object 410 for transitioning from the fourth pose to the fifth pose may occur over a longer period of time between the fourth key frame 486D and the fifth key frame 486E than previously (e.g., before the movement input 454C was received).

In some examples, the user of the electronic device 420 may selectively remove/delete a respective key frame from the animation timeline 485, which optionally causes the electronic device 420 to forgo animating the virtual object 410 to perform a respective pose corresponding to the respective key frame. For example, as shown in FIG. 4L, the user of the electronic device 420 may provide a selection input 452F directed to the fourth key frame 486D, followed by movement input 454D corresponding to movement of the fourth key frame 486D outside of the user interface element 480. As shown in FIG. 4L, the user is optionally providing movement in a downward direction (e.g., with respect to the top surface of the representation of the table 406') outside of the user interface element 480. In some examples, as shown in FIG. 4M, in response to receiving the movement input 454D (e.g., and after receiving a release of the selection input 452F), the electronic device 420 optionally removes the fourth key frame 486D from the animation timeline 485. In some such examples, when the fourth key frame 486D is removed, the electronic device 420 may interpolate the third pose (e.g., corresponding to the third key frame 486C) and the fifth pose (e.g., corresponding to the fifth key frame 486E) to account for the removal of the fourth pose (e.g., corresponding to the fourth key frame 486D).

In some examples, portions of the animated motion of the virtual object 410 may be generated using direct motion capture over a defined time period within the animation timeline 485. For example, as mentioned above with reference to FIG. 4A, the user interface element 480 optionally includes a record affordance 463 that is selectable to cause the electronic device 420 to enter a recording mode for capturing motion of the virtual object 410. As shown in FIG. 4M, the user of the electronic device 420 is optionally providing a selection input 452G (e.g., a pinch gesture, a tap or touch gesture, or a verbal command) directed to the record affordance 463. In some examples, as shown in FIG. 4N, in response to receiving the selection input 452G, the electronic device 420 optionally enters the recording mode. In some examples, while the electronic device 420 is in the recording mode, the user may directly manipulate one or more portions of the virtual object 410 to create motion over a defined time period in the animation timeline 485. For example, in FIG. 4N, because the play head scrubber 433 is located above the fifth key frame 486E, the defined time period extends between the time at the fifth key frame 486E and a time at the second key frame 486B. The manipulations of the virtual object 410 recorded over this time period thus determine the animation of the virtual object between the fifth key frame 486E and the second key frame 486B (e.g., rather than the interpolation type determining the animation therebetween).

In some examples, while the electronic device 420 is in the recording mode, the user of the electronic device 420 may provide a series of inputs directed one or more portions of the virtual object 410. For example, in FIG. 4N, the user may desire to animate a more smooth or realistic transition from the to the fifth pose (e.g., corresponding to the fifth key frame 486E), in which the left upper arm and left forearm portions of the virtual object 410 are in a raised orientation, to the second pose (e.g., corresponding to the second key frame 486B), in which the left upper arm and left forearm portions are in a relaxed/resting orientation. For example, as shown in FIG. 4N, while the electronic device 420 is in the recording mode, the user may provide a selection input 452H directed to the left forearm portion of the virtual object 410, followed by movement input 454E corresponding to movement in a rightward direction relative to the viewpoint of the user. In response to receiving the movement input 454E, as shown in FIG. 4O, the electronic device 420 optionally moves the left forearm portion of the virtual object 410 rightward relative to the viewpoint of the user in accordance with the movement input 454E. In some examples, the user of the electronic device 420 may selectively provide additional inputs directed to one or more portions of the virtual object 410 while the electronic device 420 is in the recording mode. As shown in FIG. 4O, the user may provide a selection input 452I directed to the left forearm portion of the virtual object 410, followed by movement input 454F corresponding to movement in a downward direction relative to the viewpoint of the user. Additionally, the user may provide a selection input 452J directed to the left upper arm portion of the virtual object 410, followed by movement input 454G corresponding to movement in a downward and leftward direction relative to the viewpoint of the user. In some examples, the movement inputs 454F and 454G may be provided successively or concurrently. For example, the electronic device 420 may receive a first pinch gesture provided by a first hand of the user directed to the left forearm portion of the virtual object, and may subsequently and/or concurrently receive a second pinch gesture provided by a second hand of the user directed to the left upper arm portion of the virtual object 410, followed by movement inputs 454F and 454G, respectively (e.g., which may also be received successively or concurrently).

In some examples, in response to receiving the movement inputs 454F and/or 454G, the electronic device 420 optionally moves the left forearm and left upper arm portions of the virtual object 410 in accordance with the movement inputs 454F and/or 454G, as shown in FIG. 4P. For example, as shown, the left arm of the virtual object 410 is displayed in a resting/lowered orientation with respect to the top surface of the platter 481. In some examples, the user of the electronic device 420 may exit the recording mode by providing a subsequent selection input (e.g., a pinch gesture, a tap or touch gesture, or a verbal command) directed to the record affordance 463. In some examples, in response to receiving the input corresponding to a request to exit the recording mode, the electronic device 420 animates the transition from the fifth pose (at fifth key frame 486E) to the second pose (at second key frame 486B) according to the manipulations of the virtual object 410 received while the electronic device 420 was in the recording mode. In some examples, the electronic device 420 optionally changes an appearance of a second segment 487B of the animation timeline 485 that is between the fifth key frame 486E and the second key frame 486B to indicate that the animation of the virtual object 410 over the second segment 487B of the animation timeline 485 has been changed from being based on the previous interpolation type (e.g., linear interpolation) to being based on the captured motions of the virtual object 410 (e.g., in FIGS. 4N-4O). Thus, the animated motion of the virtual object 410 may more smoothly and realistically transition from the elevated state of the left arm wave motion, to the resting state shown in FIG. 4P.

Thus, as outlined above, the disclosed method enables the user of the electronic device to easily, intuitively, and efficiently animate a virtual object in a three-dimensional environment by directly manipulating one or more portions of the virtual object at desired moments in time over the animation timeline. It should be understood that the appearances of the user interface element 480, the platter 481, and the virtual object 410 provided in FIGS. 4A-4P are merely exemplary and that these graphical elements may be alternatively configured or designed, and that additional or alternative user interface elements, options, objects, and/or controls may be provided within the three-dimensional environment 460 for animating the virtual object 410. Additionally, it should be understood that the appearance (e.g., shape, design, color, emphasis, etc.) of the various user interface elements, options, objects, and/or controls are merely exemplary and that alternative appearances may be provided. Attention is now directed to systems and methods of inter-device communication for animating motion of an object that is presented at a first electronic device and at a second electronic device, wherein the first electronic device and the second electronic device optionally utilize the user interfaces described above.

FIGS. 5A-5H illustrate example interactions between a virtual motion capture application operating on a first electronic device and an animation editor and creation application operating on a second electronic device according to some examples of the disclosure. In some examples, the first electronic device 520 is in communication with the second electronic device 530 (e.g., via communication circuitry 222A/222B in FIG. 2). In some examples, three-dimensional environment 560 is presented using the first electronic device 520. In some examples, the electronic devices 520/530 optionally correspond to electronic devices 420/330 in FIGS. 4A-4P and/or FIGS. 3A-3O, respectively. In some examples, the three-dimensional environment 560 may include captured portions of the physical environment in which the electronic devices 520/530 are located. For example, the three-dimensional environment 560 includes a table (e.g., a representation of table 506') and the second electronic device (e.g., representation of electronic device 530'), including the animation editor user interface (e.g., representation of animation editor user interface 550') displayed via the display (e.g., representation of display 314') of the second electronic device 530. In some examples, the three-dimensional environment 560 optionally corresponds to three-dimensional environment 460 in FIGS. 4A-4P. In some examples, the animation editor user interface 550' optionally corresponds to the animation editor user interface 350 in FIGS. 3A-3O. In some examples, the three-dimensional environment 460 also includes the virtual motion capture graphical user interface, which includes the user interface element 580, the platter 581, and the project label 582. In some examples, the user interface element 580, the platter 581, and the project label 582 optionally correspond to the user interface element 480, the platter 481, and/or the project label 482 in FIGS. 4A-4P.

Figure 5A:
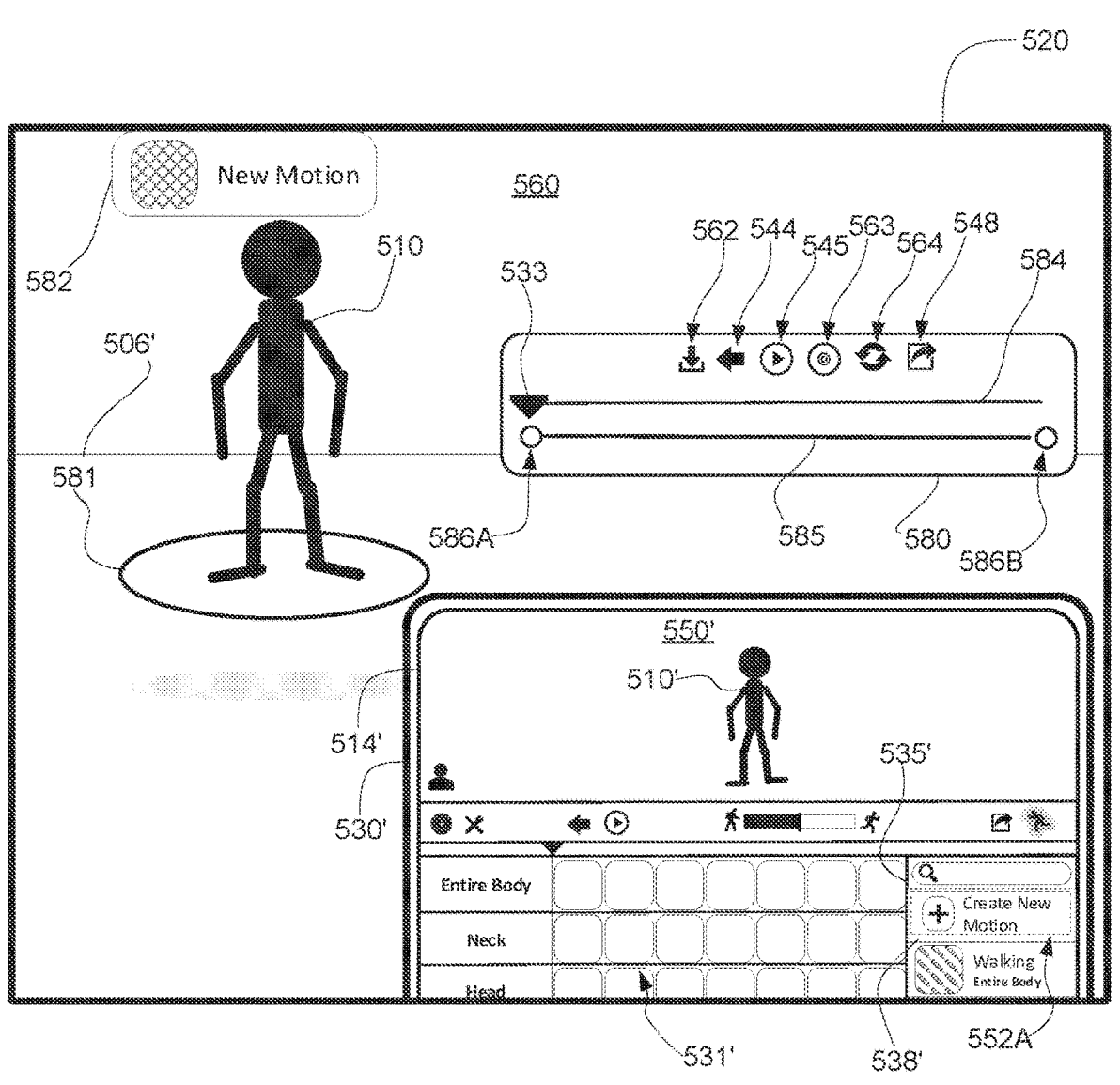
FIGS. 5A-5H illustrate example interactions between a virtual motion capture application operating on a first electronic device and an animation editor and creation application operating on a second electronic device according to some examples of the disclosure.

As shown in FIG. 5A, the three-dimensional environment 560 optionally includes a virtual object 510 displayed atop the platter 581. In some examples, the virtual object 510 optionally corresponds to virtual object 410 in FIGS. 4A-4P. Additionally, as shown in FIG. 5A, the animation editor user interface 550' displayed at the second electronic device 530' optionally includes a (e.g., two-dimensional) representation of virtual object 510'. In some examples, while the first electronic device 520 and the second electronic device 530' are communicatively linked, the virtual motion capture application running on the first electronic device 520 may be configured to communicate with the animation editor application running on the second electronic device 530'. For example, the virtual motion capture application running on the first electronic device 520 may exchange metadata corresponding to the animation of the virtual object 510 with the animation editor application running on the second electronic device 530'.

Figure 5B:
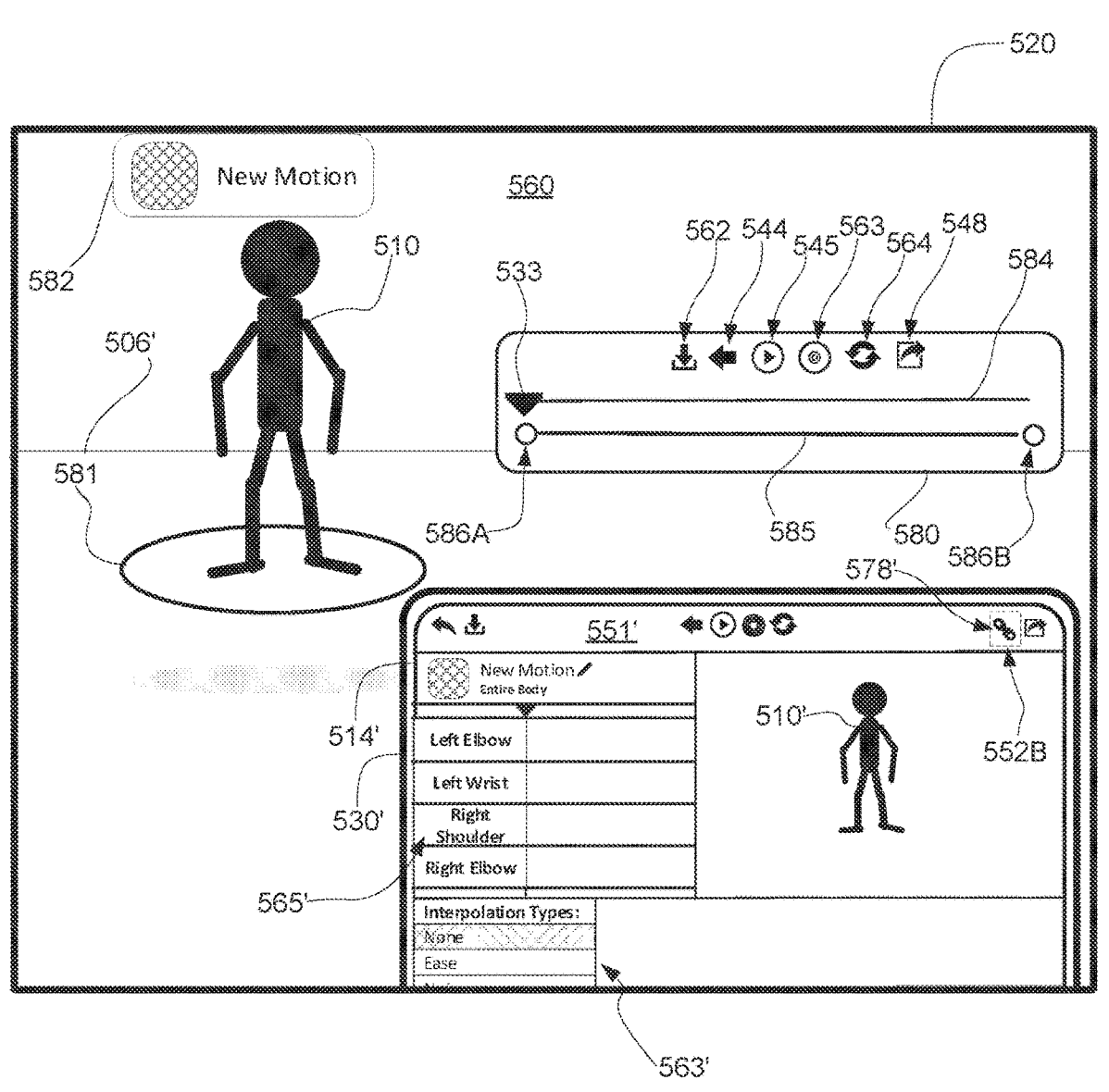

It should be noted that, in some examples, user input is optionally required to cause the virtual motion capture application to communicate with the animation editor application. For example, as shown in FIG. 5A, the user of the first electronic device 520 and the second electronic device 530' is providing a selection input 552A (e.g., a tap or touch input, a click input, or a verbal command) directed to the motion creation option 538' of the library of motion effects 535' displayed in the animation editor user interface 550'. In some examples, the motion creation option 538' and the library of motion effects 535' optionally correspond to the motion creation option 338 and the library 335 of motion effects in FIGS. 3A-3O, respectively. In some examples, as shown in FIG. 5B, in response to receiving the selection input 552A, the second electronic device 530' displays motion creation user interface 551'. In some examples, the motion creation user interface 551' optionally corresponds to the motion creation user interface 351 in FIGS. 3A-3O.

As shown in FIG. 5B, in some examples, the motion creation user interface 551' optionally includes a pairing option 578' that is selectable to cause the second electronic device 530' to communicatively link the animation editor application with the virtual motion capture application running on the first electronic device 520. As shown in FIG. 5B, the user is optionally providing a selection input directed to the pairing option 578' at the second electronic device 530'. In some examples, in response to receiving the selection input 552B, the animation editor application and the virtual motion capture application optionally become paired (e.g., via communication between the second electronic device 530' and the first electronic device 520, respectively). In some examples, while the animation editor application and the virtual motion capture application are communicatively linked, the user may utilize the tools of both applications to create animated motion of the virtual object 510. For example, as shown in FIG. 5C, the user may desire to create animated motion similar to a jumping motion, as indicated by the project label 582 and the label of the motion creation user interface 551'.

As described above with reference to FIGS. 3A-3O, the user may create a respective motion for the virtual object 510 by individually selecting respective user interface objects 565' of the motion creation user interface 551' and adjusting one or more motion parameters of a respective interpolation type 563'. However, in some instances, this approach may prove time-consuming for motions involving multiple portions of the virtual object 510. As discussed below, providing functionality in three-dimensional environment 560 for directly manipulating portions of the virtual object 510 using the virtual motion capture application at the first electronic device 520 enables a more efficient and intuitive approach to creating a respective motion for the virtual object 510.

Figure 5C:
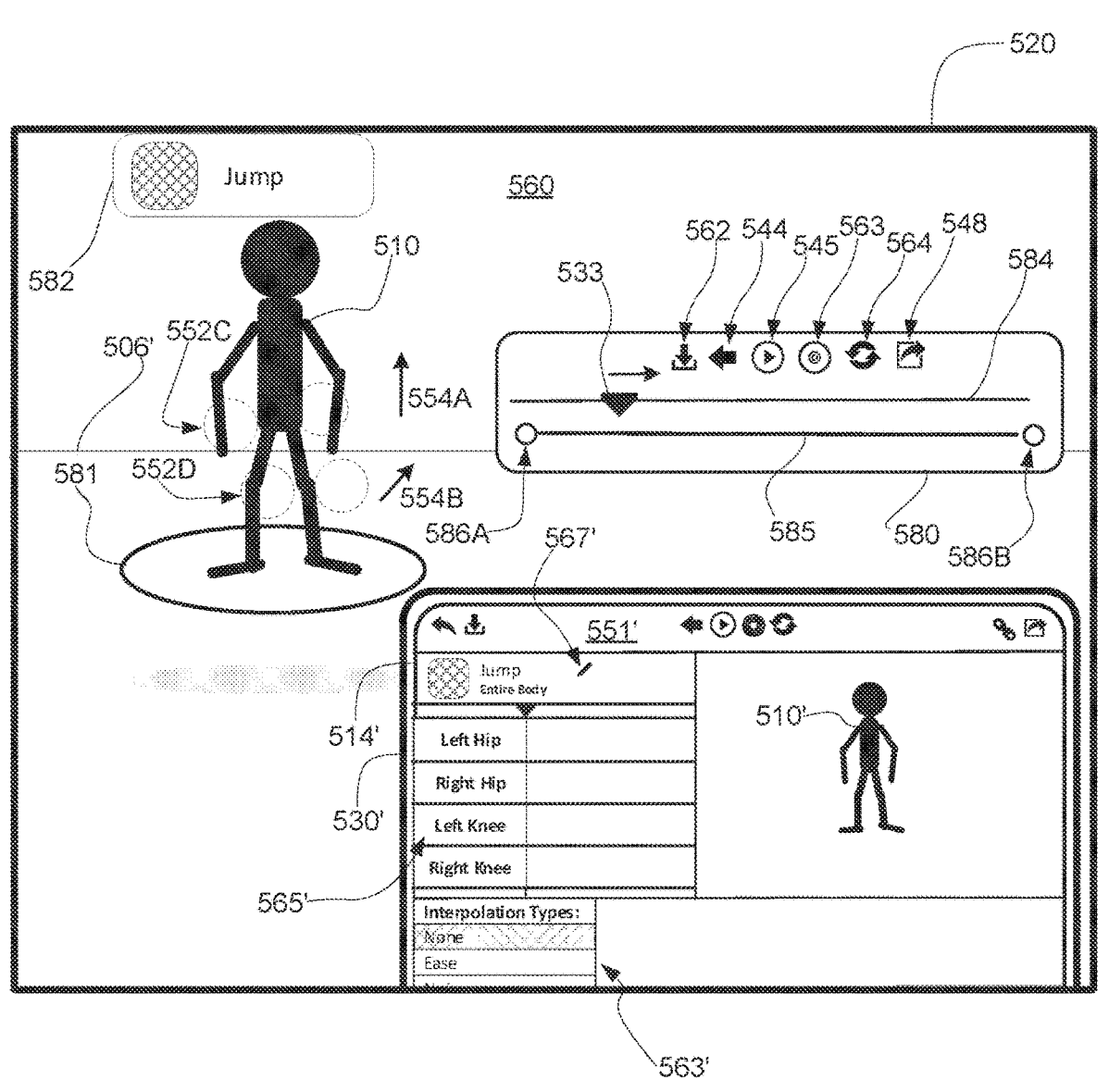

As shown in FIG. 5C, the user may utilize the user interface element 580 in three-dimensional environment 560 to create a jumping motion effect. As similarly described above with reference to FIG. 5G, the animation timeline 585 may include a first (e.g., starting) key frame 586A and a second (e.g., ending) key frame 586B corresponding to a first (e.g., starting) pose and a second (e.g., ending) pose of the virtual object 510, respectively. As shown as an example, the user has moved the play head scrubber 533 rightward along the play head 584 (e.g., via selection and movement inputs) within the user interface element 580 to a new point in time along the animation timeline 585. As shown in FIG. 5C, the user is optionally providing a series of manipulation inputs directed to the virtual object 510 in three-dimensional environment 560. For example, as shown, the user may provide a selection input 552C directed to the hip portions of the virtual object 510, followed by movement input 554A corresponding to movement in an upward direction relative to the viewpoint of the user. For example, the first electronic device 520 receives a pinch gesture while the gaze of the user is directed toward the hip portions of the virtual object 510, and detects the hand of the user move in an upward direction while maintaining the pinch gesture. Additionally or subsequently, in the example of FIG. 5C, the user optionally provides a selection input directed to the left knee portion of the virtual object 510, followed by movement input 554B corresponding to movement in an upward and rightward direction relative to the viewpoint of the user.

Figure 5D:
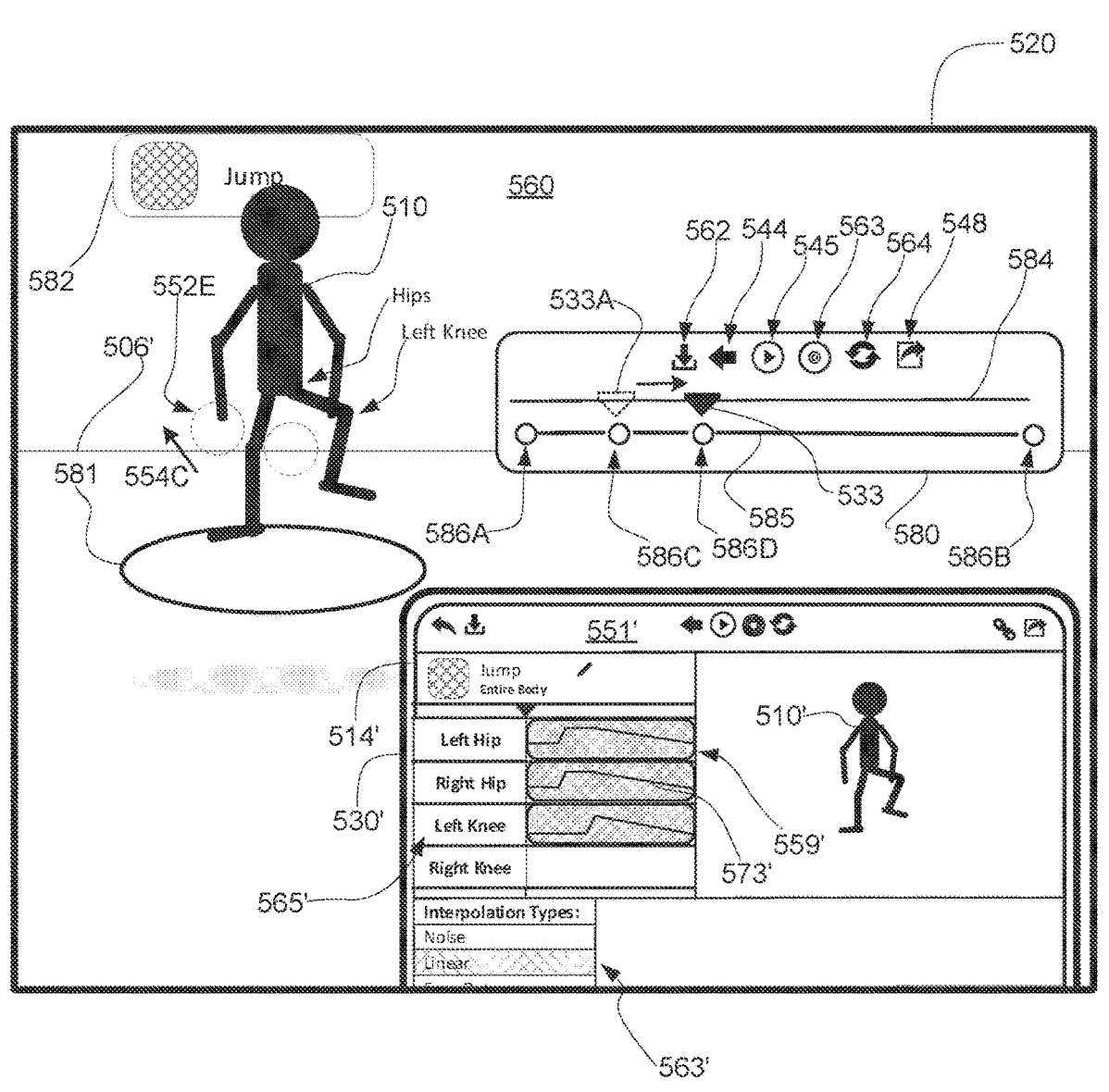

As shown in FIG. 5D, in response to receiving the selection inputs 552B/552C and/or the movement inputs 554A/554B, the first electronic device 520 moves the hip portions and the left knee portions of the virtual object 510 in accordance with the movements. For example, as shown, the hips and left knee portions of the virtual object 510 are displayed in three-dimensional environment 560 in a raise/elevated orientation with respect to the top surface of the platter 581. Additionally, as shown in FIG. 5D, the first electronic device 520 generates key frames corresponding to the movements of the virtual object 510 within the animation timeline 585. For example, the first electronic device 520 generates a key frame 586C corresponding to the movement of the hip portions of the virtual object 510, and (e.g., after a subsequent movement of the play head scrubber 533A) generates a key frame 586D corresponding to the movement of the left knee portion of the virtual object 510. As similarly discussed above with reference to FIGS. 4A-4P, when the first electronic device 520 generates a key frame based on movement of a portion of the virtual object 510 to a new pose, the first electronic device 520 interpolates the successive poses of the virtual object 510 to create animated motion. For example, the first electronic device 520 linearly interpolates the first pose at the first key frame 586A and the third pose at the third key frame 586C, and linearly interpolates the third pose at the third key frame 586C and the fourth pose at the fourth key frame 586D.

In some examples, changes detected at the first electronic device 520 may be communicated to the second electronic device 530' in real time. For example, as shown in FIG. 5D, in response to receiving the movement inputs directed to the virtual object 510 at the first electronic device 520, the second electronic device 530' updates display of the motion creation user interface 551' within 0.5, 1, 5, 10, 15, 20, 50, 100, 200, 500, etc. milliseconds of receiving the movement inputs. For example, as shown, the second electronic device 530' may update display of the representation of the virtual object 510' in the motion creation user interface 551' in accordance with the movement of the portions of the virtual object 510 at the first electronic device 520. Additionally, as shown in FIG. 5D, the second electronic device 530' may generate and display one or more time elements 559' including one or more corresponding motion curves 573'. As similarly described above with reference to FIGS. 3A-3O, the motion curves 573' optionally each describes a change in positional data over the duration of a time element 559' for a particular portion of the virtual object 510'. In some examples, the duration of the time elements 559' of the motion creation user interface 551' each correspond to (e.g., are each equal to) a duration of the animation timeline 585 of the user interface element 580. Accordingly, because the user changed a relative position of each of the left hip, right hip, and left knee portions of the virtual object 510 at the first electronic device 520, the second electronic device 530' generates and displays a time element 559' and motion curve 573' describing respective changes in position over time for each of the left hip, right hip, and left knee portions of the virtual object 510' (e.g., as the left hip, right hip, and left knee portions of the virtual object 510 transition from the first pose at the first key frame 586A through each of the third, fourth, and second poses at the third, fourth, and second key frames 586C, 586D, and 586B, respectively). Additionally, as similarly mentioned above, because the first electronic device 520 may (e.g., as a default (i.e., initially)) interpolate successive poses linearly, the rates of change shown for the motion curves 573' in the motion creation user interface 551' may be linear as well, as reflected by the display of "Linear" interpolation type 563' with visual emphasis (e.g., highlight/shading).

Figure 5E:
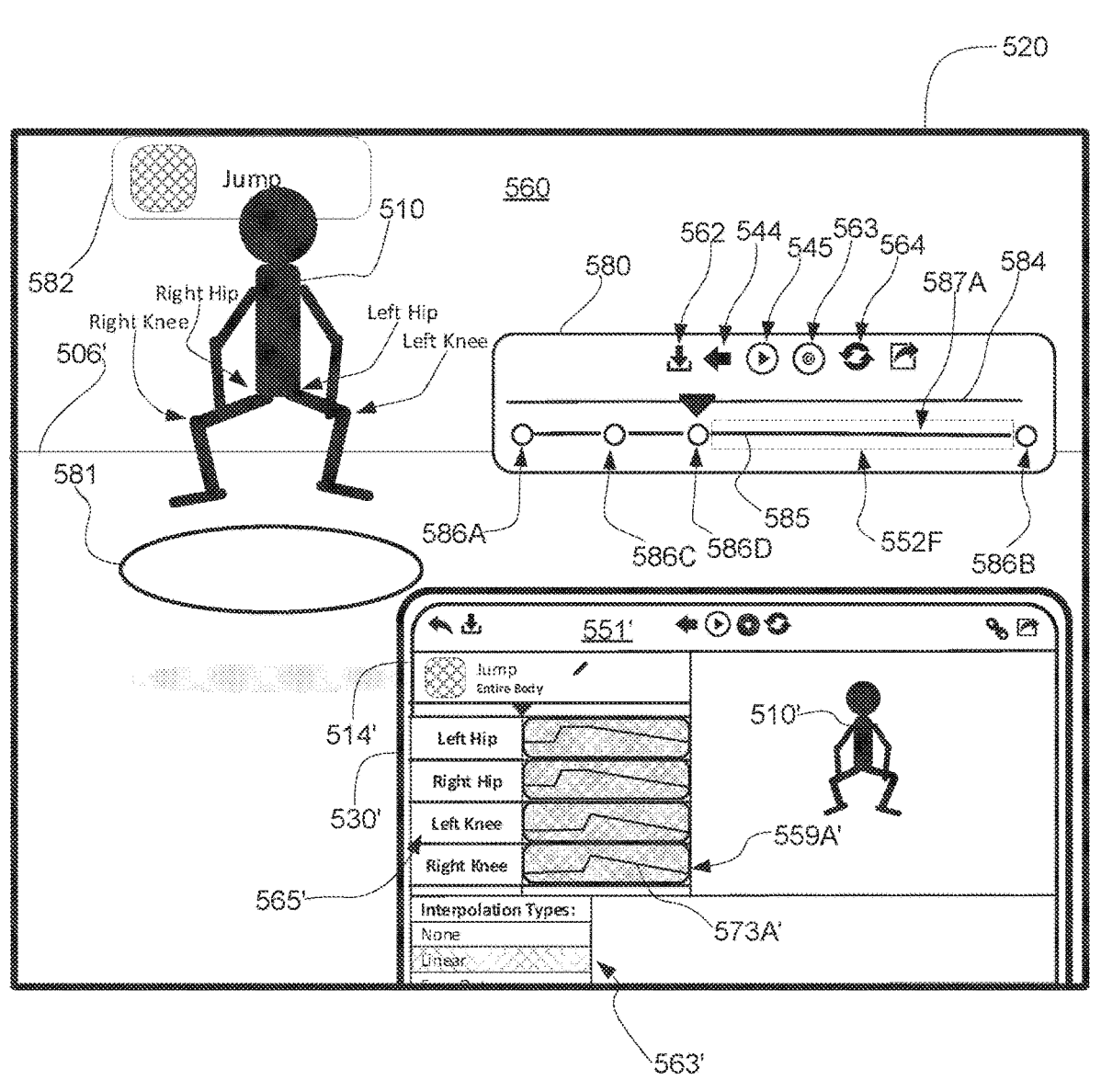

In some examples, as shown in FIG. 5D, the user may manipulate an additional portion of the virtual object 510 to create the jumping motion effect. For example, as shown, while the play head scrubber 533 remains positioned at the fourth key frame 586D, the user provides a selection input (e.g., a pinch gesture) directed to the right knee portion of the virtual object 510, followed by movement input 554C corresponding to movement in a leftward and upward direction relative to the viewpoint of the user. In some examples, in response to receiving the selection input 552E and/or the movement input 554C, as shown in FIG. 5E, the first electronic device 520 moves the right knee portion of the virtual object 510 in accordance with the movement input 554C. For example, as shown, the right knee portion of the virtual object 510 is displayed in three-dimensional environment 560 in a raise/elevated orientation with respect to the top surface of the platter 581. Additionally, the first electronic device 520 associates the movement of the right knee portion of the virtual object 510 with the fourth key frame 586D in the animation timeline 585.

In some examples, as shown in FIG. 5E, in response to receiving the movement input 554c at the first electronic device 520, the second electronic device 530' moves the representation of the virtual object 510' in the motion creation user interface 551' accordance with the movement. Additionally, as shown, the second electronic device 530' optionally generates and displays an additional time element 559A' including a motion curve 573A' corresponding to the right knee portion of the virtual object 510'. For example, as similarly discussed above, the motion curve 573A' describes a change in positional data over time of the right knee portion of the virtual object 510 as the virtual object transitions from the first pose at the first key frame 586A through the third, fourth, and second poses at the third, fourth, and second key frames 586C, 586D, and 586B, respectively, in the animation timeline 585. Additionally, as similarly mentioned above, because the first electronic device 520 may (e.g., as a default (i.e., initially)) interpolate successive poses linearly, the rates of change shown for the motion curves 57A3' in the motion creation user interface 551' may be linear as well.

Figure 5F:
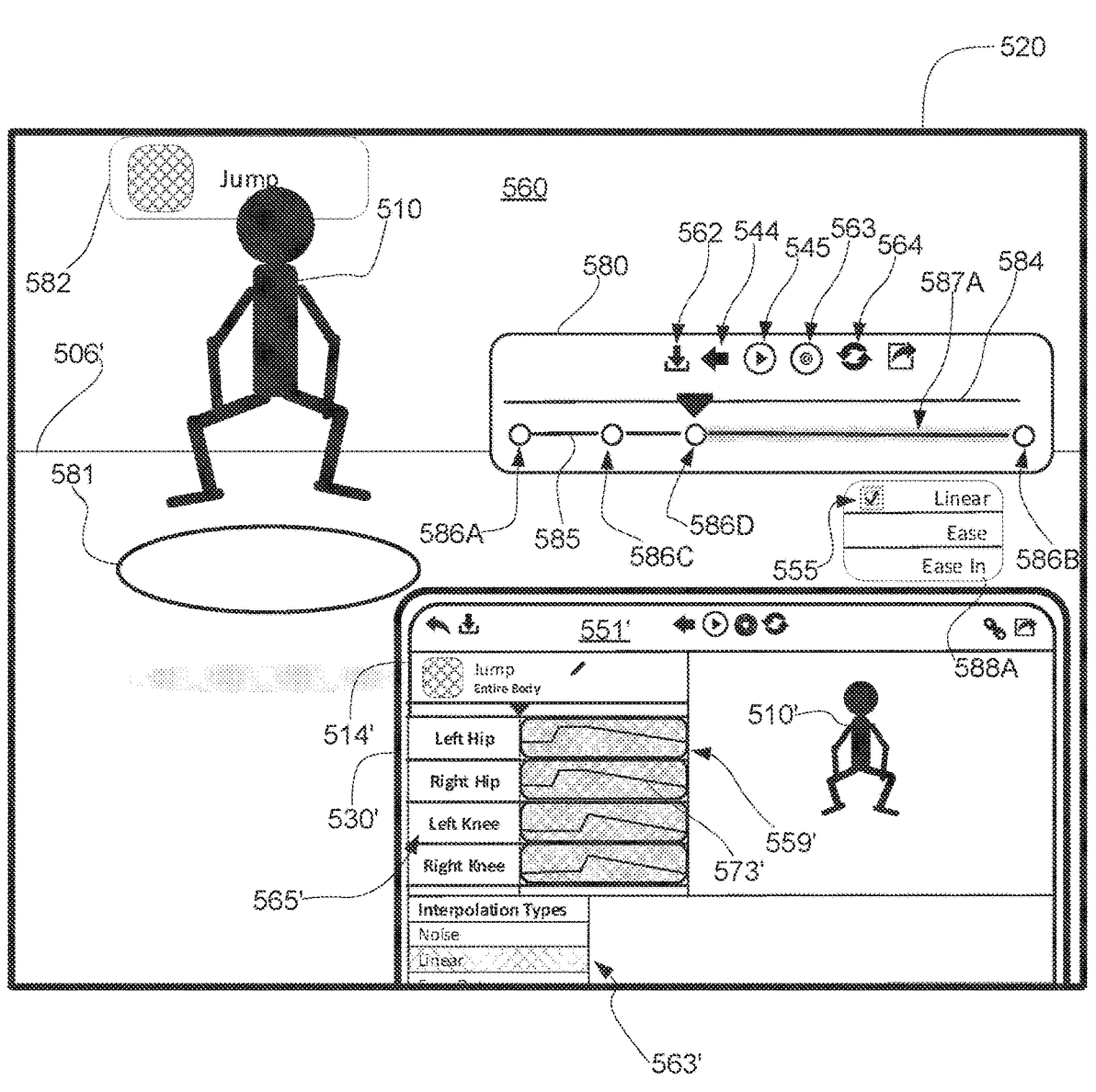

As described above with reference to FIGS. 4A-4P, the interpolation type applied between successive poses of the virtual object 510 can be selectively changed to change an appearance (e.g., smoothness or sharpness) of the transitions between successive poses. As shown in FIG. 5E, the user is optionally providing a selection input 552F (e.g., a pinch gesture, a tap or touch gesture, or a verbal command) directed to a segment 587A of the animation timeline 585 that is between the fourth key frame 586D and the second key frame 586B. As shown in FIG. 5F, in some examples, in response to receiving the selection input 552F, the first electronic device 520 displays interpolation window 588A including a scrollable list of selectable interpolation types for the segment 587A. For example, as shown, the interpolation window 588A includes the interpolation types "Linear," "Ease," and "Ease In," where the Linear interpolation type is displayed with visual indication 555 indicating that the current interpolation type for the transition from the fourth pose at key frame 586D to the second pose at key frame 586B is linear. In some examples, the user may select an alternative interpolation type from the interpolation window 588A to change an appearance of the transition from the fourth pose to the second pose. For example, the user may desire the transition from the fourth pose (e.g., in which the hips and left and right knee portions of the virtual object 410 are in a raised orientation (simulating a jumping motion)) to the second pose (e.g. in which the hips and left and right knee portions are in a resting orientation)) to appear more natural (e.g., being acted upon by force of gravity), rather than constant.

Figure 5G:
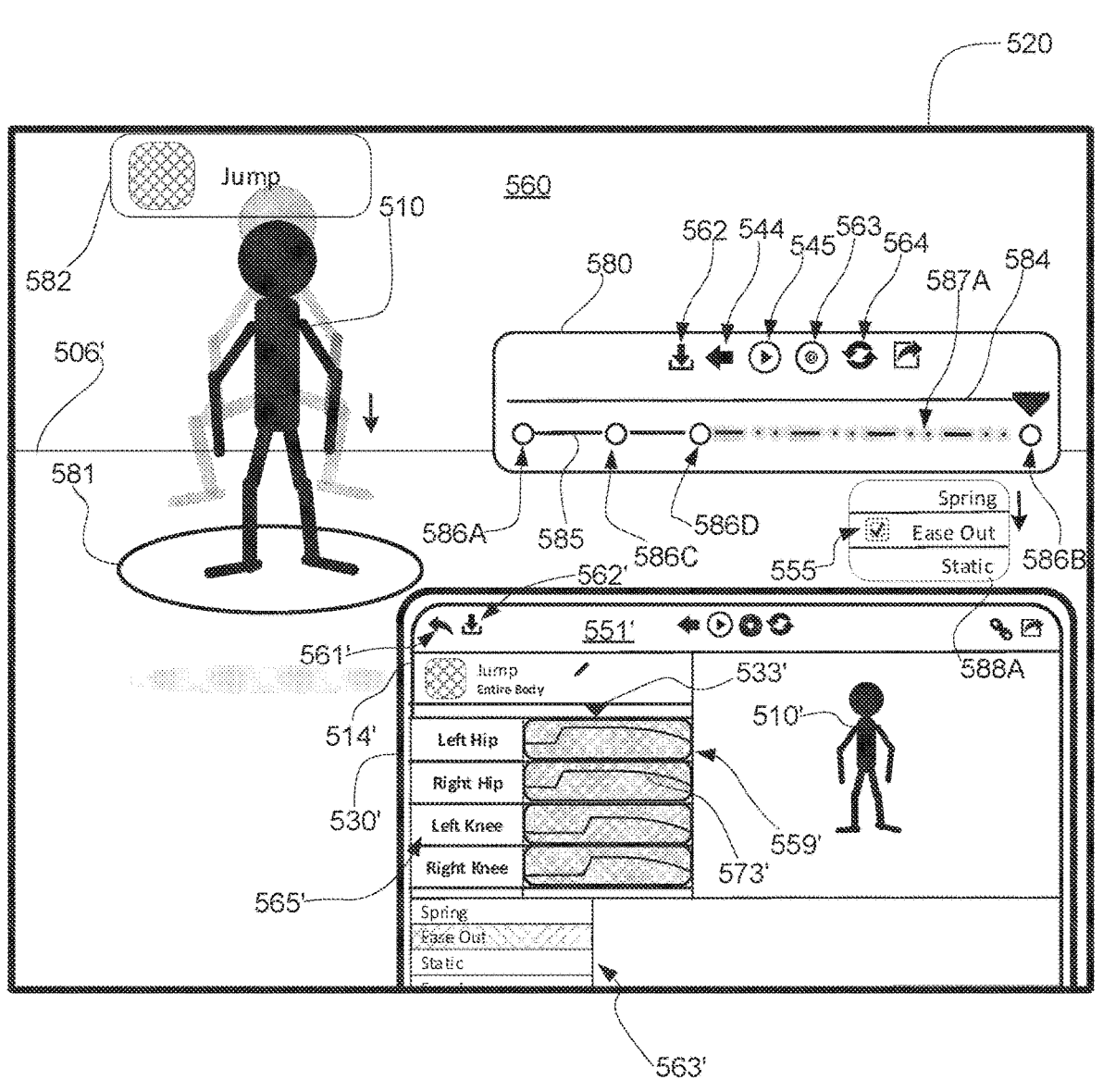

In some examples, when the user selects an alternative interpolation type within interpolation window 588A, the first electronic device 520 optionally updates the interpolation type and the display of the visual indicator 555. For example, as shown in FIG. 5G, the user has selected the Ease Out interpolation type (e.g., after scrolling in a downward direction) within the interpolation window 588A, which optionally causes the first electronic device 520 to update display of the visual indicator 555 and to change the interpolation type between the fourth pose at key frame 586D and the second pose at key frame 586B. In some examples, as similarly described above with reference to FIGS. 4A-4P, changing the interpolation type of the segment 587A optionally causes the first electronic device 520 to change an appearance of the segment 587A based on the selected interpolation type, as shown in FIG. 5G. Accordingly, when the virtual object 510 transitions from the fourth pose at the fourth key frame 586D to the second pose at the second key frame 586B, as shown in FIG. 5G, the targeted portions of the virtual object (e.g., the hips, and right and left knee portions) may follow a more realistic rate of change in position (i.e., displacement).

Additionally, as shown in FIG. 5G, the second electronic device 530' may update display of the motion creation user interface 551' based on the changes (e.g., the user inputs) received at the first electronic device 520. For example, the second electronic device 530' may update display of the representation of the virtual object 510' and each of the motion curve 573' within time elements 559' in real time, as similarly described above. Particularly, as shown in FIG. 5G, the slope of the motion curves 573' starting at the location indicated by the play head 533' is updated to correspond to the Ease Out interpolation type, which is optionally shown with visual emphasis (e.g., highlight/shading) among the interpolation types 563' in the motion creation user interface 551'.

Figure 5H:
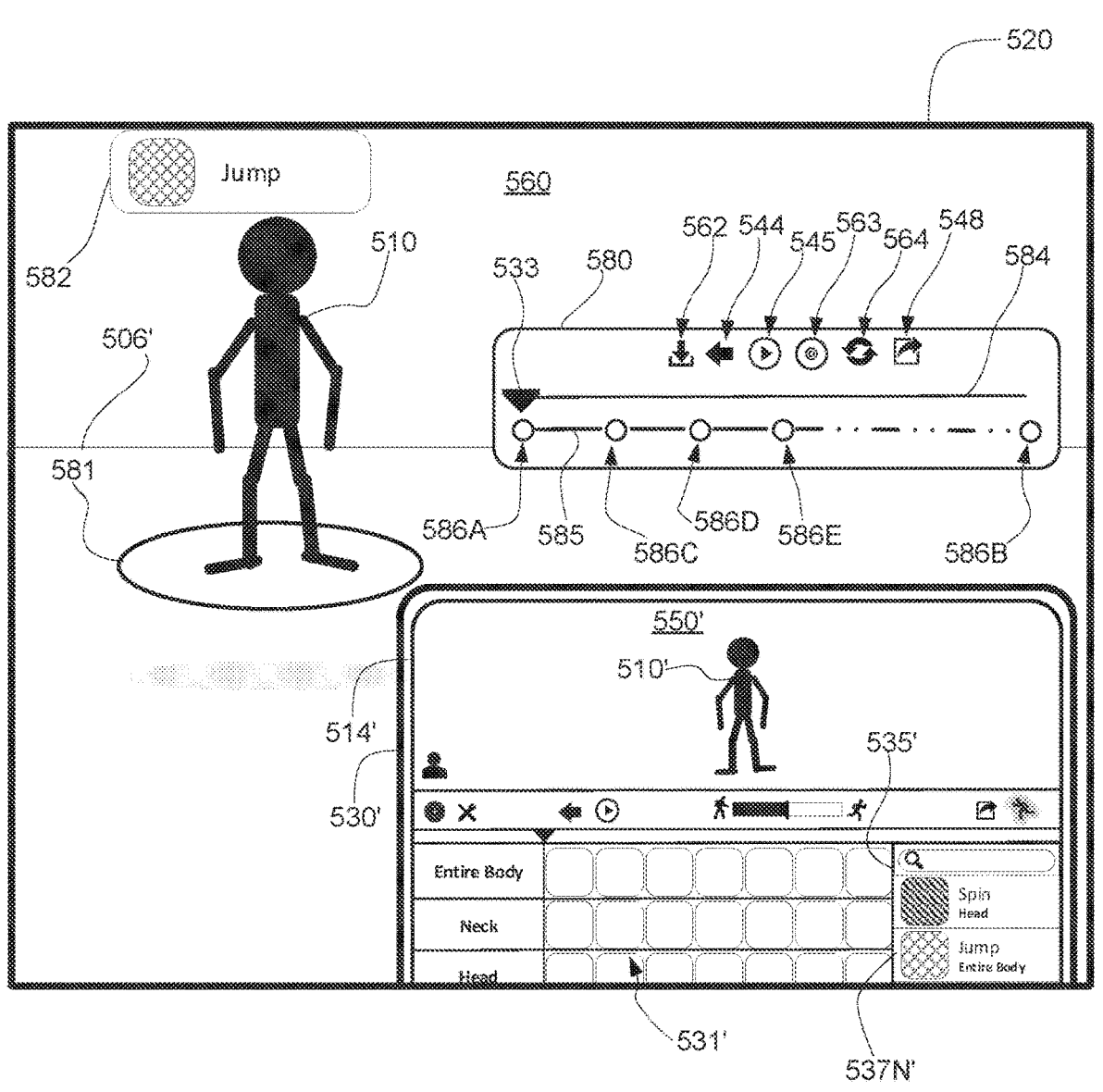

In some examples, as similarly described above with reference to FIGS. 3A-3O, the jumping motion effect can be saved to the library of motion effects of the animation editor application for subsequent use in animating the virtual object 510. For example, the user may select (e.g., via a selection input) the save option 562' at the second electronic device 530', and navigate back to the animation editor user interface 550' by selecting the return option 561'. As shown in FIG. 5H, the new motion effect (e.g., labeled "Jump") 535N' may be displayed in the library of motion effects 535', which can subsequently be added to the animation timeline 531' in the manner described above with reference to FIGS. 3A-3O to animate motion of the virtual object 510'. Thus, as outlined above, the virtual motion capture application operating on the first electronic device 520 may communicate with and exchange metadata with the animation editor application operating on the second electronic device 530' to provide an enhanced animation creation experience by enabling the user to create custom motions by directly manipulating the virtual object 510 in three-dimensional environment 560.

It is understood that the examples shown and described herein are merely exemplary and that additional and/or alternative operations may be performed using the various user interface elements shown in FIGS. 5A-5H. Additionally, it should be understood that while the examples shown in FIGS. 5A-5H primarily discuss the exchange of metadata as originating from the first electronic device 520 and being transferred to the second electronic device 530', the reverse is also possible. For example, user input received at the second electronic device 530' directed to the virtual object 510' and/or the motions of the virtual object 510 may cause one or more corresponding operations to be performed at the first electronic device 520, such as updating display of the virtual object 510 in three-dimensional environment 560 and/or changing interpolation types of respective motions.

Figure 6:
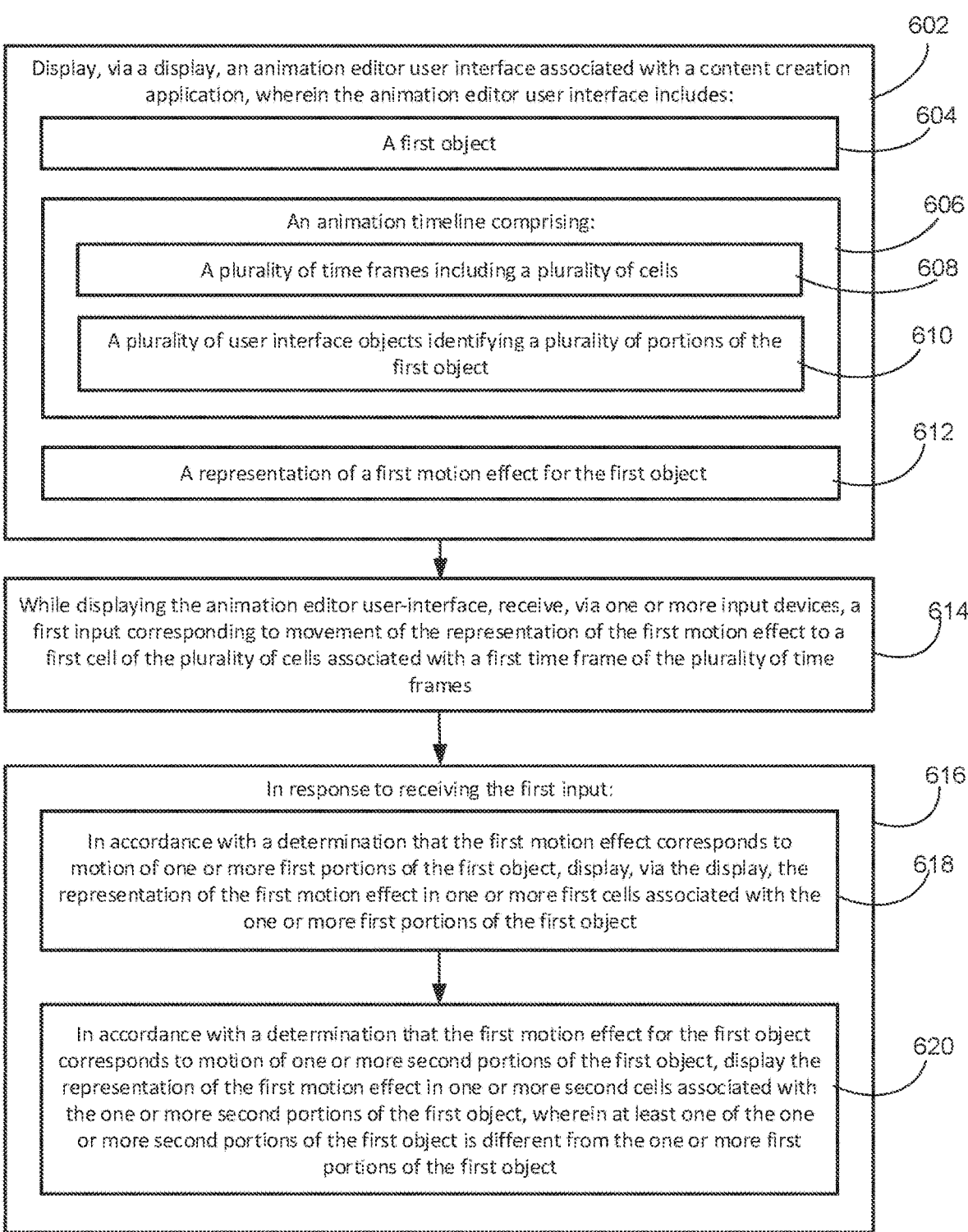
FIG. 6 illustrates a flow diagram illustrating an example process for animating an object in a graphical user interface of a motion editing and creation application on an electronic device according to some examples of the disclosure.

FIG. 6 illustrates a flow diagram illustrating an example process for animating an object in a graphical user interface of a motion editing and creation application on an electronic device according to some examples of the disclosure. In some examples, process 600 begins at an electronic device in communication with a display and one or more input devices. In some examples, the electronic device is optionally a desktop computer, a laptop computer, or a tablet computer, similar or corresponding to device 230 of FIGS. 2 and/or 330 of FIGS. 3A-3O. As shown in FIG. 6, in some examples, at 602, the electronic device may display, via a display, an animation editor user interface associated with a content creation application. In some examples, the animation editor user interface corresponds to animation editor user interface 350 in FIGS. 3A-3O and the content creation application corresponds to the animation editor application described with reference to FIGS. 3A-3O. In some examples, the animation editor user interface includes, at 604, a first object, at 606, an animation timeline comprising, at 608, a plurality of time frames including a plurality of cells, and, at 610, a plurality of user interface objects identifying a plurality of portions of the first object. In some examples, at 612, the animation editor user interface further includes a representation of a first motion effect for the first object.

In some examples, the first object optionally corresponds to the first object 310 in FIGS. 3A-3O. In some examples, the animation timeline corresponds to the animation timeline 331 in FIGS. 3A-3O, which optionally contains a row and column arrangement. For example, the plurality of time frames may define the columns of the animation timeline, wherein each column includes the plurality of cells (e.g., corresponding to cells 334 in FIGS. 3A-3O). In some examples, the plurality of user interface objects (e.g., corresponding to user interface objects 332 in FIGS. 3A-3O) may define the rows of the animation timeline. In some examples, the representation of the first motion effect for the first object is optionally displayed within a library of motion effects, such as the library 335 in FIGS. 3A-3O. In some examples, the representation of the first motion effect may be similar to first motion effect 337A in FIGS. 3A-3O.

In some examples, at 614, while displaying the animation editor user interface, the electronic device may receive, via the one or more input devices, a first input corresponding to movement of the representation of the first motion effect to a first cell of the plurality of cells associated with a first time frame of the plurality of time frames. For example, as similarly described with reference to FIGS. 3A-3O, the electronic device receives a selection input (e.g., such as selection input 352C) directed to the representation of the first motion effect, followed by movement (e.g., movement input 356A) of the representation of the first motion effect to a first column of the animation timeline corresponding to the first time frame, which optionally includes the first cell.

In some examples, at 616, in response to receiving the first input, at 618, in accordance with a determination that the first motion effect corresponds to motion of one or more first portions of the first object, the electronic device displays, via the display, the representation of the first motion effect in one or more first cells associated with the one or more first portions of the first object. For example, as shown in FIG. 3E, the representation of the first motion effect 337A is displayed in the first cell 334A and the second cell 334B in the first column of the animation timeline 331. In some examples, at 620, in accordance with a determination that the first motion effect for the first object corresponds to motion of one or more second portions of the first object, the electronic device displays the representation of the first motion effect in one or more second cells associated with the one or more second portions of the first object, wherein at least one of the one or more second portions of the first object is different from the one or more first portions of the first object. For example, as shown in FIG. 3F, the representation of the second motion effect 337B is displayed in the third cell 334C, different from the first cell 334A and the second cell 334B, in the first column of the animation timeline 331.

It is understood that process 600 is an example and that more, fewer, or different operations can be performed in the same or in a different order. Additionally, the operations in process 600 described above are, optionally, implemented by running one or more functional modules in an information processing apparatus such as general-purpose processors (e.g., as described with respect to FIG. 2) or application specific chips, and/or by other components of FIG. 2.

FIG. 7 illustrates a flow diagram illustrating an example process for animating an object in a three-dimensional environment using a virtual motion capture application according to some examples of the disclosure. In some examples, process 700 begins at a first electronic device and a second electronic device. In some examples, the first electronic device is optionally a head-mounted display similar or corresponding to device 220 of FIG. 2 and/or device 520 of FIGS. 5A-5H, and the second electronic device is optionally a desktop computer, a laptop computer, or a tablet computer similar or corresponding to device 230 of FIG. 2 and/or device 530' of FIGS. 5A-5H. As shown in FIG. 7, in some examples, at 702, the first electronic device may present a computer-generated environment including, at 704, a representation of the second electronic device, wherein the second electronic device is in communication with the first electronic device, at 706, a first object having a first pose, and at 708, a first user interface element including an animation timeline. For example, the computer-generated environment may correspond to three-dimensional environment 560 in FIGS. 5A-5H. In some examples, the first object optionally corresponds to virtual object 510 in FIGS. 5A-5H. In some examples, the first user interface element optionally corresponds to user interface element 580 in FIGS. 5A-5H, and the animation timeline optionally corresponds to animation timeline 585.

In some examples, at 710, while the first electronic device is presenting the computer-generated environment, the second electronic device may receive a first input corresponding to a request to create a first motion effect. For example, as shown in FIG. 5A, the second electronic device 530' receives a selection input 552A directed to the motion creation option 538'. In some examples, at 712, in response to receiving the first input, the second electronic device displays a motion effect creation user interface including a representation of the first object having the first pose. For example, as shown in FIG. 5B, the second electronic device 530' displays motion creation user interface 551' including the representation of the virtual object 510'.

In some examples, at 714, while the motion effect creation user interface is displayed at the second electronic device, the first electronic device receives a second input corresponding to movement of the first object from the first pose to a second pose, different from the first pose. For example, as shown in FIG. 5C, the first electronic device 520 receives a selection input 552C directed to a portion of the virtual object 510, followed by movement input 554A to a new pose in three-dimensional environment 560. In some examples, at 716, in response to receiving the second input at the first electronic device, the second electronic device updates display of the representation of the first object in the motion effect creation user interface to have the second pose. For example, as shown in FIG. 5D, the display of the representation of the virtual object 510' is updated in the motion creation user interface 551' at the second electronic device 530' in accordance with the movement of the portion of the virtual object 510 at the first electronic device 520.

It is understood that process 700 is an example and that more, fewer, or different operations can be performed in the same or in a different order. Additionally, the operations in process 700 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method performed at an electronic device in communication with a display and one or more input devices. In some examples, the method comprises: displaying, via the display, an animation editor user interface associated with a content creation application, wherein the animation editor user interface includes a first object and an animation timeline, comprising a plurality of time frames including a plurality of cells, and a plurality of user interface objects identifying a plurality of portions of the first object, and a representation of a first motion effect for the first object; while displaying the animation editor user interface, receiving, via the one or more input devices, a first input corresponding to movement of the representation of the first motion effect to a first cell of the plurality of cells associated with a first time frame of the plurality of time frames; and in response to receiving the first input, in accordance with a determination that the first motion effect corresponds to motion of one or more first portions of the first object, displaying, via the display, the representation of the first motion effect in one or more first cells associated with the one or more first portions of the first object, and in accordance with a determination that the first motion effect for the first object corresponds to motion of one or more second portions of the first object, displaying the representation of the first motion effect in one or more second cells associated with the one or more second portions of the first object, wherein at least one of the one or more second portions of the first object is different from the one or more first portions of the first object.

Additionally or alternatively, in some examples, the method further comprises in response to receiving the first input, in accordance with the determination that the first motion effect corresponds to motion of the one or more first portions of the first object, animating the one or more first portions of the first object at the first time frame according to the first motion effect, and in accordance with the determination that the first motion effect corresponds to motion of the one or more second portions of the first object, animating the one or more second portions of the first object at the first time frame according to the first motion effect.

Additionally or alternatively, in some examples, at least one of the one or more second portions of the first object is the same as one of the one or more first portions of the first object.

Additionally or alternatively, in some examples, the electronic device is a laptop computer, a desktop computer, or a tablet computer.

Additionally or alternatively, in some examples, the first object is a virtual agent configured to be presented in a computer-generated environment at the electronic device.

Additionally or alternatively, in some examples, the first object includes a character or a representation of a physical object.

Additionally or alternatively, in some examples, the first object includes text representation.

Additionally or alternatively, in some examples, the method further comprises: receiving, via the one or more input devices, a second input corresponding to movement of a representation of a second motion effect to a respective cell of the plurality of cells associated with the first time frame of the plurality of time frames; and in response to receiving the second input, in accordance with a determination that the second motion effect for the first object corresponds to motion of one or more third portions of the first object, displaying, via the display, the representation of the second motion effect in one or more third cells of the first plurality of cells associated with the one or more third portions of the first object.

Additionally or alternatively, in some examples, the method further comprises: receiving, via the one or more input devices, a second input corresponding to movement of a representation of a second motion effect to a respective cell of the plurality of cells associated with the first time frame of the plurality of time frames; and in response to receiving the second input: in accordance with a determination that the second motion effect for the first object corresponds to motion of the one or more first portions of the first object, replacing display, via the display, of the representation of the first motion effect with the representation of the second motion effect in the one or more first cells of the first plurality of cells associated with the one or more first portions of the first object; and in accordance with a determination that the second motion effect for the first object corresponds to motion of the one or more second portions of the first object, replacing display of the representation of the first motion effect with the representation of the second motion effect in the one or more second cells of the first plurality of cells associated with the one or more second portions of the first object.

Additionally or alternatively, in some examples, the plurality of time frames includes a plurality of cells, the plurality of cells arranged in a plurality of columns within the animation timeline, the plurality of user interface objects identifying the plurality of portions of the first object are arranged in a plurality of rows within the animation timeline, and the first time frame includes a first plurality of cells of the plurality of cells, the first plurality of cells positioned in a first column of the plurality of columns.

Additionally or alternatively, in some examples, the method further comprises, in response to receiving the first input, in accordance with the determination that the first motion effect for the first object corresponds to motion of the one or more first portions of the first object, displaying, via the display, the representation of the first motion effect in one or more first cells of the first plurality of cells of the first column that intersect one or more first rows of the plurality of rows corresponding to the one or more first portions of the first object, and in accordance with the determination that the first motion effect for the first object corresponds to motion of the one or more second portions of the first object, displaying the representation of the first motion effect in one or more second cells of the first plurality of cells of the first column that intersect one or more second rows of the plurality of rows corresponding to the one or more second portions of the first object.

Additionally or alternatively, in some examples, the animation editor user interface further includes a library of a plurality of motion effects including the representation of the first motion effect, and a respective option that is selectable to display the library of the plurality of motion effects over a portion of the animation timeline, wherein the library of motion effects includes a plurality of representations corresponding to the plurality of motion effects.

Additionally or alternatively, in some examples, the method further comprises: while displaying the first object, the animation timeline, and the library of the plurality of motion effects, receiving, via the one or more input devices, a respective input corresponding to a selection of a representation of a respective motion effect; and in response to receiving the respective input, causing the first object to perform a respective motion in accordance with the respective motion effect.

Additionally or alternatively, in some examples, the method further comprises, while displaying the first object, the animation timeline, and the library of the plurality of motion effects, receiving, via the one or more input devices, a second input including: selection of a representation of a second motion effect, different from the first motion effect, in the library of the plurality of motion effects; movement of the representation of the second motion effect from the library to the first column of the plurality of columns of the animation timeline while the representation of the second motion effect remains selected; and release of the selection of the representation of the second motion effect.

Additionally or alternatively, in some examples, the method further comprises, in response to receiving the second input, in accordance with a determination that the second motion effect for the first object corresponds to motion of one or more third portions of the first object: displaying, via the display, the representation of the second motion effect in one or more third cells of the first plurality of cells of the first column that intersect one or more third rows of the plurality of rows corresponding to the one or more third portions of the first object; and animating the one or more third portions of the first object at the first time frame according to the second motion effect.

Additionally or alternatively, in some examples, the method further comprises, in response to receiving the second input: in accordance with a determination that the second motion effect for the first object corresponds to motion of the one or more first portions of the first object, replacing display, via the display, of the representation of the first motion effect with the representation of the second motion effect in the one or more first cells of the first plurality of cells of the first column that intersect the one or more first rows of the plurality of rows corresponding to the one or more first portions of the first object, and animating the one or more first portions of the first object at the first time frame according to the second motion effect; and in accordance with a determination that the second motion effect for the first object corresponds to motion of the one or more second portions of the first object, replacing display of the representation of the first motion effect with the representation of the second motion effect in the one or more second cells of the first plurality of cells of the first column that intersect the one or more second rows of the plurality of rows corresponding to the one or more second portions of the first object, and animating the one or more second portions of the first object at the first time frame according to the second motion effect.

Additionally or alternatively, in some examples, the method further comprises, while displaying the first object, the animation timeline, and the library of the plurality of motion effects, receiving, via the one or more input devices, a second input including: selection of a representation of a second motion effect, different from the first motion effect, in the library of the plurality of motion effects; movement of the representation of the second motion effect from the library to a second column, different from the first column, of the plurality of columns corresponding to a second time frame, after the first time frame, of the animation timeline while the representation of the second motion effect remains selected; and release of the selection of the representation of the second motion effect.

Additionally or alternatively, in some examples, the method further comprises: in response to receiving the second input: in accordance with a determination that the second motion effect for the first object corresponds to motion of the one or more first portions of the first object, displaying, via the display, the representation of the second motion effect in one or more first cells of a second plurality of cells of the second column that intersect the one or more first rows of the plurality of rows corresponding to the one or more first portions of the first object, and animating the one or more first portions of the first object at the second time frame according to the second motion effect; and in accordance with a determination that the second motion effect for the first object corresponds to motion of the one or more second portions of the first object, displaying the representation of the second motion effect in one or more second cells of a second plurality of cells of the second column that intersect the one or more second rows of the plurality of rows corresponding to the one or more second portions of the first object, and animating the one or more second portions of the first object at the second time frame according to the second motion effect.

Additionally or alternatively, in some examples, the animation editor user interface further includes a play option that is selectable to cause the first object to perform animated motion according to the animation timeline. Additionally or alternatively, in some examples, the method further comprises: while displaying the animation editor user interface, receiving, via the one or more input devices, a second input corresponding to selection of the play option; and in response to receiving the second input, in accordance with a determination that the one or more first portions of the first object are animated according to the first motion effect at the first time frame, causing the one or more first portions of the first object to perform animated motion according to the first motion effect, and in accordance with a determination that the one or more second portions of the first object are animated according to the first motion effect at the first time frame, causing the one or more second portions of the first object to perform animated motion according to the second motion effect.

Additionally or alternatively, in some examples, the animation editor user interface further includes a play head for scrubbing through the plurality of time frames of the animation timeline. Additionally or alternatively, in some examples, the method further comprises, in response to receiving the second input, moving the play head in the animation editor user interface in accordance with an advancement of time of the first time frame in the animation timeline.

Additionally or alternatively, in some examples, the animation editor user interface further includes a respective option that is selectable to create a custom motion effect.

Additionally or alternatively, in some examples, the method further comprises: while displaying the animation editor user interface, receiving, via the one or more input devices, a second input corresponding to selection of the respective option; in response to receiving the second input, displaying, in the animation editor user interface, a motion effect creator user interface, including a representation of the first object, a plurality of user interface objects identifying a plurality of portions of the first object, and a plurality of interpolation types; while displaying the motion effect creator user interface, receiving, via the one or more input devices, a third input that includes selection of a first user interface object of the plurality of user interface objects identifying a first portion of the first object, and selection of a first interpolation type of the plurality of interpolation types; and in response to receiving the third input, displaying, in the motion effect creator user interface, a first motion curve based on the first interpolation type, the first motion curve defining a motion of the first portion of the first object, and displaying a plurality of motion parameters associated with the first interpolation type.

Additionally or alternatively, in some examples, the method further comprises: while displaying the motion effect creator user interface including the first motion curve and the plurality of motion parameters, receiving, via the one or more input devices, a fourth input corresponding to modification of one or more parameters of the plurality of motion parameters; and in response to receiving the fourth input, updating the first motion curve based on the modification of the one or more parameters of the plurality of parameters, and causing the first portion of the representation of the first object to perform motion according to the updated first motion curve.

Additionally or alternatively, in some examples, the method further comprises: while displaying the motion effect creator user interface, receiving, via the one or more input devices, a respective input corresponding to a request to generate a custom motion effect based on the first motion curve; and in response to receiving the respective input, generating the custom motion effect based on the first motion curve, and adding the custom motion effect to a library of a plurality of motion effects, the plurality of motion effects including the first motion effect.

Some examples of the disclosure are directed to an electronic device comprising, one or more processors, memory, and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising, one or more processors, memory, and means for performing any of the above methods.

Some examples of the disclosure are directed to an information processing apparatus for use in an electronic device, the information processing apparatus comprising means for performing any of the above methods.

Some examples of the disclosure are directed to a method performed at an electronic device in communication with a display and one or more input devices. In some examples, the method comprises: displaying, via the display, an animation editor user interface associated with a content creation application, wherein the animation editor user interface includes a first object, an animation timeline comprising a plurality of time frames including a plurality of cells, and a plurality of user interface objects identifying a plurality of portions of the first object, and a representation of a respective motion effect for the first object; while displaying the animation editor user interface, receiving, via the one or more input devices, a first input corresponding to movement of the representation of the respective motion effect to a respective cell of the plurality of cells; and in response to receiving the first input, in accordance with a determination that the respective motion effect corresponds to a first motion effect, displaying, via the display, the representation of the respective motion effect in one or more first cells of the plurality of cells, and in accordance with a determination that the respective motion effect corresponds to a second motion effect, different from the first motion effect, displaying the representation of the respective motion effect in one or more second cells, different from the one or more first cells, of the plurality of cells.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

The invention claimed is:

1. A method comprising:

at an electronic device in communication with a display and one or more input devices:

displaying, via the display, an animation editor user interface associated with a content creation application, wherein the animation editor user interface includes:

a first object;

an animation timeline comprising:

a plurality of time frames, wherein each time frame includes a plurality of cells, and a plurality of user interface objects identifying a plurality of portions of the first object;

a representation of a first motion effect for the first object, wherein the first motion effect is associated with one or more first portions of the plurality of portions of the first object; and a representation of a second motion effect, different from the first motion effect, for the first object, wherein the second motion effect is associated with one or more second portions of the plurality of portions of the first object;

while displaying the animation editor user interface, receiving, via the one or more input devices, a first input corresponding to movement of the representation of the first motion effect to a first cell corresponding to a respective time frame;

in response to receiving the first input:

determining that the representation of the first motion effect corresponds to the first motion effect; and displaying, via the display, the representation of the first motion effect in a first plurality of cells corresponding to the respective time frame and corresponding to the one or more first portions, including the first cell;

while displaying the animation editor user interface, receiving, via the one or more input devices, a second input corresponding to movement of the representation of the second motion effect to a second cell corresponding to the respective time frame, different from the first cell; and in response to receiving the second input:

determining that the representation of the first motion effect corresponds to the second motion effect, different from the first motion effect; and displaying the representation of the second motion effect in a second plurality of cells, different from the first plurality of cells, corresponding to the one or more second portions, including the second cell, different from the first cell.

2. The method of claim 1, further comprising:

in response to receiving the first input:

animating the one or more first portions of the first object according to the first motion effect; and in response to receiving the second input:

animating the one or more second portions of the first object according to the second motion effect.

3. The method of claim 2, wherein at least one of the one or more second portions of the first object are the same as one of the one or more first portions of the first object.

4. The method of claim 1, wherein the first object is a virtual agent configured to be presented in three-dimensional environment at the electronic device.

5. The method of claim 1, further comprising:

receiving, via the one or more input devices, a third input corresponding to movement of a representation of a third motion effect to a respective cell corresponding to the respective time frame; and in response to receiving the third input:

displaying, via the display, the representation of the third motion effect in a third plurality of cells corresponding to the respective time frame.

6. The method of claim 1, further comprising:

receiving, via the one or more input devices, a third input corresponding to movement of a representation of a third motion effect to a respective cell corresponding to the respective time frame; and in response to receiving the third input:

displaying, via the display, the representation of the third motion effect in a third plurality of cells corresponding to the respective time frame including:

in accordance with a determination that one of the third plurality of cells correspond to one of the first plurality of cells, replacing display of the representation of the first motion effect with the representation of the third motion effect in the one of the first plurality of cells; and in accordance with a determination that one of the third plurality of cells correspond to one of the second plurality of cells, replacing display of the representation of the second motion effect with the representation of the third motion effect in the one of the second plurality of cells.

7. The method of claim 1, wherein:

the plurality of cells arranged in a plurality of columns within the animation timeline;

the plurality of user interface objects identifying the plurality of portions of the first object are arranged in a plurality of rows within the animation timeline; and the respective time frame of the plurality of time frames includes, the first plurality of cells positioned in a first column of the plurality of columns.

8. The method of claim 7, wherein:

in response to receiving the first input:

displaying the representation of the first motion effect in the first plurality of cells corresponding to the respective time frame includes displaying the representation of the first motion effect in the first plurality of cells of the first column that intersect one or more first rows of the plurality of rows corresponding to one or more first portions of the first object; and in response to receiving the second input:

displaying the representation of the second motion effect in the second plurality of cells includes displaying the representation of the second motion effect in the first plurality of cells of the first column that intersect one or more second rows of the plurality of rows corresponding to one or more second portions of the first object.

9. The method of claim 8, wherein the animation editor user interface further includes:

a library of a plurality of motion effects including the representation of the first motion effect and the representation of the second motion effect; and a respective option that is selectable to display the library of the plurality of motion effects over a portion of the animation timeline, wherein the library of motion effects includes a plurality of representations corresponding to the plurality of motion effects.

10. The method of claim 9, further comprising:

while displaying the first object, the animation timeline, and the library of the plurality of motion effects, receiving, via the one or more input devices, a third input including:

selection of a representation of a third motion effect, different from the first motion effect and the second motion effect, in the library of the plurality of motion effects;

movement of the representation of the third motion effect from the library to the first column of the plurality of columns of the animation timeline while the representation of the third motion effect remains selected; and release of the selection of the representation of the third motion effect.

11. The method of claim 10, further comprising:

in response to receiving the third input:

displaying, via the display, the representation of the third motion effect in one or more third cells of the first plurality of cells of the first column that intersect one or more third rows of the plurality of rows corresponding to one or more third portions of the first object; and animating the one or more third portions of the first object at the respective time frame according to the third motion effect.

12. The method of claim 11, further comprising:

in response to receiving the third input:

in accordance with a determination that one of the one or more third cells correspond to one of the first plurality of cells, replacing display, via the display, of the representation of the first motion effect with the representation of the third motion effect in the one of the first plurality of cells of the first column that intersect the one or more first rows of the plurality of rows corresponding to the one or more first portions of the first object; and in accordance with a determination that the one of the one or more third cells correspond to one of the second plurality of cells, replacing display of the representation of the second motion effect with the representation of the third motion effect in the one of the second plurality of cells of the first column that intersect the one or more second rows of the plurality of rows corresponding to the one or more second portions of the first object.

13. An electronic device comprising:

one or more processors;

memory; and one or more programs stored in the memory and configured to be executed by the one or more processors, the one or more programs including instructions for performing a method comprising:

displaying, via a display, an animation editor user interface associated with a content creation application, wherein the animation editor user interface includes:

a first object;

an animation timeline comprising:

a plurality of time frames including a plurality of cells, and a plurality of user interface objects identifying a plurality of portions of the first object; and a representation of a respective motion effect for the first object;

while displaying the animation editor user interface, receiving, via one or more input devices, a first input corresponding to movement of the representation of the respective motion effect to a respective cell of the plurality of cells; and in response to receiving the first input:

in accordance with a determination that the respective motion effect corresponds to a first motion effect that is associated with one or more first portions of the plurality of portions of the first object, displaying, via the display, the representation of the respective motion effect in one or more first cells of the plurality of cells corresponding to the one or more first portions, including the respective cell and a first cell; and in accordance with a determination that the respective motion effect corresponds to a second motion effect, different from the first motion effect, that is associated with one or more second portions of the plurality of portions of the first object, displaying the representation of the respective motion effect in one or more second cells, different from the one or more first cells, of the plurality of cells corresponding to the one or more second portions, including the respective cell and a second cell, different from the first cell.

14. The electronic device of claim 13, wherein the animation editor user interface further includes a play option that is selectable to cause the first object to perform animated motion according to the animation timeline, the method further comprising:

while displaying the animation editor user interface, receiving, via the one or more input devices, a second input corresponding to selection of the play option; and in response to receiving the second input:

in accordance with a determination that the one or more first portions of the first object are animated according to the first motion effect, causing the one or more first portions of the first object to perform animated motion according to the first motion effect; and in accordance with a determination that the one or more second portions of the first object are animated according to the second motion effect, causing the one or more second portions of the first object to perform animated motion according to the second motion effect.

15. The electronic device of claim 14, wherein the animation editor user interface further includes a play head for scrubbing through the plurality of time frames of the animation timeline, the method further comprising:

in response to receiving the second input:

moving the play head in the animation editor user interface in accordance with an advancement of time of the plurality of time frames in the animation timeline.

16. A non-transitory computer readable storage medium storing one or more programs, the one or more programs comprising instructions, which when executed by one or more processors of an electronic device, cause the electronic device to perform a method comprising:

displaying, via a display, an animation editor user interface associated with a content creation application, wherein the animation editor user interface includes:

a first object;

an animation timeline comprising:

a plurality of time frames including a plurality of cells, and a plurality of user interface objects identifying a plurality of portions of the first object; and a representation of a respective motion effect for the first object;

while displaying the animation editor user interface, receiving, via one or more input devices, a first input corresponding to movement of the representation of the respective motion effect to a respective cell of the plurality of cells; and in response to receiving the first input:

in accordance with a determination that the respective motion effect corresponds to a first motion effect that is associated with one or more first portions of the plurality of portions of the first object, displaying, via the display, the representation of the respective motion effect in one or more first cells of the plurality of cells corresponding to the one or more first portions, including the respective cell and a first cell; and in accordance with a determination that the respective motion effect corresponds to a second motion effect, different from the first motion effect, that is associated with one or more second portions of the plurality of portions of the first object, displaying the representation of the respective motion effect in one or more second cells, different from the one or more first cells, of the plurality of cells corresponding to the one or more second portions, including the respective cell and a second cell, different from the first cell.

17. The non-transitory computer readable storage medium of claim 16, wherein the animation editor user interface further includes a respective option that is selectable to create a custom motion effect.

18. The non-transitory computer readable storage medium of claim 17, the method further comprising:

while displaying the animation editor user interface, receiving, via the one or more input devices, a second input corresponding to selection of the respective option;

in response to receiving the second input, displaying, in the animation editor user interface, a motion effect creator user interface, including:

a representation of the first object;

a plurality of user interface objects identifying a plurality of portions of the first object; and a plurality of interpolation types;

while displaying the motion effect creator user interface, receiving, via the one or more input devices, a third input that includes:

selection of a first user interface object of the plurality of user interface objects identifying a first portion of the first object; and selection of a first interpolation type of the plurality of interpolation types; and in response to receiving the third input:

displaying, in the motion effect creator user interface, a first motion curve based on the first interpolation type, the first motion curve defining a motion of the first portion of the first object; and displaying a plurality of motion parameters associated with the first interpolation type.

19. The non-transitory computer readable storage medium of claim 18, the method further comprising:

while displaying the motion effect creator user interface including the first motion curve and the plurality of motion parameters, receiving, via the one or more input devices, a fourth input corresponding to modification of one or more parameters of the plurality of motion parameters; and in response to receiving the fourth input:

updating the first motion curve based on the modification of the one or more parameters of the plurality of motion parameters; and causing the first portion of the representation of the first object to perform motion according to the updated first motion curve.

20. The non-transitory computer readable storage medium of claim 19, the method further comprising:

while displaying the motion effect creator user interface, receiving, via the one or more input devices, a respective input corresponding to a request to generate a custom motion effect based on the first motion curve; and in response to receiving the respective input:

generating the custom motion effect based on the first motion curve; and adding the custom motion effect to a library of a plurality of motion effects, the plurality of motion effects including the first motion effect and the second motion effect.

* * * * *